United States Patent
Wang et al.

(10) Patent No.: US 10,136,179 B2
(45) Date of Patent: *Nov. 20, 2018

(54) METHOD AND SYSTEM FOR EFFICIENT COMMUNICATION

(71) Applicant: Virginia Innovation Sciences, Inc., Alexandria, VA (US)

(72) Inventors: Tiejun Wang, Alexandria, VA (US); Tiehong Wang, Alexandria, VA (US)

(73) Assignee: Virginia Innovation Sciences, Inc, Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,405

(22) Filed: Feb. 7, 2018

(65) Prior Publication Data
US 2018/0167666 A1    Jun. 14, 2018

Related U.S. Application Data

(63) Continuation of application No. 15/626,192, filed on Jun. 19, 2017, now Pat. No. 9,912,983, which is a
(Continued)

(51) Int. Cl.
*H04L 25/20*     (2006.01)
*H04L 29/06*     (2006.01)
(Continued)

(52) U.S. Cl.
CPC ....... *H04N 21/43615* (2013.01); *H04L 25/20* (2013.01); *H04L 65/4069* (2013.01);
(Continued)

(58) Field of Classification Search
CPC ......... H04N 21/43615; H04N 21/6131; H04N 21/43635; H04N 21/4383; H04N 21/4126;
(Continued)

(56) References Cited

U.S. PATENT DOCUMENTS

| 4,740,963 A | 4/1988 | Eckley |
| 5,610,971 A | 3/1997 | Vandivier |

(Continued)

FOREIGN PATENT DOCUMENTS

| CN | 1332417 A | 1/2002 |
| CN | 1365241 A | 8/2002 |

(Continued)

OTHER PUBLICATIONS

Notification of Transmittal of the International Search Report and the Written Opinion of the International Searching Authority, or the Declaration; International Application No. PCT/US05/25284; Filing Date: Jul. 15, 2005.
(Continued)

*Primary Examiner* — Brandon J Miller

(57) ABSTRACT

Methods and apparatus for efficiently directing communications are disclosed. On example entails receiving, from a mobile terminal, a communication directed to a cellular communication network, the communication being received in an alternative channel that differs from a channel of the cellular communication network. The communication is then converted for a relayed communication to the cellular communication network on behalf of the mobile terminal, the relayed communication being made through the cellular communication network.

18 Claims, 33 Drawing Sheets

Related U.S. Application Data continuation of application No. 15/417,111, filed on Jan. 26, 2017, now Pat. No. 9,729,918, which is a continuation of application No. 15/070,439, filed on Mar. 15, 2016, now Pat. No. 9,942,798, which is a continuation of application No. 13/833,328, filed on Mar. 15, 2013, now abandoned, which is a continuation-in-part of application No. 13/537,418, filed on Jun. 29, 2012, now Pat. No. 8,843,931, which is a continuation of application No. 12/926,716, filed on Dec. 7, 2010, now Pat. No. 8,285,211, which is a continuation of application No. 12/684,377, filed on Jan. 8, 2010, now Pat. No. 7,983,616, which is a continuation of application No. 11/540,637, filed on Oct. 2, 2006, now Pat. No. 7,647,024, said application No. 13/833,328 is a continuation-in-part of application No. 13/370,483, filed on Feb. 10, 2012, now Pat. No. 8,805,358, which is a continuation of application No. 13/067,079, filed on May 6, 2011, now Pat. No. 8,135,398, which is a continuation of application No. 11/802,418, filed on May 22, 2007, now Pat. No. 7,957,733, which is a continuation-in-part of application No. 11/501,747, filed on Aug. 10, 2006, now Pat. No. 7,603,131, said application No. 13/833,328 is a continuation-in-part of application No. 13/495,890, filed on Jun. 13, 2012, now Pat. No. 8,417,290, which is a continuation of application No. 13/397,156, filed on Feb. 15, 2012, now Pat. No. 8,224,381, which is a continuation of application No. 13/268,001, filed on Oct. 7, 2011, now Pat. No. 8,145,268, which is a continuation of application No. 12/929,408, filed on Jan. 21, 2011, now Pat. No. 8,050,711, which is a continuation of application No. 11/165,341, filed on Jun. 24, 2005, now Pat. No. 7,899,492.

(60) Provisional application No. 60/899,037, filed on Feb. 2, 2007, provisional application No. 60/832,962, filed on Jul. 25, 2006, provisional application No. 60/787,510, filed on Mar. 31, 2006, provisional application No. 60/722,444, filed on Oct. 3, 2005, provisional application No. 60/707,561, filed on Aug. 12, 2005, provisional application No. 60/588,358, filed on Jul. 16, 2004.

(51) Int. Cl.
*H04L 29/08* (2006.01)
*H04N 21/41* (2011.01)
*H04N 21/61* (2011.01)
*H04W 28/06* (2009.01)
*H04W 4/029* (2018.01)
*H04W 84/04* (2009.01)
*H04W 84/12* (2009.01)
*H04W 88/04* (2009.01)
*H04N 21/436* (2011.01)
*H04N 21/438* (2011.01)
*H04N 21/4363* (2011.01)
*H04N 21/4402* (2011.01)

(52) U.S. Cl.
CPC ........... *H04L 65/605* (2013.01); *H04L 67/18* (2013.01); *H04L 67/22* (2013.01); *H04N 21/4126* (2013.01); *H04N 21/4383* (2013.01); *H04N 21/43635* (2013.01); *H04N 21/440218* (2013.01); *H04N 21/6131* (2013.01); *H04W 4/029* (2018.02); *H04W 28/06* (2013.01); *H04W 84/042* (2013.01); *H04W 84/047* (2013.01); *H04W 84/12* (2013.01); *H04W 88/04* (2013.01)

(58) Field of Classification Search
CPC ........... H04N 21/40218; H04W 88/04; H04W 84/12; H04W 84/042; H04W 28/06; H04L 65/4069; H04L 65/605; H04L 25/20; H04L 67/22; H04L 67/18
See application file for complete search history.

(56) References Cited

U.S. PATENT DOCUMENTS

| | | | |
|---|---|---|---|
| 5,706,290 A | 1/1998 | Shaw | |
| 5,715,399 A | 2/1998 | Bezos | |
| 5,745,565 A | 4/1998 | Wakefield | |
| 5,784,683 A | 7/1998 | Sistanizadeh | |
| 5,822,737 A | 10/1998 | Ogram | |
| 5,880,732 A * | 3/1999 | Tryding | G06F 3/14 715/810 |
| 5,889,863 A | 3/1999 | Weber | |
| 5,917,475 A | 6/1999 | Kuzunuki | |
| 5,990,882 A | 11/1999 | Heinonen | |
| 6,037,981 A | 3/2000 | Wilson | |
| 6,084,638 A | 7/2000 | Hare | |
| 6,128,509 A * | 10/2000 | Veijola | H04M 1/72527 455/403 |
| 6,181,954 B1 | 1/2001 | Monroe et al. | |
| 6,275,333 B1 | 8/2001 | Shaffer | |
| 6,317,082 B1 | 11/2001 | Bacon | |
| 6,349,223 B1 | 2/2002 | Chen | |
| 6,349,324 B1 | 2/2002 | Tokoro | |
| 6,404,763 B1 | 6/2002 | Renucci et al. | |
| 6,418,416 B1 | 7/2002 | Rosenberg | |
| 6,452,626 B1 | 9/2002 | Adair | |
| 6,484,042 B1 | 11/2002 | Loke | |
| 6,505,171 B1 | 1/2003 | Cohen | |
| 6,542,078 B2 | 4/2003 | Script et al. | |
| 6,546,263 B1 | 4/2003 | Petty et al. | |
| 6,555,995 B2 | 4/2003 | Shih | |
| 6,593,860 B2 | 7/2003 | Lai | |
| 6,594,143 B2 | 7/2003 | Yano | |
| 6,614,470 B1 | 9/2003 | Manowitz | |
| 6,628,963 B1 | 9/2003 | Chung | |
| 6,690,417 B1 | 2/2004 | Yoshida et al. | |
| 6,705,990 B1 | 3/2004 | Gallant | |
| 6,718,182 B1 | 4/2004 | Kung | |
| 6,753,881 B1 | 6/2004 | Callway | |
| 6,763,226 B1 | 7/2004 | McZeal, Jr. | |
| 6,781,635 B1 * | 8/2004 | Takeda | H04M 1/72527 348/14.01 |
| 6,795,715 B1 | 9/2004 | Kubo | |
| 6,828,909 B2 | 12/2004 | Script et al. | |
| 6,829,648 B1 | 12/2004 | Jones | |
| 6,859,358 B2 | 2/2005 | Baldwin et al. | |
| 6,871,243 B2 | 3/2005 | Iwase | |
| 6,873,853 B2 * | 3/2005 | Kim | H04N 7/17318 455/466 |
| 6,907,276 B2 | 6/2005 | Toba | |
| 6,947,067 B2 | 9/2005 | Halttunen | |
| 6,950,624 B2 | 9/2005 | Kim | |
| 6,970,127 B2 * | 11/2005 | Rakib | G08B 13/19656 341/173 |
| 7,010,551 B2 | 3/2006 | Terayama | |
| 7,023,572 B2 | 4/2006 | Tuli | |
| 7,024,601 B2 | 4/2006 | Quinlan | |
| 7,027,768 B2 | 4/2006 | Hill | |
| 7,076,523 B2 | 7/2006 | Schneider | |
| 7,102,591 B2 | 9/2006 | Shih | |
| 7,102,691 B2 | 9/2006 | Dischert | |
| 7,130,616 B2 | 10/2006 | Janik | |
| 7,130,618 B2 | 10/2006 | Yokoyama | |
| 7,142,847 B2 | 11/2006 | Umeda | |
| 7,202,885 B2 | 4/2007 | Motohashi | |
| 7,209,874 B2 | 4/2007 | Salmonsen | |
| 7,239,323 B2 | 7/2007 | Park | |

(56) References Cited

U.S. PATENT DOCUMENTS

| | | | |
|---|---|---|---|
| 7,248,888 B2* | 7/2007 | Inselberg | G06Q 30/02 348/E7.07 |
| 7,257,202 B2* | 8/2007 | Umemura | H04N 7/142 348/14.11 |
| 7,258,276 B2 | 8/2007 | Linton | |
| 7,286,651 B1 | 10/2007 | Packingham | |
| 7,292,588 B2 | 11/2007 | Milley | |
| 7,295,608 B2 | 11/2007 | Reynolds | |
| 7,299,009 B2 | 11/2007 | Hussmann | |
| 7,312,813 B1* | 12/2007 | Heinonen | H04L 29/06 348/158 |
| 7,349,689 B2 | 3/2008 | Chandley | |
| 7,360,085 B2* | 4/2008 | Loveria, III | G09G 5/14 713/150 |
| 7,377,440 B2 | 5/2008 | Casey | |
| 7,426,329 B2 | 9/2008 | Calhoon | |
| 7,434,166 B2 | 10/2008 | Acharya | |
| 7,480,484 B2 | 1/2009 | Nam | |
| 7,490,171 B2 | 2/2009 | Saint-Hilaire | |
| 7,505,889 B2 | 3/2009 | Salmonsen | |
| 7,561,848 B2 | 7/2009 | Chen | |
| 7,562,379 B2 | 7/2009 | Hardacker | |
| 7,574,514 B2 | 8/2009 | Deshpande | |
| 7,580,005 B1 | 8/2009 | Palin | |
| 7,596,188 B2 | 9/2009 | Gotanda | |
| 7,613,893 B2 | 11/2009 | Saint-Hilaire | |
| 7,653,344 B1 | 1/2010 | Feldman | |
| 7,653,685 B2 | 1/2010 | Serenyi | |
| 7,730,223 B1 | 6/2010 | Bavor | |
| 7,784,077 B2 | 8/2010 | Fernandez | |
| 7,797,242 B2 | 9/2010 | Gautier | |
| 7,797,633 B2 | 9/2010 | Flick | |
| 7,877,299 B2 | 1/2011 | Bui | |
| 7,892,014 B2 | 2/2011 | Amidon | |
| 7,899,492 B2* | 3/2011 | Wang | H04N 21/4122 455/556.1 |
| 7,933,290 B2 | 4/2011 | Aholainen | |
| 8,028,093 B2 | 9/2011 | Karaoguz | |
| 8,036,265 B1 | 10/2011 | Reynolds | |
| 8,050,711 B2* | 11/2011 | Wang | H04N 21/4122 455/556.1 |
| 8,082,572 B1 | 12/2011 | Tilford | |
| 8,131,208 B2 | 3/2012 | Slotznick | |
| 8,145,268 B1* | 3/2012 | Wang | H04N 21/4122 455/556.1 |
| 8,205,235 B2 | 6/2012 | Hlasney | |
| 8,224,381 B1* | 7/2012 | Wang | H04N 21/4122 455/556.1 |
| 8,321,302 B2 | 11/2012 | Bauer | |
| 8,417,290 B2* | 4/2013 | Wang | H04N 21/4122 455/556.1 |
| 8,707,373 B2 | 4/2014 | Lee | |
| 8,712,471 B2* | 4/2014 | Wang | H04N 21/4122 455/556.1 |
| 8,903,451 B2* | 12/2014 | Wang | H04N 21/4122 455/556.1 |
| 8,948,814 B1* | 2/2015 | Wang | H04N 21/4122 455/556.1 |
| 9,118,794 B2* | 8/2015 | Wang | H04N 21/4122 |
| 9,286,853 B2* | 3/2016 | Wang | H04N 21/4122 |
| 9,355,611 B1* | 5/2016 | Wang | H04N 21/4122 |
| 9,729,918 B2* | 8/2017 | Wang | H04N 21/43615 |
| 9,912,983 B2* | 3/2018 | Wang | H04N 21/43615 |
| 2001/0021998 A1 | 9/2001 | Margulis | |
| 2001/0034724 A1 | 10/2001 | Thieme | |
| 2001/0047517 A1 | 11/2001 | Christopoulos | |
| 2002/0002707 A1 | 1/2002 | Ekel | |
| 2002/0057265 A1 | 5/2002 | Tamura | |
| 2002/0066115 A1 | 5/2002 | Wendelrup | |
| 2002/0078149 A1 | 6/2002 | Chang | |
| 2002/0080091 A1 | 6/2002 | Acharya et al. | |
| 2002/0089589 A1 | 7/2002 | Adair | |
| 2002/0090980 A1* | 7/2002 | Wilcox | G06F 1/1601 455/566 |
| 2002/0092025 A1 | 7/2002 | Klumpp | |
| 2002/0094826 A1 | 7/2002 | Lee | |
| 2002/0094845 A1 | 7/2002 | Inasaka | |
| 2002/0100063 A1 | 7/2002 | Herigstad | |
| 2002/0102998 A1* | 8/2002 | Lin | H04M 1/7253 455/466 |
| 2002/0118762 A1 | 8/2002 | Shakiba | |
| 2002/0119800 A1 | 8/2002 | Jaggers | |
| 2002/0137505 A1 | 9/2002 | Eiche et al. | |
| 2002/0137551 A1 | 9/2002 | Toba | |
| 2002/0157112 A1 | 10/2002 | Kuhn | |
| 2003/0017846 A1 | 1/2003 | Estevez | |
| 2003/0027517 A1 | 2/2003 | Callway | |
| 2003/0054794 A1 | 3/2003 | Zhang | |
| 2003/0104806 A1* | 6/2003 | Ruef | H04M 1/05 455/422.1 |
| 2003/0106067 A1 | 6/2003 | Hoskins | |
| 2003/0126293 A1 | 7/2003 | Bushey | |
| 2003/0128197 A1 | 7/2003 | Turner | |
| 2003/0130009 A1* | 7/2003 | Kung | H04B 1/207 455/557 |
| 2003/0133024 A1 | 7/2003 | Ohnishi | |
| 2003/0137609 A1 | 7/2003 | Hayakawa | |
| 2003/0226149 A1 | 12/2003 | Chun | |
| 2003/0229900 A1 | 12/2003 | Reisman | |
| 2004/0033821 A1 | 2/2004 | Slesak | |
| 2004/0046783 A1 | 3/2004 | Montebovi | |
| 2004/0049797 A1 | 3/2004 | Salmonsen | |
| 2004/0056985 A1 | 3/2004 | Scong | |
| 2004/0057199 A1 | 3/2004 | Azuchi | |
| 2004/0063456 A1 | 4/2004 | Griffin | |
| 2004/0078219 A1 | 4/2004 | Kaylor | |
| 2004/0090466 A1 | 5/2004 | Loveria | |
| 2004/0098463 A1 | 5/2004 | Shen | |
| 2004/0125136 A1 | 7/2004 | Wallenius | |
| 2004/0142724 A1 | 7/2004 | Buttet | |
| 2004/0150713 A1 | 8/2004 | Cheng | |
| 2004/0157642 A1 | 8/2004 | Lee et al. | |
| 2004/0158873 A1 | 8/2004 | Pasqualino | |
| 2004/0177376 A1* | 9/2004 | Caspi | H04N 7/18 725/81 |
| 2004/0203374 A1 | 10/2004 | Zilliacus | |
| 2004/0204151 A1 | 10/2004 | Muthuswamy | |
| 2004/0207719 A1 | 10/2004 | Tervo | |
| 2004/0212731 A1* | 10/2004 | Sie | H04N 7/0122 348/445 |
| 2004/0223614 A1 | 11/2004 | Seaman | |
| 2004/0243517 A1 | 12/2004 | Hansen | |
| 2004/0252965 A1 | 12/2004 | Moreno | |
| 2004/0268408 A1 | 12/2004 | Lee | |
| 2005/0036509 A1* | 2/2005 | Acharya | H04L 63/0428 370/466 |
| 2005/0060246 A1 | 3/2005 | Lastinger | |
| 2005/0075954 A1 | 4/2005 | Matsumoto | |
| 2005/0085183 A1* | 4/2005 | Lee | H04H 20/06 455/3.01 |
| 2005/0088463 A1 | 4/2005 | Schilling | |
| 2005/0101343 A1 | 5/2005 | Hsiao | |
| 2005/0125082 A1 | 6/2005 | Hanson | |
| 2005/0136972 A1 | 6/2005 | Smith | |
| 2005/0144461 A1* | 6/2005 | Takamatsuya | G06F 21/31 713/182 |
| 2005/0144641 A1 | 6/2005 | Lewis | |
| 2005/0188407 A1 | 8/2005 | van Beek | |
| 2005/0235048 A1 | 10/2005 | Costa-Requena | |
| 2005/0264704 A1 | 12/2005 | Leinonen | |
| 2005/0289631 A1 | 12/2005 | Shoemake | |
| 2006/0001737 A1 | 1/2006 | Dawson et al. | |
| 2006/0074810 A1 | 4/2006 | Verberkt | |
| 2006/0112414 A1 | 5/2006 | Ikonen | |
| 2006/0164550 A1 | 7/2006 | Yoshimoto | |
| 2006/0218482 A1 | 9/2006 | Ralston | |
| 2007/0218837 A1 | 9/2007 | Lessing | |
| 2007/0287498 A1 | 12/2007 | Wang et al. | |
| 2008/0132859 A1 | 6/2008 | Pires | |
| 2009/0225863 A1 | 9/2009 | Perlman | |

(56) References Cited

U.S. PATENT DOCUMENTS

| | | | |
|---|---|---|---|
| 2010/0109795 | A1 | 5/2010 | Jones |
| 2011/0212687 | A1 | 9/2011 | Foster |
| 2011/0212688 | A1 | 9/2011 | Griffin |

FOREIGN PATENT DOCUMENTS

| | | | |
|---|---|---|---|
| CN | 1366758 | A | 8/2002 |
| CN | 1367564 | A | 9/2002 |
| CN | 1378133 | A | 11/2002 |
| CN | 1401195 | A | 3/2003 |
| CN | 1325592 | A | 5/2004 |
| CN | 1363173 | A | 8/2007 |
| EA | 1429511 | | 6/2004 |
| EP | 1076445 | | 2/2001 |
| EP | 1175068 | | 1/2002 |
| EP | 1307062 | | 5/2003 |
| GB | 2364478 | | 1/2002 |
| GB | 2366954 | | 3/2002 |
| GB | 2369959 | | 6/2002 |
| GB | 2383728 | | 7/2003 |
| JP | H6-113235 | | 4/1994 |
| JP | 1999-284757 | | 10/1999 |
| JP | 2001-352373 | A | 12/2001 |
| JP | 2002-101457 | | 4/2002 |
| JP | 2002-108736 | | 4/2002 |
| JP | 2002-101457 | | 12/2002 |
| JP | 2002-359670 | | 12/2002 |
| JP | 2003-023548 | | 1/2003 |
| JP | 2003-061163 | | 2/2003 |
| JP | 2003-198960 | | 7/2003 |
| JP | 2003-339041 | | 11/2003 |
| JP | 2004-064734 | | 2/2004 |
| KR | 2002-0014251 | | 2/2002 |
| KR | 20030092820 | | 12/2003 |
| KR | 10-2004-0004307 | | 1/2004 |
| KR | 20040004307 | A | 1/2004 |
| KR | 10-2004-0027996 | | 4/2004 |
| WO | WO1999010999 | | 3/1999 |
| WO | WO-1999-057900 | | 11/1999 |
| WO | WO2000018054 | | 3/2000 |
| WO | WO-2001-028235 | | 4/2001 |
| WO | WO-2001-056297 | | 8/2001 |
| WO | WO2004082284 | A1 | 11/2001 |
| WO | WO-2002-032074 | | 4/2002 |
| WO | WO-02/45424 | | 6/2002 |
| WO | WO-2002-101457 | | 12/2002 |
| WO | WO-03/077550 | | 9/2003 |
| WO | WO-2003-087961 | | 10/2003 |
| WO | WO2004025959 | | 3/2004 |
| WO | WO2004082284 | | 9/2004 |

OTHER PUBLICATIONS

Digital Display Working Group, Digital Video Interface (DVI) Spec. Rev. 1.0 (Apr. 2, 1999).
Wireless Application Protocol Forum, WAP MMS Client Transactions Version 12 (Jun. 12, 2001).
A. Bertella, et al., Mobile DVB-T Reception Quality of Streaming over IP of Audiovisual Services (Jun. 18, 2003) (SAMV00313434).
Amoolya Singh et al., Performance Evaluation of UDP Lite for Cellular Video (Jun. 26, 2001) (SAMV00315252).
Consumer Electronics Association, CES 2004, 5 Technologies to Watch, Special Supplement to CE Vision Magazine (2004) (SAMV00305036).
N. Gerfelder, H. Jung, L.M. Santos, C. Belz, Challenges to Deliver 2D/3D Content for Multimedia Applications in Mobile Environments, ACTS Mobile Communications Summit 1998, Rhodos (1998) (SAMV00313341).
Panasonic CES 2004 Keynote Presentation (Jan. 8, 2004) (SAMV00304677).
Patrick Barwise, TV, PC, or Mobile? Future Media for Consumer e-Commerce, Business Strategy Review v12, issue 1 (2001) (SAMV00376890).

Mandayam Raghunath, et al., Fostering a Symbiotic Handheld Environment, IEEE 0018-9162/03 (Sep. 2003) (SAMV00376730).
Microsoft Press Release, Microsoft Unveils New Home PC Experiences With Freestyle and Mira (Jan. 7, 2002) (SAMV00376856).
Francisco J. Gonzáles-Castaño et al., QoS Provisioning in Mobile Video Services with Satellite Sources, Proceedings of 2nd Int'l Workshop of Cost Actions (2003), at 55-59 (SAMV00313429).
Emilia Bielli, et al., A Wireless Health Outcomes Monitoring System (WHOMS): development and field testing with cancer patients using mobile phones (Jun. 15, 2004) (SAMV00313328).
Digital Entertainment in the Home, The Home Computer & Connectivity, Parks Associates (2004) (SAMV00310379).
Derek Ball, Barry Shilmover, How to Do Everything With Your iPAQ Pocket PC (Second Ed. 2003) (SAMV00404239).
Richard Han, et al., WebSplitter: A Unified XML Framework for Multi-Device Collaborative Web Browsing, CSCW (Dec. 2, 2000) ("Han, WebSplitter")(SAMV00376753).
Takayuki Warabino, Video Transcoding Proxy for 3G wireless Mobile Internet Access, IEEE 0163-6804/00 (2000) ("Warabino") (SAMV00313350).
Teresa H. Meng, Portable video-on-demand in wireless communication, 0018-9219/95 (Apr. 1995) ("Meng, Portable Video-On-Demand") (SAMV00313381).
Thai-Lai Pham, Georg Schneider, Stuart Goose, Arturo Pizano, Siemens Corporate Research, Composite Device Computing Environment: A Framework for Augmenting the PDA Using Surrounding Resources (Jun. 2000) ("Pham, Composite Device Computing Environment") (SAMV00313413).
Thai-Lai Pham, Georg Schneider, and Stuart Goose, Siemens Corporate Research, Exploiting Location-Based Composite Devices to Support and Facilitate Situated Ubiquitous Computing (2000) (SAMV00375100).
Thomas E. Truman, et al., The InfoPad Multimedia Terminal: A Portable Device for Wireless Information Access, 47 IEEE Transactions on Computers 10 (Oct. 1998) ("Truman") (SAMV00313366).
Yamauchi, A 1440X1080 Pixels 30 Frames/s Motion-JPEG2000 Codec for HD Movie Transmission, IEEE 0/7803-8267-6/04 (2004) (SAMV00313356).
Wai Yip Lum, A Context-Aware Decision Engine for Content Adaptation, Pervasive Computing, IEEE 1536-1268/02 (Sep. 2002) ("Lum, Decision Engine for Content Adaptation") (SAMV00376744).
Xueyan Tang et al., Streaming Media Caching Algorithms for Transcoding Proxies, Proceeding of the Int'l Conference on Parallel Processing (ICPP '02), 0/7695-1677-7/02 (2002) (SAMV00376881).
Ralf Schäfer et al., MPEG-4 Transmission Over Wireless Networks, Proceeding of 9th European Signal Processing Conference (EUSIPCO) (Sep. 1998), at 245-248 (SAMV00313409).
Stephan Hartwig et al., Mobile Multimedia—Challenges and Opportunities, 46 IEEE Transactions on Consumer Electronics 4 (Nov. 2000), at 1167-1178 (SAMV00313417).
Bluetooth protocol, including the protocol itself as well as all evidence of its contents, adoption, and implementation, including but not limited to the following: The Official Bluetooth Website (Aug. 1, 2003) (SAMV00377029); Blueteooth SIG, Inc.—Public Specifications (Dec. 4, 2002) (SAMV00377031); Nokia, Bluetooth Technology Overview v1.0 (Apr. 4, 2003) (SAMV00377032); Specification of the Bluetooth System v1.1, vol. 1, Core (Feb. 22, 2001) (SAMV00377056); Specification of the Bluetooth System v1.2, vol. 0, Master Table of Content & Compliance Requirements (Nov. 5, 2003) (SAMV00377140); Laura Rohde, Ericsson Demos Frist Bluetooth Phone, CNN.com (Jun. 8, 2000) (SAMV00409946).
Digital Living Network Alliance v1.0 protocol ("DLNA"), including the protocol itself as well as all evidence of its contents, adoption, and implementation, including but not limited to the following: U.S. Pat. No. 7,574,514 to Deshpande ("Deshpande '514") (SAMV00375180); Glen Stone, Prabir Mohanty, Paul Sorenson, Intel Developer Forum, DHWG HNv1 and Use Case Subcommittee Update (Feb. 2004) ("IDF 2004 DLNA Presentation") (SAMV00404191, SAMV00410148); Scott Smyers, Digital Living Network Alliance: Networking for Everyman (Oct. 2004) (SAMV00409701); Alexander Grundner, New Details: DLNA Home Networked Device Interoperability Guidelines 1.0, The Pulse (Jun. 24, 2004) (SAMV00409678); BroadBand Watch, CEATEC Japan

(56) References Cited

OTHER PUBLICATIONS 2004 (Oct. 10, 2004) (SAMV00408956, SAMV00408960); Tony Smith, Digital Home Group Touts Convergence Spec, The Register (Jun. 23, 2004) (SAMV00409517); Martyn Williams, Gadgets Getting Connected with DLNA, ARN, ComputerWorld (Oct. 14, 2004) (SAMV00409535, SAMV00409539); DHWG, Mobile Handheld Sub-Committee, Mobile Use Cases Passed for HNv1 (Oct. 18, 2003) (SAMV00410130); Use Case Proposals (Sep. 3, 2003) (SAMV00410186); Glen Stone, CEA R7.7 Wireless Entertainment Networking (Aug. 5, 2003) (SAMV00410233)

Digital Living Network Alliance v1.0 protocol ("DLNA"), including the protocol itself as well as all evidence of its contents, adoption, and implementation, including but not limited to the following: DLNA, Home Networked Device Interoperability Guidelines (2004) ("DLNA v1.0") (SAMV00299998); DLNA, Digital Home White Paper, Final Version (Jun. 2003) ("Digital Home White Paper") (SAMV00299657); DLNA, Sharing Digital Content in the Home: Introducing the Digital Home Working Group, Press Presentation (San Fran., CA) (Jun. 24, 2003) ("Sharing Digital Content") (SAMV00299645); DLNA, Sharing Digital Content in the Home: Introducing the Digital Home Working Group, Press Presentation (Tokyo, Japan) (Scott Smyers) (Oct. 7, 2003) (SAMV00410045); DLNA, Sharing Digital Content in the Home: Introducing the Digital Home Working Group, Press Presentation (Dusseldorf) (Glen Stone) (Oct. 23, 2003) (SAMV00410067); DHWG Status to CEA (Long Beach, CA) (Glen Stone) (Nov. 11, 2003) (SAMV00410090); DLNA, Sharing Digital Content in the Home: Jan. 2004 Update (Jan. 2004) (SAMV00410029); DLNA, Overview and Vision White Paper (Jun. 2004) ("Overview and Vision") (SAMV00298592); DLNA, Use Case Scenarios White Paper (Jun. 2004) ("Use Case") (SAMV00299671); DLNA, DLNA Press Release, DLNA Strides Toward Consumer-Friendly Home Networked Devices with New Interoperability Guidelines (Jun. 22, 2004) (SAMV00304502); DLNA, 17 Leading Companies Form Working Group to Simplify Sharing of Digital Content Among Consumer Electronics, PCs, and Mobile Devices (Jun. 24, 2003) (SAMV00315243); Will Lumpkins, Texas Instruments, Digital Living Network Alliance Presentation (2004) ("Lumpkins TI") (SAMV00306046); Associated Press, Tech Firms Form Alliance to Boost Home Networking, LA Times (Jun. 25, 2003) (SAMV00304777); Broadband Home Report (Jan. 22, 2004) (SAMV00305378).

Digital Living Network Alliance expanded Mar. 2006 protocol ("DLNA expanded Mar. 2006"), including the protocol itself as well as all evidence of its contents, adoption, and implementation, including but not limited to the following: DLNA, DLNA Networked Device Interoperability Guidelines (expanded Mar. 2006) (SAMV00307268); Products implementing the DLNA expanded Mar. 2006 protocol, including those described in other references in this response; Digital Entertainment Network Initiative, including the protocol itself as well as all evidence of its contents, adoption, and implementation, including but not limited to the following: U.S. Pat. No. 7,574,514 to Deshpande ("Deshpande '514") (SAMV00375180); DENi Architecture v0.03, R7.5 WG1 Standards Group (Draft CEA-#TBD) (Sep. 3, 2003) ("DENi v0.03") (SAMV00375586); (from file history of Deshpande '514 (SAMV00375624)); Products implementing the DLNA expanded March 2006 protocol, including those described in other references in this response; Digital Entertainment Network Initiative, including the protocol itself as well as all evidence of its contents, adoption, and implementation, including but not limited to the following: U.S. Pat. No. 7,574,514 to Deshpande ("Deshpande '514") (SAMV00375180); DENi Architecture v0.03, R7.5 WG1 Standards Group (Draft CEA-#TBD) (Sep. 3, 2003) ("DENi v0.03") (SAMV00375586) (from file history of Deshpande '514 (SAMV00375624)); Toby Nixon, UPnP Forum State of the Union, UPnP Forum (Sep. 30, 2003) (SAMV00373917); Broadband Home Report (Jan. 22, 2004) (SAMV00305378); CEA Adopts DENi Standard (Jul. 30, 2003) (SAMV00404978); Digital Home Networking Standard (Aug. 3, 2003) (SAMV00404981).

The High-Definition Multimedia Interface protocol ("HDMI"), including the protocol itself as well as all evidence of its contents, adoption, and implementation, including but not limited to the following: High-Definition Multimedia Interface Specification, Informational Version 1.0 (Sep. 4, 2003) (SAMV00379340); High-Definition Multimedia Interface Specification, Informational Version 1.1 (May 20, 2004) (SAMV00379391); U.S. Patent Application Publication No. 2004/0223614 to Seaman ("Seaman '614") (SAMV00313639); Anush Yegyazarian, TVs of the Future: Flat and Huge, PC World (Jan. 27, 2004) (SAMV00315249); Crutchfield Catalog (Summer 2004) (SAMV00306778, SAMV00305823, SAMV00308000, SAMV00307047); HDMI Press Release, Toshiba Enters HDMI Semiconductor Market (Dec. 15, 2003) (SAMV00403983); HDMI Press Release, JAE Introduces the DC1 Series, A New Connector Designed for HDMI (Sep. 24, 2003) (SAMV00403982); HDMI Press Release, First HDMI CE Products Hit the Market—All Using Panelink Cinema (Sep. 5, 2003) (SAMV00403980); HDMI Press Release, HDMI Connectors from Molex Provide HD Digital Link for Consumer Electronics Equipment (Jul. 25, 2003) (SAMV00403979); HDMI Press Release, Silicon Image Opens HDMI Authorized Testing Center (Jun. 26, 2003) (SAMV00403977); HDMI Press Release, Silicon Image Showcases HDMI Products From JVC, Meridian, Panasonic and Samsung (Jan. 9, 2003) (SAMV00403974); HDMI Press Release, Silicon Image Sets the Standard for Digital Consumer Electronics Interfaces with PanelLink Cinema, The World's First HDMI Transmitter and Receiver (Jan. 9, 2003) (SAMV00403972); Meridian 800 is World's First HDMI DVD-Audio/Video Player (Jan. 9, 2003) (SAMV00403999, SAMV00404003); Meridian, G91 DVD Audio Player Controller Tuner, No. G91DS v3.1 Apr. 11, 2003 RE (2003) (SAMV00403995); Meridian, G98 DVD Audio Transport, No. G98DS v3.1, Apr. 11, 2003 RE (2003) (SAMV00403997); Toshiba Press Release, Toshiba Enters HDMI Semiconductor Market with HDMI Receiver and Transmitter ICS (Dec. 15, 2003) (SAMV00404679).

Universal Plug & Play ("UPnP") protocol, including the protocol itself as well as all evidence of its contents, adoption, and implementation, including but not limited to the following: Universal Plug & Play, Connections vol. 3 (2001 Q1) ("Connections 2001 Q1") (SAMV00304736); Universal Plug & Play, Connections vol. 4 (2001 Q2) ("Connections 2001 Q2") (SAMV00304719); Universal Plug & Play, Connections vol. 5 (2001 Q4) ("Connections 2001 Q4") (SAMV00304588); Universal Plug & Play, Connections (2002 Q2) (SAMV00304652); Universal Plug & Play, Connections (2002 Q3) ("Connections 2002 Q3") (SAMV00299703); UPnP, Networking Made Easy, PC Magazine (Sep. 16, 2003) ("Networking Made Easy") (SAMV00304951); Microsoft Windows Me Millennium Edition: Understanding Universal Plug and Play, White Paper (Jun. 2000) ("MS Windows White Paper") (SAMV00305390); S.K. Tso, An Intelligent Networking and Automation System for Home and SOHO Environments (Jun. 10-12, 2003), IEEE 0-7803-7777-X/03 ("Tso") (SAMV00305031); Hanford Choy and Axel Fuchs, Developing Innovative Devices Using Universal Plug and Play (UPnP), SimpleDevices (2004) ("Innovative UPnP SimpleDevices") (SAMV00304487); Michael Jeronimo, It Just Works: UPnP in the Digital Home, The Journal of Spontaneous Networking (Oct. 5, 2004) ("UPnP It Just Works") (SAMV00305114); G. Schneider, Hoymann, S. Goose, Siemens Corporate Research, Adhoc Personal Ubiquitous Multimedia Services via UPnP (2001), IEEE 0-7695-1198-8/01 ("Schneider") (SAMV00299641, SAMV00315237, SAMV00315234); Intel, Designing a UPnP AV MediaServerv1.00 (Jul. 31, 2003) ("Intel UPnP MediaServer v1.00") (SAMV00311149); Intel, Overview of UPnP AV Architecture v1.00 (Jul. 2, 2003) ("Intel UPnP AV Architecture v1.00") (SAMV00311149); Internet Archive, Intel Software for UPnP Technology (Jun. 20, 2004) ("Intel UPnP Software") (SAMV00311207); Michael Jeronimo and Jack Weast, UPnP Design By Example, Intel Press (Apr. 2003), including the accompanying CD-ROM ("Jeronimo, Design By Example") (SAMV00313038, SAMV00311287-SAMV00312840); Intel Technical Journal, vol. 6, Issue 4 (Nov. 15, 2002) ("Intel Tech. Journal v6") (SAMV00311209); CyberLink Press Release, CyberLink Reveals UPnP-Compliant Home Entertainment Applications, PowerCinema, at Intel Developer Forum (Apr. 12, 2004)

(56) References Cited

OTHER PUBLICATIONS (SAMV00304481); Michael Jeronimo and Jack Weast, Intel Universal Plug & Play—The Foundation of the Digital Home (Jun. 4, 2003) ("UPnP Foundation") (SAMV00375063); U.S. Pat. No. 7,574,514 to Deshpande ("Deshpande '514") (SAMV00375180); Universal Plug and Play Device Architecture v1.0 (Jun. 8, 2000) (SAMV00375586) (from file history of Deshpande '514 (SAMV00375624)); Toby Nixon, UPnP Forum State of the Union, UPnP Forum (Sep. 30, 2003) (SAMV00373917).
802.11, including the protocols themselves as well as all evidence of their contents, adoption, and implementation, including but not limited to the following: Wireless LAN Medium Access Control (MAC) and Physical Layer (PHY) Specifications, ANSI/IEEE Std. 802.11, 1999 Edition, IEEE Computer Society, LAN/MAN Standards Committee (Aug. 20, 1999) (SAMV00408989).
Apple Airport Express product, including the product itself as well as all evidence of its release, operation, and functionality, including but not limited to the following: Apple Pumps Music Through Air, WIRED Magazine (Jun. 7, 2004) (SAMV00304775).
Denon NS-S100 Network Multimedia Server, including the product itself as well as all evidence of its release, operation, and functionality, including but not limited to the following: Internet Archive, TechTV's Best of CES 2004 Winners (Apr. 2, 2004) (SAMV00310440); Broadband Home Report (Jan. 22, 2004) (SAMV00305378); Popular Science (Mar. 2004) (SAMV00310431).
Digital 5 Netplay Family products, including the products themselves as well as all evidence of their release, operation, and functionality, including but not limited to the following: D2730 Networked DVD Player to Begin Shipping Throughout the U.S. on Jul. 14 (Oct. 10, 2003) (SAMV00409953); Digital 5 Announces the Future of Streaming Multimedia Connectivity with Netmedia (Jan. 4, 2002) (SAMV00409958); Digital 5, Netplay AV (Jun. 10, 2003) (SAMV00409956); Digital 5, Netplay Family (Jun. 2003) (SAMV00409951); Digital 5, Netplay DVD (Jun. 2003) (SAMV00409949); Digital 5 to Support Intel NMPR Development Guidelines (Apr. 22, 2004) (SAMV00409960).
D-Link DSM-320 Wireless Media Player ("D-Link DSM-320"), including the product itself as well as all evidence of its release, operation, and functionality, including but not limited to the following: Internet Archive, D-Link, DSM-320 MediaLounge High Speed 2.4 GHz (802.11g) Wireless Media Player (Jun. 4, 2004) (SAMV00304498); Internet Archive, D-Link, DSM-320 MediaLounge High Speed 2.4 GHz (802.11g) Wireless Media Player, Diagram (Jun. 4, 2004) (SAMV00304496); Internet Archive, D-Link, DSM-320 MediaLounge High Speed 2.4 GHz (802.11g) Wireless Media Player, Specifications (Jun. 4, 2004) (SAMV00304483); Internet Archive, D-Link, DSM-320 MediaLounge High Speed 2.4 GHz (802.11g) Wireless Media Player, Photo, Music, Video (Jun. 4, 2004) (SAMV00304516); Internet Archive, D-Link, DSM-320 MediaLounge High Speed 2.4 GHz (802.11g) Wireless Media Player, Product Features and Product Description (Jun. 5, 2004) (SAMV00304499); D-Link Media Lounge Is Now Streaming, PC Magazine (Nov. 16, 2004) ("D-Link Now Streaming") (SAMV00305093); MediaLounge Entertainment Network D-Link DSM-320 Wireless Media Player Manual v1.0 (2002) ("DSM-320 v1.0 Manual") (SAMV00374903).
Elgato EyeHome, including the product itself as well as all evidence of its release, operation, and functionality, including but not limited to the following: Elgato EyeHome Review, Macworld (Jul. 2004) (SAMV00310589); Internet Archive, Elgato EyeHome (Jul. 1, 2004) (SAMV00304472); Internet Archive, Elgato EyeHome Review (Mar. 4, 2004)(SAMV00304440).
HDTV, including the protocol itself as well as all evidence of its contents, adoption, and implementation, including but not limited to the following: Congressional Budget Office, Completing the Transition to Digital Television (Sep. 1999) (SAMV00374127); FCC Advisory Committee on Advanced Television Service, Final Report (Nov. 28, 1995) (SAMV00374185); FCC Advisory Committee on Advanced Television Service, Final Technical Report (Oct. 31, 1995) (SAMV00374220); The US HDTV Standard, The Grand, IEEE Spectrum 0018-9235/95 (Apr. 1995) (SAMV00374462).
Hewlett-Packard Pocket PC and iPAQ devices, including the products themselves as well as all evidence of their release, operation, and functionality, including but not limited to the following: Compaq iPAQ Pocket PC H3600 Series, QuickSpecs version 22 (Aug. 8, 2002) (SAMV00409548); Compaq iPAQ Pocket PC H3800 Series, QuickSpecs version 14 (May 16, 2002) (SAMV00409671); Compaq iPAW Pocket PC H3800 Series, Reference Guide, First Edition (Sep. 2001) (SAMV00409555).
Hewlett-Packard Digital Media Receiver 5000, including the product itself as well as all evidence of its release, operation, and functionality, including but not limited to the following: HP Wireless Digital Media Receiver ew5000, PC Magazine (Jul. 1, 2003) (SAMV00310591).
Hewlett-Packard x5400 Media Center Extender ("HP Media Center x5400"), including the product itself as well as all evidence of its release, operation, and functionality, including but not limited to the following: Sharing Pictures, Music, and Videos on Windows Media Center Extender (2004) ("x5400, Sharing Videos") (SAMV00304422); HP Media Center Extender, Networking, 5991-1345 (2004) (SAMV00305234); HP Media Center Extender Quick Start Guide, 5991-1355 (2004) ("x5400 QSG") (SAMV00305226); HP Media Center Extender, User's Guide/Warranty and Support Guide, 5991-1356 (2004) ("x5400 User Guide") (SAMV00304543); Forward Thinking, Microsoft's Growing Family, PC Magazine ("Forward Thinking") (Nov. 16, 2004) (SAMV00310416); A Near-Perfect Add-On, PC Magazine (Nov. 16, 2004) ("Near-Perfect Add-On") (SAMV00310416); HP Media Center Extenderx5400 Fact Sheet (Dec. 13, 2005) ("x5400 Fact Sheet") (SAMV00315065); HP x5400 Media Center Extender Datasheet (Jan. 8, 2006) ("x5400 Datasheet") (SAMV00315062)
IA Style Inc. software, including IA Style Presentation Pack, IA Presenter, and IA Screen Mirror, including the software itself as well as all evidence of its release, operation, functionality, and implementation on devices, including but not limited to the following: Internet Archive, IA Presenter, HPC.net (Jun. 9, 2003) (SAMV00403756); IAPresenter201EN.zip from Internet Archive, IA Presenter, HPC.net (Jun. 9, 2003) (SAMV00404190); IA Style Software Will Be Bundled With ATI's IMAGEON 100, PocketNow.com (Jul. 3, 2002) (SAMV00403757); Leigh Geary, IA Style Moves Home, Cool Smartphone (Jan. 16, 2004) (SAMV00409543).
Products implementing the IA Style Inc. software, including those referenced elsewhere in this response.
Intel Networked Media Product Requirements ("Intel NMPR"), including the protocol itself as well as all evidence of its contents, adoption, and implementation, including but not limited to the following: Michael Jeronimo, It Just Works: UPnP in the Digital Home, The Journal of Spontaneous Networking (Oct. 5, 2004) ("UPnP It Just Works") (SAMV00305114); CyberLink Press Release, CyberLink Reveals UPnP-Compliant Home Entertainment Applications, PowerCinema, at Intel Developer Forum (Apr. 12, 2004) (SAMV00304481); Internet Archive, Mediabolic, First Digital Home Compliant Product Now Commercially Available From Mediabolic (Feb. 17, 2004) ("Mediabolic NMPR") (SAMV00315209); U.S. Pat. No. 7,613,893 to Saint-Hilaire (SAMV00374060); Intel, Designing a UPnP AV MediaServer v1.00 (Jul. 31, 2003) ("Intel UPnP MediaServer v1.00") (SAMV00311149); Intel, Overview of UPnP AV Architecture v1.00 (Jul. 2, 2003) ("Intel UPnP AV Architecture v1.00") (SAMV00311197); Internet Archive, Intel Software for UPnP Technology (Jun. 20, 2004) ("Intel UPnP Software") (SAMV00311207); Michael Jeronimo and Jack Weast, UPnP Design by Example, Intel Press (Apr. 2003), including the accompanying CD-ROM ("Jeronimo, Design by Example") (SAMV00313038, SAMV00311287-SAMV00312840); Intel Technical Journal, vol. 6, Issue 4 (Nov. 15, 2002) ("Intel Tech. Journal v6") (SAMV00311209); Michael Jeronimo and Jack Weast, Intel Universal Plug & Play—The Foundation of the Digital Home (Jun. 4, 2003) ("UPnP Foundation") (SAMV00375063); Intel Technical Briefing, Building Digital Media Adapters to Extend the PC (2002) ("Intel Building Digital Media Adapters") (SAMV00375018); Intel Building Blocks for Digital Home Solutions (Sep. 19, 2003) ("Intel Building Blocks") (SAMV00374985); Product Brief, Intel Vision for the Digital Home

(56) References Cited

OTHER PUBLICATIONS (Sep. 19, 2003) (SAMV00375054); Intel, Digital Home FAQs—PC Platform (Jul. 3, 2003) (SAMV00375022) Intel, Digital Home FAQs General (Jul. 3, 2003) (SAMV00375020); Intel News Release, Intel's Digital Home Vision Moves Closer to Reality with New Industry Enabling Building Blocks (Feb. 19, 2003) (SAMV00375051); Intel, Research Shows the Digital Home is Taking Off and the PC is Ready to Distribute Digital Media Throughout the Home (Jul. 4, 2003) (SAMV00375039); Intel Product Brief, Digital Home Intelligent Centers (Jul. 3, 2003) ("Digital Home Intelligent Centers") (SAMV00375024); Intel Product Brief, The Path to Interoperability in the Digital Home (Jul. 3, 2003) ("Path to Interoperability") (SAMV00375041); Internet Archive, Frequently Asked Questions about Intel Developer Network for the Digital Home (Oct. 5, 2003) ("Developer Network FAQs") (SAMV00375069); Intel, Industry Leaders Develop First Standards-Based Products Enabling Premium Content For The Digital Home (Sep. 8, 2004) (SAMV00375026, SAMV00409546).
Lifeview FlyJacket and/or FlyPresenter, including the products and/or softwareas well as all evidence of their release, operation, and functionality, including but not limited to the following: Internet Archive, Lifeview.com FlyPresenter-CF (Aug. 12, 2003) (SAMV00403986); Internet Archive, Tong Zhang, Presentation Cards for Your Pocket PC, MobileTechReview (Jun. 2003) (SAMV00403990); U.S. Pat. No. 6,555,995 to Shih ("Shih '995") (SAMV00403953); U.S. Pat. No. 7,102,591 to Shih ("Shih '591") (SAMV00403962); LifeView Video-Out Video (Aug. 8, 2003) (SAMV00403994); Internet Archive, FlyJacket i3800 Key Features (Apr. 15, 2003) (SAMV00404684); FlyJacket i3800 User's Guide v1.1 (Dec. 2001) ("FlyJacket v1 .1") (SAMV00409519).
Linksys WPG-54G Wireless G Presentation Player ("Linksys WPG-54G"), including the product itself as well as all evidence of its release, operation, and functionality, including but not limited to the following: Linksys, WPG54G Product Data, WPG54G-DS-40218NC-BW (2004) ("Linksys Data Sheet") (SAMV00304602); Linksys, WPG54G User Guide, wpgS4g-ug-31224NC BW (2004) ("Linksys User Guide") (SAMV00305990); Linksys, WPG54G Quick Installation (2003) ("Linksys Quick Installation Guide") (SAMV00304799); Internet Archive, Wireless-G Presentation Player (Jun. 12, 2004) ("Linksys WPG54G Website") (SAMV00304485); Broadband Home Report (Jan. 22, 2004) (SAMV00305378); Internet Archive, Intel Connecting Consumers in the Digital Home (Oct. 3, 2003) (SAMV00375057).
Margi Presenter-to-Go Modules and Cards, including the products themselves as well as all evidence of their release, operation, and functionality, including but not limited to the following: Margi, Presenter-to-Go Documentation (Oct. 11, 2003) (SAMV00404698); Margi, Presenter-to-Go Feature Comparison (Oct. 4, 2003) (SAMV00404700); Margi Presenter-to-Go Springboard Module for Handspring Visor Handhelds (Jun. 19, 2001) (SAMV00404690); Margi Presenter-to-Go CompactFlash Card (Oct. 28, 2002) (SAMV00404692); Margi Presenter-to-Go Secure Digital Card (Aug. 1, 2002) (SAMV00404694); Margi Presenter-to-Go for Memory Stick (Sep. 6, 2002) (SAMV00404696); Presenter-to-Go Secure Digital (SD) & Memory Stick (MS) User's Guide (2002) (SAMV00404702); Presenter-to-Go Springboard Module User's Guide (2001) (SAMV00404794); Presenter-to-Go PC Card & CF Card User's Guide (2001) (SAMV00404836); Presenter-to-Go, Quick Start Tutorial (2001) (SAMV00404874); Presenter-to-Go, Quick Start Tutorials (2002) (SAMV00404904, SAMV00404922, SAMV00404947); Margi Systems Brings Wireless Functionality to New Line of HP Digital Projectors (Sep. 23, 2003) (SAMV00404966).
Mediabolic One, including the product itself as well as all evidence of its release, operation, and functionality, including but not limited to the following: Internet Archive, Mediabolic Networked A/V Receiver (Apr. 22, 2004) ("Networked A/V Receiver") (SAMV00310595); Internet Archive, Mediabolic Releases the "Mediabolic One Convergence Platform" (Apr. 23, 2001) ("Convergence Platform") (SAMV00315213); Broadband Home Report (Jan. 22, 2004) (SAMV00305378); HP Wireless Digital Media Receiver ew5000, PC Magazine (Jul. 1, 2003) (SAMV00310591); Internet Archive, Mediabolic, First Digital Home Compliant Product Now Commercially Available From Mediabolic (Feb. 17, 2004) ("Mediabolic NMPR") (SAMV00315209).
Microsoft Xbox, including the product itself as well as all evidence of its release, operation, and functionality, including but not limited to the following: Television Show, The Screen Savers (Jul. 12, 2004) (SAMV00310442); Popular Science (Mar. 2004) (SAMV00310431).
Microsoft Windows Media Center Extender, including the product itself as well as all evidence of its release, operation, and functionality.
MobiTV, including the product itself as well as all evidence of its release, operation, and functionality, including but not limited to the following: Daniel Tynan, Cool Your Gadget Fever, PC World, (Jan. 2004) (SAMV00375096); Gary Krakow, Streaming TV On Your Cell Phone, MobiTV Provides News, Sports On A Postage-Stamp Sized Screen (Oct. 22, 2004) (SAMV00305200); TV TO Go. Kinda., Popular Science (Feb. 2004) (SAMV00310427).
Novatel Wireless Minstrel Products, including the products themselves as well as all evidence of their release, operation, and functionality, including but not limited to the following: Novatel Wireless, Handheld Modems (Oct. 4, 2003) (SAMV00404976); Novatel Wireless Minstrel 540, Wireless Modem forthe HP Jornada 540 Series Pocket PC (2000) (SAMV00404968); Novatel Wireless Minstrel III, Wireless Internet Solution for the Palm Computing (2000) (SAMV00404970); Novatel Wireless Minstrel V, Wireless Internet Solution for the Palm Computing Platform (2000) (SAMV00404972); Novatel Wireless Minstrel S, Wireless Springboard Modem for Handspring Visor (2000) (SAMV00404974).
OQO uPC, including the product itself as well as all evidence of its release, operation, and functionality, including but not limited to the following: A Computer In Your Pocket, PC Magazine (Nov. 16, 2004) (SAMV00310416); Popular Science (Mar. 2004) SAMV00310431.
Philips Streamium sl400i, including the product itself as well as all evidence of its release, operation, and functionality, including but not limited to the following: Internet Archive, SimpleDevices, Product Showcase: Philips Streamium (Apr. 13, 2004) ("Philips/SimpleDevices") (SAMV00304410); Philips, Wifi Wireless Multimedia Link SL400i, Booklet (Feb. 4, 2004) ("SL400i Booklet") (SAMV00310619); Philips Wireless Multimedia Receiver SL400i All Versions Service Manual v1.0 (2004) ("SL400i Service Manual") (SAMV00310783); Philips Annual Report 2004 (SAMV00310823); Philips Annual Review 2004 (SAMV00311042); Internet Archive, Philips, PC Link (Dec. 6, 2003) ("PC Link Site") (SAMV00311144); Internet Archive, Philips, PC Link FAQ (Dec. 20, 2003) ("PC Link FAQ") (SAMV00311143); Internet Archive, Philips, Streamium Requirements (Jul. 20, 2004) ("Streamium Requirements") (SAMV00311145); Internet Archive, Philips, Streamium Specifications (Jul. 20, 2004) ("Streamium Specifications") (SAMV00311147).
Philips Streamium mx6000i, including the product itself as well as all evidence of its release, operation, and functionality, including but not limited to the following: Philips MXGOOOi User Guide (2004) (SAMV00305825); Philips MX6000i Product Literature (2004) (SAMV00304673); Philips MXGOOOi Quick Use Guide, EL6572E002 (2004) (SAMV00305215); Internet Archive, Philips Streamium MX6000i (Jun. 16, 2004) (SAMV00304564).
Pinnacle Systems ShowCenter, including the product itself as well as all evidence of its release, operation, and functionality, including but not limited to the following: Digital Entertainment in the Home, The Home Computer & Connectivity, Parks Associates (2004) (SAMV00310379).
Pinnacle MediaCenter, including the product itself as well as all evidence of its release, operation, and functionality, including but not limited to the following: Pinnacle Systems Advertisement, PC Magazine (Oct. 19, 2004) (SAM V00310421); Digital Entertainment in the Home, The Home Computer & Connectivity, Parks Associates (2004) (SAMV00310379).
PRISMIQ Media Player, including the product itself as well as all evidence of its release, operation, and functionality, including but not limited to the following: Michael Antonoff, Convergence, Sound & Vision Magazine (Apr. 2004) (SAMV00310436); Popular

(56) References Cited

OTHER PUBLICATIONS

Science (Mar. 2004) (SAMV00310431); Broadband Home Report (Jan. 22, 2004) (SAMV00305378); PRISMIQ Unveils the Future of Networked Home Entertainment with the Release of the PRISMIQ MediaPlayer (Jan. 6, 2003) (SAMV00376879).
Rockford OmniFi, including the product itself as well as all evidence of its release, operation, and functionality, including but not limited to the following: Internet Archive, SimpleDevices Product Showcase (Apr. 14, 2004) ("SD Showcase") (SAMV00304414); SimpleDevices Releases New Version of its Software, SimpleWare 2.0 (Jan. 9, 2002) ("SimpleWare 2.0") (SAMV00304415); Broadband Home Report (Jan. 22, 2004) (SAMV00305378); Hanford Choy and Axel Fuchs, Developing Innovative Devices Using Universal Plug and Play (UPnP), SimpleDevices (2004) ("Innovative UPnP SimpleDevices") (SAMV00304487); Joris Evers, RealNetworks Promotes Online Music Service Through More Hardware PC World (Nov. 10, 2003) (SAMV00304615).
Fosgate Audionics FAP-S1 Digital Media Streamer, including the product itself as well as all evidence of its release, operation, and functionality, including but not limited to the following: Michael Antonoff, Convergence, Sound & Vision Magazine (Apr. 2004) (SAMV00310436).
Roku Labs HD1000, including the product itself as well as all evidence of its release, operation, and functionality, including but not limited to the following: Advertisement, Sound & Vision Magazine (Apr. 2004) (SAMV00310436); Broadband Home Report (Jan. 22, 2004) (SAMV00305378); Popular Science (Mar. 2004) (SAMV00310431); Digital Entertainment in the Home, The Home Computer & Connectivity, Parks Associates (2004) (SAMV00310379); Roku HD1000 Specifications (Sep. 25, 2003) (SAMV00373964); Roku HD1000 User Guide (2003) (SAMV00409680); Roku HD1000 User Guide v1.5 (Jan. 2004) (SAMV00373968); Roku HD1000 User Guide v1.5.18 (Apr. 2004) (SAMV00373999); Internet Archive, Roku HD1000 Tech Specs (Oct. 2, 2003) (SAMV00373957); Popular Science Mar. 2004 SAMV00375114.
Sierra Wireless Air Card products, including the products themselves as well as all evidence of their release, operation, and functionality, including but not limited to the following: Sierra Wireless, AirCard 300 User Guide for Windows CE, Rev. 2.0 (Jul. 1999) (SAMV00404983); Sierra Wireless, AirCard 300 User Guide for Notebooks, Rev. 3.0 (Apr. 2000) (SAMV00405005); Sierra Wireless, AirCard 300 for Windows, Getting Started, Rev. 1.0 (Aug. 1999) (SAMV00405084); Sierra Wireless, AirCard 555 Wireless Network Card, Installation Guide, Rev. 4.0 (May 2003) (SAMV00405085); Sierra Wireless, What's New, AirCard 555 for Verizon Wireless, Rev.1.3A (2003) (SAMV00405149); Internet Archive, Sierra Wireless, Sierra Wireless AirCard 710 Frequently Asked Questions (Nov. 24, 2003) (SAMV00405150).
SimpleDevices SimpleWare, SimpleServer, and SimpleFi, including the products themselves as well as all evidence of their release, operation, and functionality, including but not limited to the following: SimpleDevices Releases New Version of its Software, SimpleWare 2.0 (Jan. 9, 2002) ("SimpleWare 2.0") (SAMV00304415); Internet Archive, SimpleWare Software Technologies (Jul. 10, 2004) ("SD SimpleWare") (SAMV00304420); Internet Archive, About SimpleDevices, Inc. (May 1, 2004) ("About SimpleDevices") (SAMV00304405); Internet Archive, SimpleCenter (May 2, 2004) ("SimpleCenter") (SAMV00304436); Internet Archive, SimpleDevices Has Developed A Flexible, Standards-Based Media Server Software Development Kit That Transforms A Gateway Device Into An Intelligent And Powerful Media Server (Apr. 13, 2004) ("SD Media Server") (SAMV00304412); Internet Archive, A complete implementation of the Universal Plug and Play Standard for networked devices (May 2, 2004) ("SD UPnP Implementation") (SAMV00304413); Fuchs, A. and Choy, H., End to End Content Delivery Using UPnP and WiFi Networking, SimpleDevices (Jan. 10, 2004) ("Fuchs, SD Content Delivery") (SAMV00304604); Duffy Hayes, Innovative Devices for the Home and Car to Free Your MP3s, Broadband Business (Dec. 1, 2001), at 53 ("Hayes") (SAMV00310596); Internet Archive, SimpleDevices Product Solutions (Apr. 14, 2004) ("SimpleDevice Products") (SAMV00304406); Internet Archive, Solutions for Content Providers (Apr. 13, 2004) ("SD Content Providers") (SAMV00304419); Internet Archive, Solutions for Internet Service Providers (Apr. 13, 2004) ("SD ISP") (SAMV00304408); Internet Archive, Home Entertainment Solutions (Apr. 13, 2004) ("SD Home Entertainment") (SAMV00304418); Internet Archive, Network Gateway Solutions (Apr. 13, 2004) ("SD Network Gateway") (SAMV00304409); Internet Archive, Set-Top Solutions (Apr. 13, 2004) ("SD Set-Top") (SAMV00304407); Internet Archive, SimpleDevices Product Showcase (Apr. 14, 2004) ("SD Showcase") (SAMV00304414).
SnapStream Firefly and SnapStream Beyond TV 3, including the product itself as well as all evidence of its release, operation, and functionality, including but not limited to the following: Media Servers, PC Magazine (Sep. 21, 2004) (SAMV00310423); Jim Heid, Technology, Gear, Desktop Tube, TV Tuner Hardware Transforms Personal Computers Into Television and Video Recorders, LA Times (Feb. 18, 2002) (SAMV00310617).
Sony LocationFree TV, including the product itself as well as all evidence of its release, operation, and functionality, including but not limited to the following: John P. Falcone, Sony's Subdued CES Lineup, CNET (Jan. 9, 2004) (SAMV00304600); Suzanne Kantra Kirschner, Portable TV's Get Smart, Popular Science (May 2004) (SAMV00310425); Suzanne Kantra Kirschner, Cutting The Cord, Popular Science (Mar. 2004) (SAMV00313031).
Sony RoomLink, including the product itself as well as all evidence of its release, operation, and functionality, including but not limited to the following: Portable TVs Get Smart, Popular Science (May 2004) (SAMV00310425); CNET, CES 2004: CNET Covers the Show: Sony's Subdued CES Lineup (Jan. 9, 2004) (SAMV00304600); This Year's Top Gadget Show Sees A Battle To Emerge As Master Of The Living Room Universe, San Fran. Chronicle (Jan. 13, 2003) (SAMV00304658); Internet Archive, Home Networks: A Couch Potato's Dream (Apr. 18, 2003) ("Couch Potato's Dream") (SAMV00315231).
SMC WMR-AG EZ-Stream Universal Wireless Multimedia Receiver, including the product itself as well as all evidence of its release, operation, and functionality, including but not limited to the following: Broadband Home Report (Jan. 22, 2004) (SAMV00305378).
Sprint/Growell PCS Connection Card CF2031, including the product itself as well as all evidence of its release, operation, and functionality, including but not limited to the following: Sprint User's Guide, PCS Connection Card, Model: CF2031 (2002) (SAMV00404019); Toshiba Pocket PC Insert for PCS Connection Card CF2031 by Growell and Sprint, No. TOP2031-01 (2003) ("PCS CF2031 Connection Card") (SAMV00403225); PCS Connection Card CF2031, FAQ and Issues (Oct. 8, 2003) (SAMV00404010); Internet Archive, CF2031 PCS Connection Card by Growell (Nov. 19, 2003) (SAMV00404017) OceanLake Offers Wireless Products Over Sprint Network (Feb. 17, 2003) (SAMV00410000).
Toshiba Pocket PC e800/e805, including the product itself as well as all evidence of its release, operation, and functionality, including but not limited to the following: Toshiba Pocket PC e800/e805 User's Guide, First Edition Enormous Volumes of Features and Power (Jul. 29, 2002) (SAMV00409962); Roger Gann, Toshiba e740: A Pocket PC Packed with Unique Features That Make It Stand out from the Crowd (Nov. 1, 2002) (SAMV00409966); Roger Gann, Web-Enabled PDAs: Want to Put the Internet In Your Pocket? We Test Five Handhelds Which Can (Dec. 1, 2003) (SAMV00409969); Jack Schonfield, Super PDA Could Replace the PDA, Computer Weekly (Jul. 25, 2002) (SAMV00409981); Pocket PC Products and Accessores, The Student's Best Friend (Jun. 24, 2002) (SAMV00409983); Toshiba Pocket PC Incorporates Intersil WLAN Technology (Sep. 1, 2002) (SAMV00409988); Toshiba Launches the First Handheld PC with Integrated Wireless Connectivity (Jun. 24, 2002) (SAMV00409994); Ocean Lake Offers Wireless Products Over Sprint Network (Feb. 17, 2003) (SAMV00410000); Toshiba Pocket PC, A True Vision, Wireless Ethernet A Breeze (Sep. 24, 2002) (SAMV00410005).
Toshiba Wireless Data Projectors, including but not limited to TLP-T720, TLP-T721, TLP-T620, TLP-T621, TLP-T520, TLP-T521, TLP-T520E, TLP-T521E, TLP-S220, and TLP-S221, includ-

(56) References Cited

OTHER PUBLICATIONS ing the products themselves as well as all evidence of their release, operation, and functionality, including but not limited to the following: Toshiba 3LCD Data Projector Owner's Manual (2000).
DLNA networked device interroperability guidelines, vol. 1: architectures and protocols, expanded: Oct. 2006.
UPnP forum, UPnP certification testing, vol. V Fourth Quarter 2001.
Sandy and dave's report on the broadband home; Broadband home report: Jan. 22, 2004 issue.
Advisory committee final report and recommendation; federal communications commission, advisory committee on advanced television service, Nov. 28, 1995.
UPnP enables business opportunities, Salim AbiEzzi, Universal plug and play connections, vol. IV, second quarter 2001.
The UPnP forum is a means to an end, Salim AbiEzzi, Universal plug and play connections, vol. III, first quarter 2001.
Exploiting location-based composite devices to support and facilitate situated ubiquitous computing, Thai-Lai Pham, Georg Schneider, and Stuart Goose, P. Thomas and H-W Gellerson(Eds.) HUC2000, LNCS 1927, pp. 143-156, 2000, springer-verlag berlin hcidolberg 2000.
Connection Manager:1; service Template Version 1.01; for universal plug and play version 1.0; status: standardized DCP; Jun. 25, 2002.
Universal plug & play connections, vol. 1 3rd quarter 2000.
Scanner:1.0 device template version 1.01 for universal plug and play version 1.0; status: standardized DCP, Sep. 11, 2002.
Euro-Par 2003 Parallel Processing, 9th international Euro-Par conference, Klagenfurt, Austria, Aug. 2003 Proceedings.
Innovative devices for the home and car to free your MP3s! CED Dec. 1 2001, LexisNexis, Dec. 1, 2001.
HDMI events & press.
HP Wireless digital media receiver ew5000; the HP wireless digital media receiver ew50000 is easy to set up, fairly easy to use, and surpassed only by the prismiq mediaplayer in features, PC magazine J, LexisNexis Jul. 1, 2003.
Final Technical Report, FCC Advisory Committee on Advanced Television Service, Oct. 31, 1995.
Mediabolic releases its convergence platform at connections 2001, May 3, 2001, Mediabolic, Inc. >Press&Events.
Toshiba Updates Pocket PCs, by Tom Krazit, Oct. 23, 2003, Phones (/category/phones).
Media distribution: the next compelling scenario for home networks; Salim Abiezzi, UPnP newsletter, third quarter, 2002.
It just works:UPnP in the digital home by Michael Jeronimo, Oct. 5, 2004; escalate software.
Basic:1.0 Device definition version 1.0; for universal plug and play version 1.0 Dec. 12, 2002; UPnP basic: device template version 1.01.
PC Magazine, Oct. 19, 2004.
Pocket PC connection manager update, Internet Archive Waybackmachine, Nov. 19, 2003.
Get yourself connected, Macworld, Jul. 2004.
PC magazine, Sep. 21, 2004.
Mediabolic announces support for universal plug and play (UPnP) to enable networked entertainment products. Nov. 6, 2001, Internet Archive Waybackmachine.
Popular science, Feb 2004.
MediaRenderer:1 device template version 1.01 Jun. 25, 2002.
Overview of UPnP AV architecture, a digital media distribution technology for the home, Research and development at Intel, version 1.00, Jul. 2, 2003.
AVTransport:1 service template version 1.01, Jun. 25, 2002.
Intel's Upnp tools package; Intel copyright 2002.
Intel, Internet Archive Waybackmachine, Oct. 3, 2003.
Media server:1 device template version 1.01, Jun. 25, 2002.
IEEE explore digital library, adhoc personal ubiquitous multimedia services via upnp, multimedia and expo, 2001.

Intel News Release, Intel, industry leaders develop first standards-based products enabling premium content for the digital home, Sep. 8, 2004.
Popular science journey to the 10th dimension, Mar. 2004
High-Definition Multimedia Interface Specification, Informational Version 1.0 (Sep. 4, 2003) (SAMV00379340); High-Definition Multimedia Interface Specification, Informational Version 1.1 (May 20, 2004) (SAMV00379391); Anush Yegyazarian, TVs of the Future: Flat and Huge, PC World (Jan. 27, 2004) (SAMV00315249); Crutchfield Catalog (Summer 2004) (SAMV00306778, SAMV00305823, SAMV00308000, SAMV00307047).
Sprint User's Guide, PCS Connection Card, Model: CF2031 (2002) (SAMV00404019); Toshiba Pocket PC Insert for PCS Connection Card CF2031 by Growell and Sprint, No. TOP2031-01 (2003) ("PCS CF2031 Connection Card") (SAMV00403225); PCS Connection Card CF2031, FAQ and Issues (Oct. 8, 2003) (SAMV00404010); Internet Archive, CF2031 PCS Connection Card by Growell (Nov. 19, 2003) (SAMV00404017).
Toshiba Pocket PC e800/e805 User's Guide, First Edition (Sep. 2003) ("e800/e805 User's Guide") (SAMV00402925); Toshiba Pocket PC e800/e805 Quick Guide, First Edition (Sep. 2003) ("e800/e805 Quick Guide") (SAMV00403260); Toshiba Pocket PC e800/e805, Quick Start and Quick Tour, Nos. C1894-1, HF62D0T0000 (2003) ("e800/e805 Quick Start and Quick Tour") (SAMV00403332); Toshiba Pocket PC e800/e805 Accessories Insert, No. A622-1 (Oct. 2003) ("e800/e805 Accessories Insert") (SAMV00403207); Toshiba Important Information Literature, No. C1927-1 (2003) (SAMV00403218); Toshiba Pocket PC Insert for PCS Connection Card CF2031 by Growell and Sprint, No. TOP2031-01 (2003) ("PCS CF2031 Connection Card") (SAMV00403225); Toshiba Announces Two New Pocket PC's—e400/405 and the e800/805, Brighthand (Oct. 23, 2003) ("Brighthand") (SAMV00403759).
Memo ISO Mtn to Dismiss, 1:16-cv-00861 (LO-MSN) Plaintiff *Virginia Innovation Sciences, Inc.* vs. *Amazon.com Inc.* IPR2017-00870 to 00879, trial instituted documents; Response in Opp re [21] Motion to Dismiss, 1:16-cv-00861 (LO-MSN) Plaintiff *Virginia Innovation Sciences, Inc.* vs. *Amazon.com Inc.* Def_s Reply in Support of its Mtn to Dismiss, 1:16-cv-00861 (LO-MSN) Plaintiff *Virginia Innovation Sciences, Inc.* vs. *Amazon.com Inc.* Transcript of mtns hearing on Oct. 14, 2016, 1:16-cv-00861 (LO-MSN) Plaintiff *Virginia Innovation Sciences, Inc.* vs. *Amazon.com Inc.* Ex. 1, 1:16-cv-00861 (LO-MSN) Plaintiff *Virginia Innovation Sciences, Inc.* vs. *Amazon.com Inc.* Plfs Resp to Notice of Suppl Authority (*Virginia Innovation v. Amazon*), 1:16-cv-00861 (LO-MSN) Plaintiff *Virginia Innovation Sciences, Inc.* vs. *Amazon.com Inc.* Notice of Suppl Authority and Ex 1, 1:16-cv-00861 (LO-MSN) Plaintiff *Virginia Innovation Sciences, Inc.* vs. *Amazon.com Inc.* Memorandum Opinion, 1:16-cv-00861 (LO-MSN) Plaintiff *Virginia Innovation Sciences, Inc.* vs. *Amazon.com Inc.* VIS Claim Construction Brief, 1:16-cv-00861 (LO-MSN) Plaintiff *Virginia Innovation Sciences, Inc.* vs. *Amazon.com Inc.* Amazon_s Claim Construction Brief, 1:16-cv-00861 (LO-MSN) Plaintiff *Virginia Innovation Sciences, Inc.* vs. *Amazon.com Inc.* Amazon_s Response Brief, 1:16-cv-00861 (LO-MSN) Plaintiff *Virginia Innovation Sciences, Inc.* vs. *Amazon.com Inc.* VIS Responsive Claim Construction Brief, 1:16-cv-00861 (LO-MSN) Plaintiff *Virginia Innovation Sciences, Inc.* vs. *Amazon.com Inc.* Claim Construction Memorandum and Order, 1:16-cv-00861 (LO-MSN) Plaintiff *Virginia Innovation Sciences, Inc.* vs. *Amazon.com Inc.* Claim Construction Memorandum and Order, 1:16-cv-00861 (LO-MSN) Plaintiff *Virginia Innovation Sciences, Inc.* vs. *Amazon.com Inc.* Memorandum ISO Motion for Summary Judgment, 1:16-cv-00861 (LO-MSN) Plaintiff *Virginia Innovation Sciences, Inc.* vs. *Amazon.com Inc.* Df Amz Opposition to MSJ, 1:16-cv-00861 (LO-MSN) Plaintiff *Virginia Innovation Sciences, Inc.* vs. *Amazon.com Inc.* Ruling of appeals from the United States District Court for the Eastern District of Virginia in Nos. 1:16-cv-00861-LO-MSN, 1:16-cv-01350-LO-IDD, Judge Liam O'Grady Df Amz Opposition to MSJ, 1:16-cv-00861 (LO-MSN) Plaintiff *Virginia Innovation Sciences, Inc.* vs. *Amazon.com Inc.* , 1:16-cv-00861 (LO-MSN) Plaintiff *Virginia Innovation Sciences, Inc.* vs. *Amazon.com Inc.* AMZ Reply ISO MSJ with exhibits, 1:16-cv-00861 (LO-MSN) Plaintiff *Virginia Innovation Sciences, Inc.* vs. *Amazon.com Inc.* Memorandum in Support of Motion for

(56) References Cited

OTHER PUBLICATIONS

Summary Judgment (2), 1:16-cv-00861 (LO-MSN) Plaintiff *Virginia Innovation Sciences, Inc.* vs. *Amazon.com Inc.* Summary Judgment Ruling, Civil No. I:16-cv-00861 Preliminary Invalidity Disclosure of Defendant 1:16-cv-00861 (LO-MSN) Plaintiff *Virginia Innovation Sciences, Inc.* vs. *Amazon.com Inc.*

\* cited by examiner

METHOD AND SYSTEM FOR EFFICIENT COMMUNICATION

CROSS REFERENCE TO RELATED APPLICATIONS

This application is a continuation of Ser. No. 15/626,192, which is a continuation of Ser. No. 15/417,111, which is a continuation of Ser. No. 15/070,439, which is a continuation of Ser. No. 13/833,328, which is a continuation-in-part of application Ser. No. 14/296,662 filed on Jun. 5, 2014, which is a continuation of Ser. No. 13/370,483, filed on Feb. 10, 2012, which is a continuation of application Ser. No. 13/067,079, which is a continuation of Ser. No. 11/802,418, which claims priority of provisional Application 60/899,037 filed on Feb. 2, 2007. Application Ser. No. 11/802,418 is a continuation-in-part of application Ser. No. 11/501,747, entitled "System and Method for providing Locally Applicable Internet Content with Secure Action Requests and Item Condition Alerts" and filed on Aug. 10, 2006, which claims priority to provisional Application Ser. No. 60/787,510, entitled "An Intelligent Kiosk for Mobile Payment" and filed on Mar. 31, 2006, and also claims the benefit of provisional Application Ser. No. 60/707,561, entitled "A Novel Structure of Cellular System for Internet Access" and filed on Aug. 12, 2005. The entire contents of these applications are hereby incorporated by reference.

As a continuation-in-part claiming priority to application Ser. No. 11/501,747, this application is also a continuation-in-part of application Ser. No. 11/165,341, filed on Jun. 24, 2005 and entitled "Methods, Systems, and Apparatus for Displaying the Multimedia Information from Wireless Communication Networks," which claims priority to provisional Application Ser. No. 60/588,358, filed on Jul. 16, 2004 and entitled "A Method and System for Displaying the Multimedia Information from Wireless Communications or Portable IT." The entire contents of these applications are also hereby incorporated by reference.

This application is also a continuation-in-part of application Ser. No. 14/639,156, which is a continuation of application Ser. No. 11/540,637, filed on Oct. 2, 2006 and entitled "A Method and System for Improving Client Server Transmission over Fading Channel with Wireless Location and Authentication Technology via Electromagnetic Radiation", which claims priority to provisional Application Ser. Nos. 60/722,444 filed on Oct. 3, 2005, 60/787,510 filed on Mar. 31, 2006, and 60/832,962 filed on Jul. 25, 2006. The entire contents of these applications are also hereby incorporated by reference.

BACKGROUND OF THE INVENTION

1. Field of the Invention

This invention relates generally to providing systems and methods for efficient communication.

2. Description of the Related Art

Empowered by the next generation of wireless technology, cellular networks can provide users with access to information from the Internet such as video on demand, video conferences, databases, etc. The use of cellular phones is thus no longer limited to voice transmission.

However, there are still some problems with the delivery of Internet content through cellular phones. For example, even with the high bandwidth connection provided by advanced cellular Systems, there remains a bottleneck between the Internet and the cellular network (CN), as well as delays caused by the Internet itself. This condition hinders the ability of cellular phone users to fully exploit the capabilities of the advanced CN. Since smooth and effective data flow is important to users, this bottleneck hinders the adoption of cellular phones for Internet access.

Making payment requests is another area of need. Although more and more individuals have become accustomed to purchasing goods and services online, there is not a streamlined and consistent mechanism for securely making requests for such payments.

Still another area of need relates to alerts. Locations including homes, offices, and other environments typically include computing devices as well as at least some form of network connection. Despite all of this connectivity, there are certain conditions for which adequate alerts remain unavailable. For example, billions of children wear diapers, and probably a quarter of them may suffer the effects of wet diapers at any given moment, since caretakers (e.g., parents, baby sitters, etc.) are not apprised of the status of their diapers in real time.

Thus, there remains a need for Systems and corresponding devices and processes that avoid the shortcomings of existing networks for delivering Internet content using the CN. There also remains a need for Systems and corresponding techniques for making payment requests. There also remains a need for Systems and corresponding techniques for delivering alerts to individuals such as caregivers tasked with managing a child in diapers.

Handheld mobile terminals (e.g., cellular phones, personal digital assistants (PDA)) continue to evolve both in terms of execution platform and functionality. It is believed that the much of the functionality provided by a personal computer (e.g., desktop or laptop) will ultimately become virtually available in handheld mobile terminals, which will allow users to work with and access multimedia information any time and anywhere.

For example, one particularly appealing advantage of the next generation wireless communication system and beyond (i.e., 3G, 4G, etc.) is the capacity to support high rate multimedia data services as well as conventional voice services. In a conventional cellular system a mobile terminal communicates with a base station wirelessly. Multimedia information including but not limited to television, 3D images, network games, and video phone calls is transmitted from various service providers and received for display on the screen of a mobile terminal. The net result of such a system is rich multimedia information being destined for display on the small screens typical of cellular phones (or the like).

In these and similar Systems, the mobile terminal functions as a multimedia terminal to display multimedia information (including high-resolution graphics and high-quality real-time audio/video) sent from high data rate wireless communications network. The limited size (e.g., 2×3") and capability of the mobile terminal screen may render enjoyment of the high rate data flow applications inconvenient, and in some instances useless. One consequence of this inadequacy is likely shrinkage of the potential market size for handheld mobile terminals. Indeed, some have suggested that development of high data rate Systems such as 3G Systems may be pointless given the limitations imposed by the small screen.

Some mobile units appear to provide a remote control function to an external display system. However, these do not appear to solve the small screen problem outlined above.

That is, they do not accommodate display on a larger, external display of video and other multimedia information originally destined for the mobile terminal display screen.

For example, one such interface accommodates usage of the mobile terminal as a remote control for a television, by feeding programming guide information to the mobile terminal. This is useful for allowing the programming guide to be viewed locally while the larger screen displays a current program, but does not address to the above-described small screen problem.

Still another issue is the various different devices that a user may have to engage in communications, as well as the various different vehicles for the enjoyment of content that the user now has. No longer does the typical user merely watch television. Instead, the user may use their home computer, television, MP3, PDA, cellular phone or various hybrid devices to enjoy content. This content also arrives from a variety of sources, not just broadcast television as in the past. While it may be desirable to have more options, some consumers may feel overwhelmed trying to manage everything.

Still another issue is presented with regard to a user's ability to use their mobile terminal efficiently, such as in conditions where direct communications with the user's assigned cellular communication may be unavailable or undesirable.

What is needed is a solution to the problem of diminished user enjoyment of the various devices and corresponding content that a user may enjoy due to the complications of trying to manage content and interface with a variety of different devices that are not necessarily compatible.

SUMMARY OF THE INVENTION

The present invention provides methods and apparatus for multimedia communications with different user terminals, delivering multimedia information to multiple user terminals concurrently, dynamically, and efficiently.

According to one aspect, methods and apparatus for efficiently directing communications are disclosed. On example entails receiving, from a mobile terminal, a communication directed to a cellular communication network, the communication being received in an alternative channel that differs from a channel of the cellular communication network. The communication is then converted for a relayed communication to the cellular communication network on behalf of the mobile terminal, the relayed communication being made through the cellular communication network.

According to another aspect, directing a television display from a mobile terminal such as a cellular phone is provided. This may entail receiving video content originated from the mobile terminal through a cellular communications channel, recognizing that the video content has a display destination of the television, configuring the video content for display on the television, and directing the television to display the video content at a predetermined tunable channel upon recognition that the received video content originates from the mobile terminal and has the display destination of the television. In addition, the communication between a mobile terminal and a television may be bidirectional.

According to another aspect, conversion and routing of content to devices that employ differing communication protocols is provided. This may entail receiving a multimedia content item originated from a source located outside a home location and destined for a destination device located within the home location, determining a communications protocol, a signal format and an address for the destination device, converting the first multimedia content item for reproduction by the destination device according to the determined signal format, and routing the converted multimedia content item to the destination device using the determined address and communications protocol. A plurality of user terminals may be served concurrently according to one embodiment of the present invention.

According to another aspect, bidirectional conversion and routing of content to differing devices is provided. This may entail receiving a first multimedia content item originated from a first device located outside a home location and destined for a second device located within the home location, converting the first multimedia content item for reproduction by the second device and routing the first converted multimedia content item to the second device, receiving a second multimedia content item originated from a third device located within the home location and destined for a fourth device located outside the home location, and converting the second multimedia content item for reproduction by the fourth device and routing the second converted multimedia content item to the fourth device. The third device can also be the second device and the fourth device can also be the first device.

According to another aspect, remotely receiving and accommodating completion of multimedia content requests from a plurality of content sources is provided. This may entail receiving a request to order access to a first multimedia content item and a second multimedia content item, wherein the request is received through a cellular communication with a user initiating the request using a mobile terminal, identifying a first source corresponding to the first multimedia content item and a second source corresponding to the second multimedia content item, wherein the first source and the second source implement different communications protocols, separately initiating communications with the first source and the second source using the different communications protocols to fulfill the request to order access to the first multimedia content item and the second multimedia content item, receiving the first multimedia content item and the second multimedia content item from the first source and the second source; and converting the first multimedia content item and the second multimedia content item for reproduction by a destination device and routing the converted multimedia content items to the destination device.

According to another aspect, a method for optimizing the delivery of content that is commonly requested by a plurality of users in a particular location is provided. This may entail monitoring network content requested by users corresponding to the particular location, receiving a request for a particular content item from a given user in the particular location, wherein the particular content item is ordinarily served from a location outside the particular location, determining that the particular content item is locally applicable where the particular content item is also requested by and converted for other users in the particular location, and concurrently serving the particular content item to the given user and the other users using a server that is logically proximate to users in the particular location, in lieu of separately serving the particular content item to the given user and the other users from locations outside the particular location.

The present invention can be embodied in various forms, including business processes, computer implemented methods, computer program products, computer Systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Internet content is requested and accessed by cellular users in correlation with their determined location. Provision of Internet content is customized according to location, and provided in a series of locally customized networks. A given local network includes servers configured to include content believed appropriate for its location. The delivery of content is made from a particular local network configured as such, to a user's cellular phone through the local base station.

For example, information about Hollywood may be accessed through cellular network base station(s) in the Hollywood area, when the cellular user is detected as being proximate to the Hollywood area. These base stations deliver Internet content that is relevant to the area, such as web sites about film and movie stars. This Internet content is stored in servers that the base stations covering the area can access conveniently to provide faster and more efficient transmission to the cellular users in the service area.

Optimizing the location of the Internet content for the wireless network users enables an optimum data flow for cellular users to access rich information and data of all kinds from the Internet.

Figure 1:
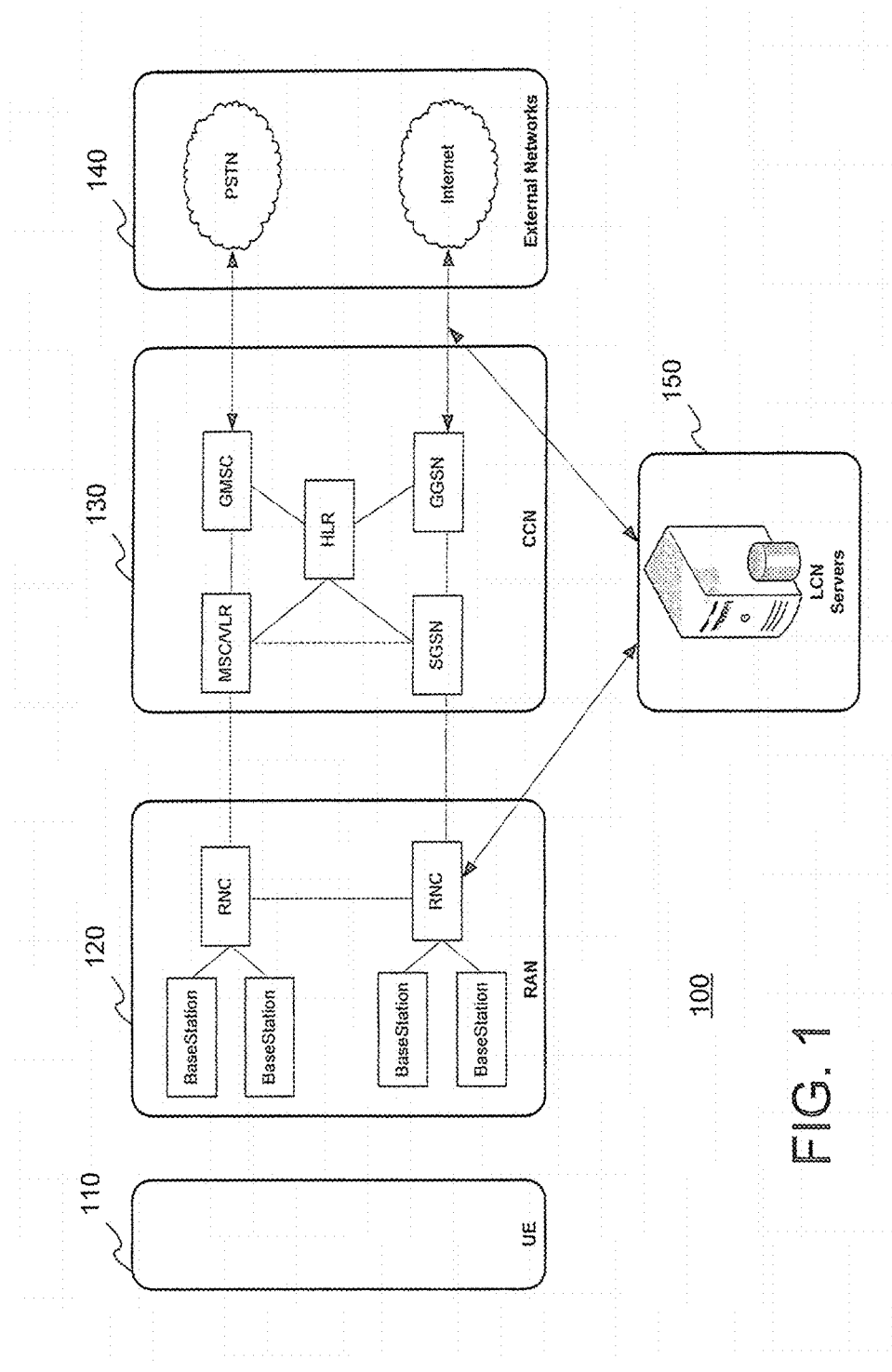
FIG. 1 is a block diagram illustrating a system for optimized delivery of Internet content to users.

FIG. 1 is a block diagram illustrating a system 100 configured to provide Internet content delivery in accordance with the present invention. The basic elements of the system 100 are the User Equipment (UE) 110, the Radio Access Network (RAN) 120, the Core Cellular Network (CCN) 130, the External Network (EN) 140, and the Local Customized Network (LCN) 150.

The UE 110 is a cellular phone configured to communicate with base station(s) of the RAN 120. Although the UE 110 is preferably a cellular phone, it should be understood that a variety of devices may be equipped with same communication functionality. Other examples of the UE 110 include a Personal Digital Assistant (PDA), Set Top Box, Kiosk, or any personal computing device configured to include the wireless communication capability.

The RAN 120 and CCN 130 preferably implement conventional elements of a cellular network and are described further as follows. The RAN 120 includes Base Station and Radio Network Controller (RNC) elements. The Base Station provides resource management and provides an interface that converts the data flow between the UE 110 and RNC. The RNC controls radio resources for the Base Stations to which it is connected, and also manages connections to the UE 110.

The CCN 130 is connected with the EN 140. The most notable examples of the EN 140 can be grouped into two kinds: Circuit Switched (CS) 142 networks and Packet Switched (PS) 144 networks. The CS 142 network provides circuit-switched connections for circuit-switched services, such as telephony and ISDN. The PS 144 network provides connections for package data services. The Internet is a significant and notable application of a PS network.

The CCN 130 comprises MSC/VLR, GMSC, HLR, SGSN and GGSN elements. The HLR (Home Location Register) is a database that stores information such as user service profiles. The service profile includes information including allowed services, roaming areas, forwarding numbers and the like. The HLR stores the UE 110 location to accommodate that routing of calls and other information to the UE 110.

The MSC/VLR (Mobile Services Switching Center and Visitor Location Register) respectively provide switch operations and a database for the UE in its current location for Circuit Switch (CS) services. The VLR stores the user's service profile, as well as more precise information on the UE's location within the serving system. CS connections go through the GMSC (Gateway MSC), which is the switch at the point of connection to the external CS network.

The SGSN (Serving GPRS (General Packet Radio Service) Support Node) functionality is similar to that of MSC/VLR but is typically used for Packet Switch (PS) service. PS connections go through the GGSN (Gateway GPRS Support Node).

The LCN 150 comprises one or more computing devices configured to include memory, processing capability, and interfaces to provide the functionality described herein. The LCN 150 includes local servers that are configured to provide custom Internet content. The LCN 150 is also configured to include a content access monitoring module, which monitors Internet access and determines content applicable to the designated location of the LCN 150.

The LCN 150 thus performs monitoring and caching related to locally applicable content. With regard to the monitoring functionality, the monitoring includes local access, which determines which content users in the location are accessing. With regard to the caching functionality, the LCN 150 maintains a cache of locally applicable Internet content, which includes refreshing to add new content and remove stale content as determined by information received from the monitoring functionality.

One technique for determining whether content is locally applicable is measuring access frequency. If many users in the location are determined to be accessing particular Internet content, then that particular Internet content is determined to be locally applicable and is included in the cache during the next update.

In addition to monitoring and caching locally applicable content, the LCN 150 is configured to be logically proximate to the base station(s) of the cellular network at the particular location. In one example, logical proximity is carried out by having the LCN 150 physically proximate to the relevant base station(s), such as in the same geographical area. For example, the LCN 150 may be located in a metropolitan area or within an area the covers certain zip code(s) of a metropolitan area. Logical proximity may alternatively be carried out without requiring physical proximity. This, for example, may be done by providing dedicated resources including a high bandwidth connection between the LCN 150 and the local users. In this example, the LCN 150 is configured to deliver locally applicable content more efficiently and rapidly because of the dedicated resources, without necessarily requiring physical proximity.

According to another aspect, to further increase efficiency, the locally applicable content for a given LCN is organized in a layered architecture. A "first layer" of content is considered to be the content that has the highest local applicability. Additional layers are also provided upon the first layer, with succeeding layers progressively covering larger geographical areas (i.e., progressively larger numbers of base stations). According to one aspect, the layering involves communication with neighboring LCNs covering increasing areas, to determine the content that is locally applicable for the additional levels. Thus, for example, a first layer corresponds to locally applicable content at a first level of granularity (e.g., as monitored/determined only for the location of the LCN or a small local group of LCNs), a second layer corresponds to locally applicable content at a second level of granularity (e.g., the logical "AND" or intersection of content that is frequently accessed across a larger area as determined by the monitoring of access for several LCNs in the defined larger area, and so on.

Figure 2:
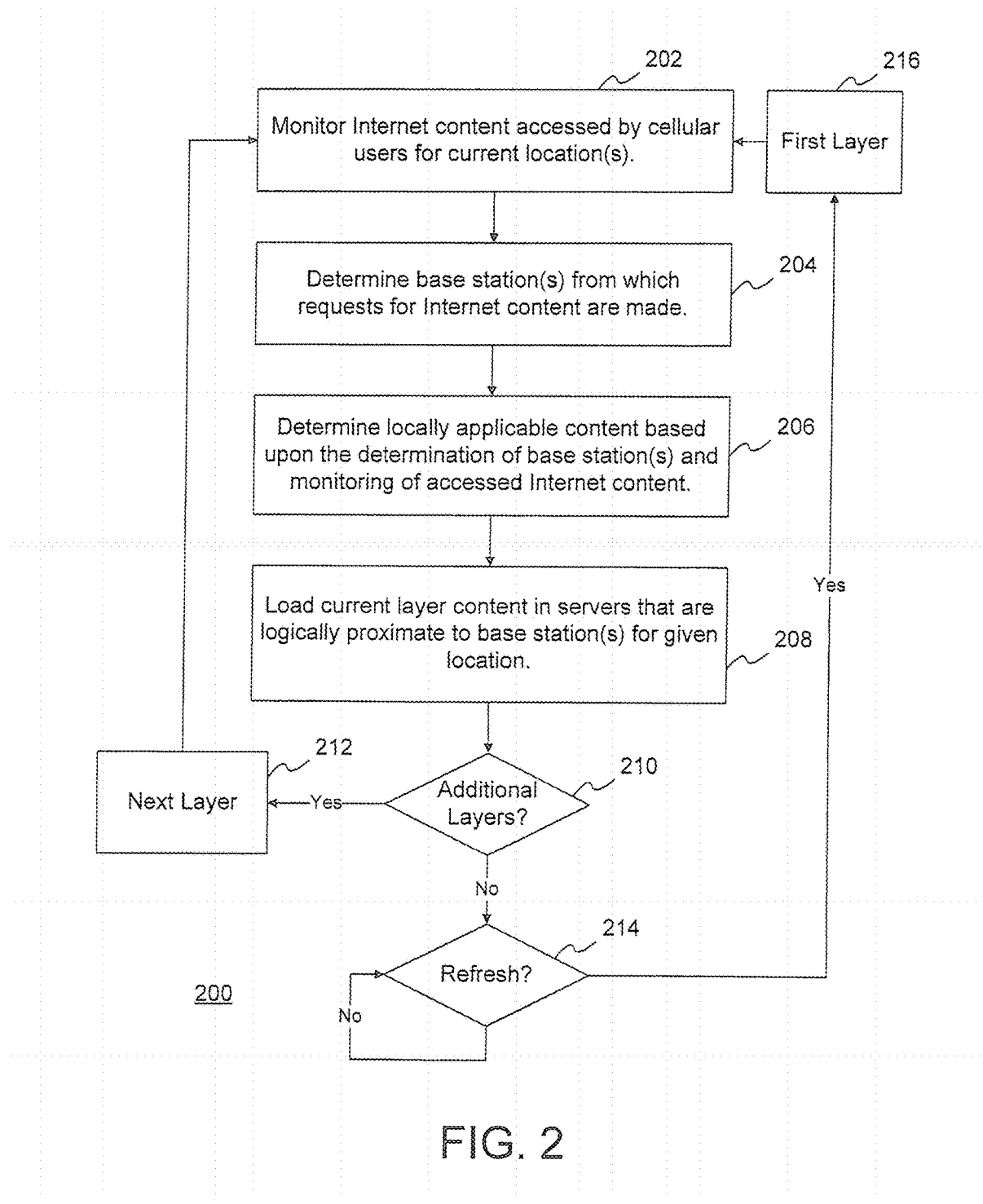
FIG. 2 is a flow diagram illustrating an embodiment of a process for determining locally applicable content for optimized content delivery.

The operation of the system to update the LCN accordingly is described as follows, with concurrent reference to FIG. 1 and the flow diagram of FIG. 2. The process commences by monitoring 202 Internet content accessed by users for a current location. This is done by monitoring the gateway of the connection between the CCN 140 and PS 144 networks to track the Internet content accessed by the cellular users.

It is noted that the monitored content may have two useful purposes. One is to accommodate the delivery of locally applicable content, which may be determined by frequency of access for the given location. Another is to allow the providers of content (e.g., merchants or other commercial entities) to receive an indication which content is locally applicable. This allows the providers of content to assist or participate further in determining what is locally applicable. For example, a merchant provided with an indication of local applicability for certain content may wish to make advertisements, coupons, or the like available to the users in that domain.

In conjunction with this monitoring 202, determination(s) 204 of the base station(s) from which requests for the Internet content are made. This may be performed by checking the VLR and HLR to discover the base stations from which the requests for the Internet content are sent from through. It is noted that base station discovery is just one way that physical location may be determined. Other examples include but are not limited to using GPS, zip code, telephone number, and IP address information to make the determinations.

The next step comprises determining 206 locally applicable content based upon the monitoring 202 and determination(s) 204 of the base station(s). Determination of local applicability is performed by determining access frequency. Alternatively, local applicability may be determined by comparing the location of the requesting user (base station) to a location that is identified in association with the requested content.

Then, for the current (e.g., first) layer, the content is loaded 208 in servers that are logically proximate to users for the given location. This may be done by placing the current (e.g., first) layer server(s) loaded with the Internet content and/or other information/data to achieve an optimum and faster data transmission for the cellular users to access the data stored in the servers through the base stations. For example, the servers can be placed logically close to the base station through which the cellular users access the data stored in the server(s).

The process iterates through as many layers as desired. If it is determined 210 that additional layers are to be updated, then steps 202-208 are performed to load the next 212 (e.g., second) layer server(s) with locally applicable content. As described, this preferably entails a broader geographical area as the layers increase. The process continues until it is determined 210 that no more layers need to be determined and loaded. The number of layers in a given system will vary according to application, and as desired. Layering will typically involve a trade-off between maximizing locally available content and the processing resources required to generate and manage layers for progressively broader areas.

The content that is loaded into the base station(s) may be refreshed 214 on any desired schedule or trigger. For a refresh operation, the process described above repeats, starting again with the first layer. Content that is stale or otherwise determined to no longer be locally applicable may be removed, and of course new content may be added during a refresh cycle.

Additional servers may be added vertically and/or horizontally as desired. Vertically means that servers may be added at a given physical location to cover first, second, third, etc. layers. Horizontally refers to adding different sets of servers corresponding to different locations (i.e., one set for the first layer, a second set for the second layer, and so on).

A regular schedule or certain amount of activity can be used to trigger a refresh of the layering. The Internet content in the LCN 150 servers is modified according to the updated findings on the requests for the Internet content sent from the base stations. The Internet content stored in the servers is refreshed at a proper time, such as when the servers are not overwhelmed by the users accessing the contents.

The servers are thus loaded with the information for broadcast and/or multicast and/or any data to be accessed by the cellular users for an optimum transmission to the users in service areas.

The locally applicable content may be sent and delivered upon request to the users. Examples of communication pathways for sending the locally applicable Internet content include the relatively direct pathway through the RAN 120, the pathway through the CCN 130 and then the RAN 120, or others.

A variety of techniques may be used to implement the locally applicable content cached by the LCN 150 in conjunction with requests for Internet content by UE 110 (or other device) users. In one example, the UE 110 request for Internet content prompts an initial check for content in the locally applicable content, followed by conventional Internet access should the content prove to be absent from the locally applicable content that is currently cached. Additionally, based upon the layered approach described above, the first attempt to satisfy the request may be made from the first layer, followed by the second layer, and so on. The number of layers searched to respond to a particular request may vary as desired. When the number of layers designated to be searched for the current request is exhausted, conventional Internet access is used to retrieve content related to the request.

Various cache management and network optimization techniques may be used to manage the locally applicable content. For example, fully associative (FA), direct mapped (DM), and set associative (SA) mechanisms are examples of techniques that can be used to determine where a specific content can be stored on the server. Additionally, techniques to ensure block validity and to manage cache hits and misses can also be used. Random, LRU (Least Recently Used) and FIFO (First In First Out) block replacement schemes are among those that can be used to manage the blocks in the cache.

According to another aspect, the present invention facilitates a systematical solution for mobile payment (or the communication of other information, as well as the receipt of information such as alerts). Preferably, this aspect of the present invention implements a cellular network, a wireless personal area network (WPAN) and wireless identification technology. Various technologies may be used for these components, including but not limited to 3G technology for the cellular network; Zigbee, Bluetooth, or UWB technologies for the WPAN; and RFID (e.g., NFC) for the wireless identification technology.

Figure 3:
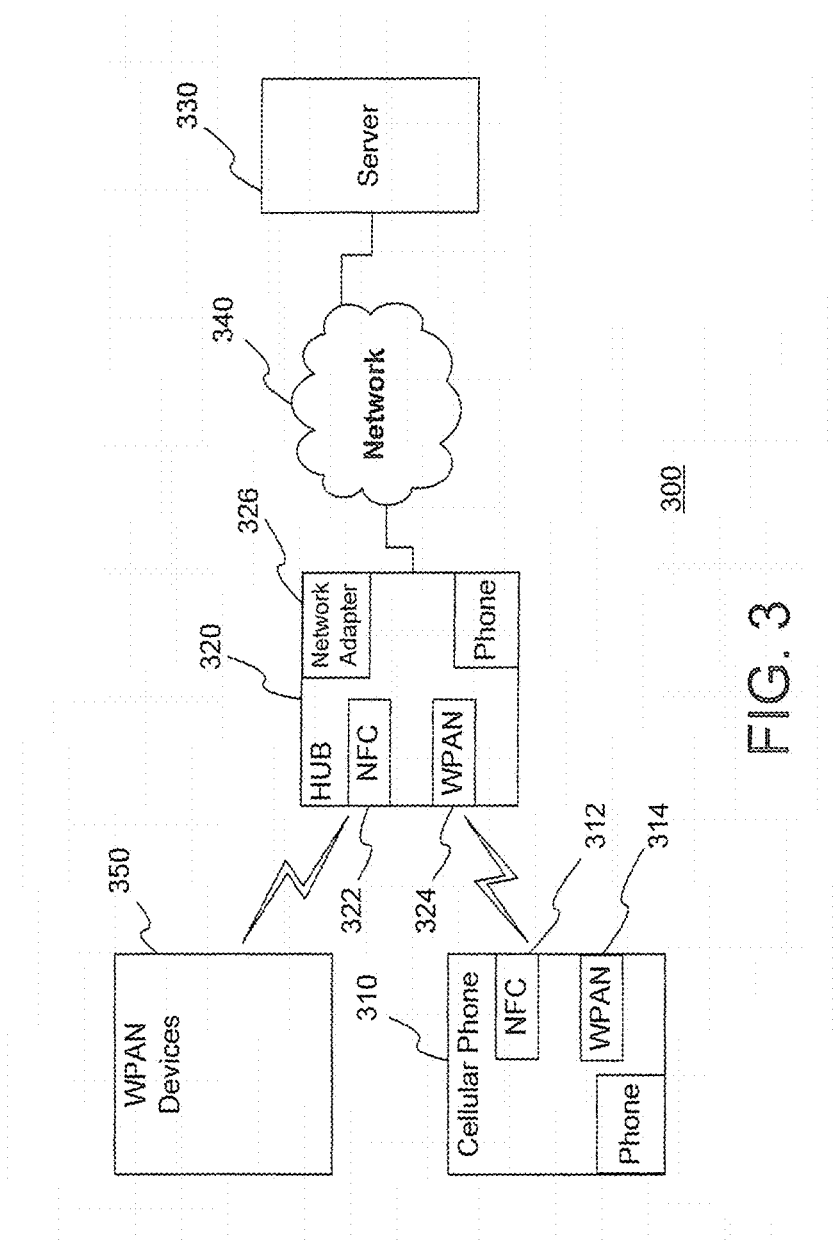
FIG. 3 is a block diagram illustrating a system for facilitating secure receipt and satisfaction of an action request such as a bill payment.

FIG. 3 illustrates an example of a system 300 that implements this aspect of the present invention. The system 300 includes a user equipment (e.g., cellular phone, PDA, etc.) 310 and wireless HUB 320, which is connected to servers 330 through a network 340, such as the Internet.

The wireless HUB (WHUB) 320 may be located in a public or private location. For a public location, the WHUB 320 is preferably housed in a kiosk. The kiosk may be located on a street, or in an airport, shopping mall, or any location that is perceived as convenient and likely to include user traffic. For private locations, the WHUB 320 is preferably configured for usage in locations like homes or hotel rooms. In these environments, the WHUB 320 may be provided in a smaller device such as part of a Set Top Box (STB).

The handset 310 is equipped with a tag that provides a unique identifier that can be wirelessly communicated to the WHUB 320. A preferred tag is a Near Field Communication (NFC) tag 312. NFC provides short-range wireless connectivity that uses magnetic field induction to enable communication between the devices. It has a short range of a few centimeters, which is believed to be advantageous for applications of this aspect of the present invention. Although NFC is preferred, RFID or other substitutes may also be provided. The handset 310 also includes a WPAN transceiver 314, which allows additional communication channel between the handset and the WHUB 320.

The wireless WHUB 320 is similarly equipped with an NFC reader 322, a WPAN transceiver 324 and a network adaptor 326. The NFC technology accommodates secure and automatic authentication and data exchange between the NFC tag and NFC reader. According to this aspect of the present invention, the NFC is uniquely associated with other information that allows the appropriate action (payment, alert, etc.) to take place. For example, where the system is being used to accommodate mobile payment, the RFID tag is associated with the user's bank account. Further, once the device is authenticated through the unique identifier, a second secure communication channel with more capabilities is established between the handset 310 and WHUB 320.

This allows the action request and related communications to be reliably transmitted between the two devices.

Accordingly, once the NFC based authentication is accomplished, a secure wireless connection between the handset 310 and WHUB 320 is established. This communication can implement the WPAN transceiver, which has a higher data rate and longer operational range compared to NFC. The secure communication allows the exchange of additional information related to the action, such as price and credit card information for a purchase request and corresponding payment scenario, to be sent between the handset 310 and the WHUB 320. The secure communication can be implemented by hardware (e.g., a dedicated hardware chipset) and software (e.g., data encryption algorithm).

The WHUB 320 can also exchange data with other WPAN devices 350. It may be useful for the WHUB 320 to communicate with these devices 340 to exchange information related to the action. For example, the WHUB 320 may collect water usage information from a water meter equipped with the WPAN device 340 functionality. This data may be stored locally by the WHUB 320, or may be transmitted to the appropriate server 330 through the network connection 350. The data does not necessarily need to be collected by the WHUB 320 concurrently with the user-requested action. For example, the acquisition and transmission of water usage information may occur periodically, and separate from the user's request to make a corresponding payment.

It is also noted that the WHUB 320 may optionally be configured with a wireless communication capability such as that provided in a cellular phone. The WHUB 320 is thus configurable to operate with a system that delivers locally applicable Internet content as described above in connection with FIGS. 1 and 2.

Figure 4:
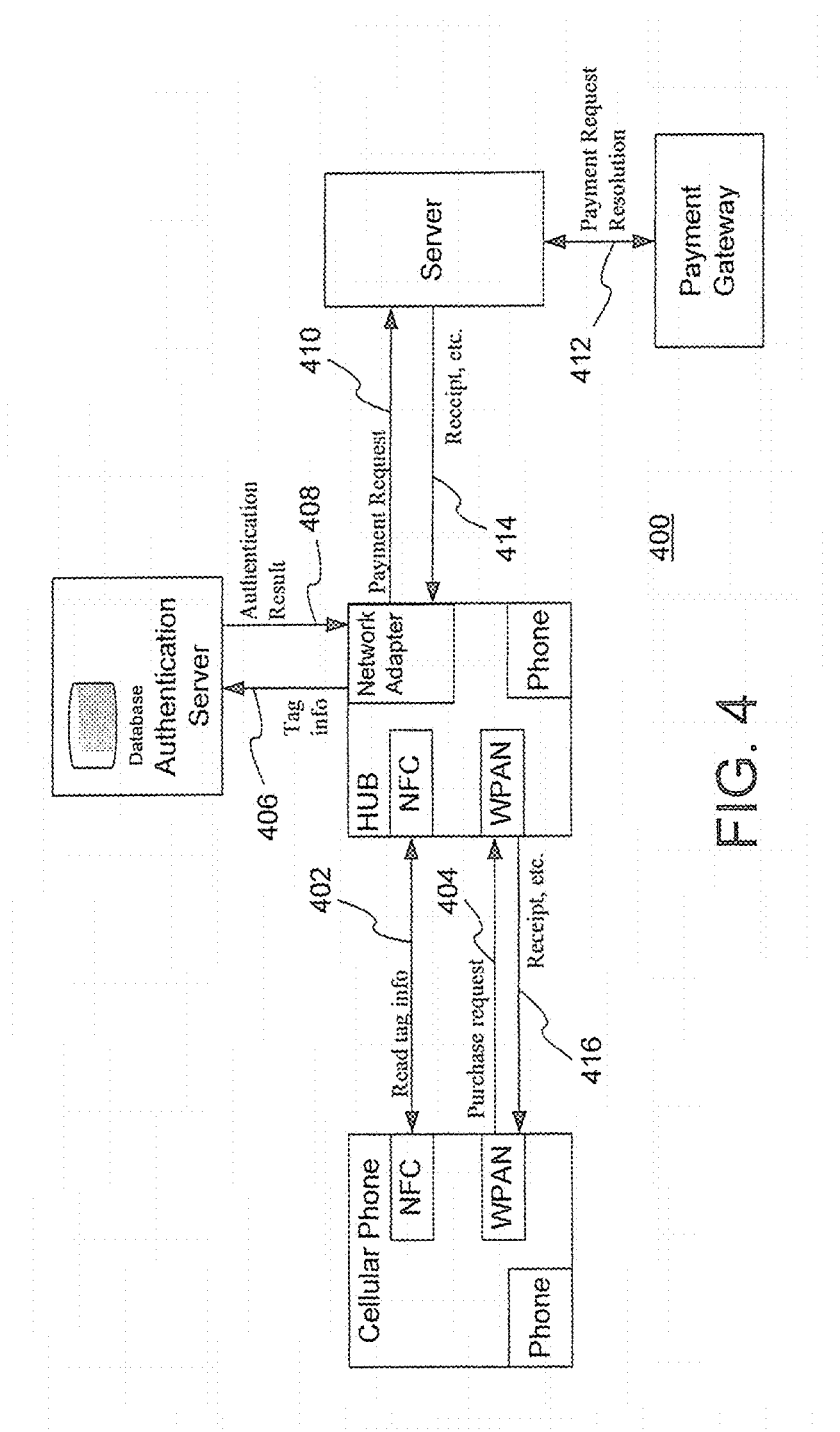
FIG. 4 is a block diagram illustrating an example of an action request process.

FIG. 4 further illustrates and provides an example of a payment process 400 in accordance with this aspect of the present invention. The process 400 initiates with an authentication 402 process that accommodates recognition and identification of the handset by the wireless WHUB via the NFC tag.

The communication through the separate secure communication channel (e.g., WPAN) is then established. The WPAN functionality is used to communicate between the handset and the WHUB, so that content related to a requested action may be securely exchanged. In this example, the requested action is a purchase request 404.

It should be noted that the action may or may not immediately follow authentication 402. For example, the cellular phone may be configured to include browsing capability, which allows that interface of the cellular phone to be used to review items prior to making a purchase request.

Various purchase types may be made with the purchase request. Examples may include a physical item that is separately shipped to an address, a download that is made available immediately, possibly to the cellular phone, a service, etc.

Internet content may be accessed by the cellular phone in association with an action request. One example of providing content to the cellular phone may be the locally applicable Internet content as described above in connection with FIGS. 1-2. Also, the cellular phone may access Internet content through channels other than through the WHUB.

It is also noted that a purchase request is just one form of an action that may be carried out. Actions include but are not limited to bill payment, populating an account with funds, online shopping transactions, and others.

The process of authentication may be based upon a Tag ID and password. The Tag ID and password are sent 406 to the authentication server, which then returns a notification 408 confirming authentication. Preferably, this authentication indicates whether the individual is who he or she claims to be, but does not address the access rights of the individual. The authentication server may reside within or outside the WHUB.

As necessary, additional information may also be required in association with a requested action. For example, account identification information or passwords to access an online account may be required by an external server. In these circumstances, the external server sends a request to the WHUB for the information. The WHUB may store such information and respond to such a request. Alternatively, the WHUB may further exchange information with the user (through the handset), in order to obtain the additional information requested by the external server.

In connection with the purchase request 404, a payment request 410 is made between the WHUB and external server through the network connection. The payment request 410 allows the user to complete the transaction related to the purchase request 404. To accommodate a satisfactory completion of the payment request, the server corresponds with a payment gateway, and a resolution 412 indicating whether the payment request succeeds or fails follows.

Upon an indication of a successful payment request, the WHUB receives 414 a receipt or confirmation number from the external server relating to the requested action, and passes 416 that and/or related information to the handset confirming completion of the action. This may be a receipt, confirmation numbers, coupon codes, or the like.

According to still another aspect, the present invention provides for wireless management of tasks and corresponding alerts. One such task is diaper management, which is described in detail as follows.

This aspect of the present invention accommodates task management based upon wireless delivery of alerts to overcome the problem of estimating when the task requires completion. These alert based tasks include but are not limited to diaper management. For example, home security monitoring may also be accommodated.

Figure 5:
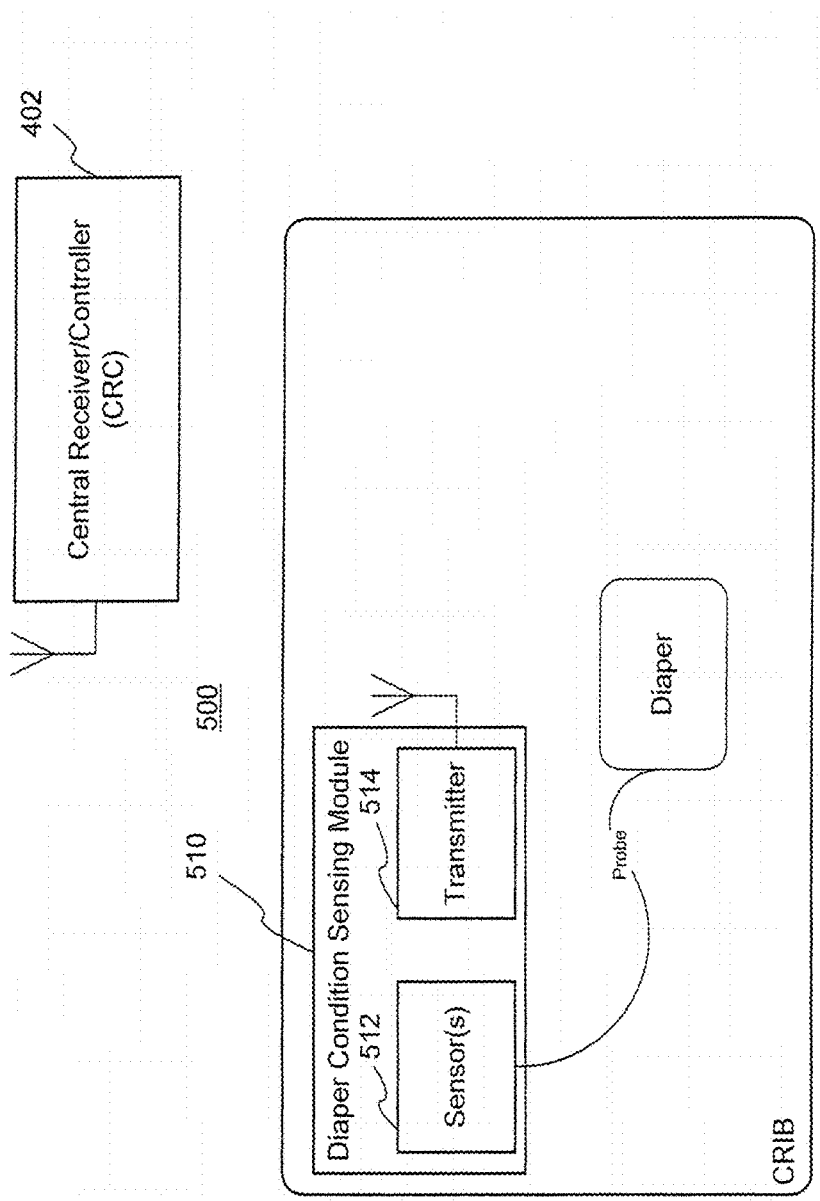
FIG. 5 is a block diagram illustrating a system for providing item status updates.

FIG. 5 illustrates an example of a diaper management system 510 according to the present invention. The diaper management system 500 includes a diaper condition sensing module 510 and a central receiver/controller (CRC) 520. The CRC 520 operates on a conventional processing platform, and is configured to communicate wirelessly with the diaper condition sensing module 510. The CRC 520 also includes a network interface. The wireless and/or network interface accommodate the transmission of appropriate alerts to caregivers.

The diaper condition sensing module 510 includes a sensor 512 and a transmitter 514. The sensor 512 is configured to monitor one or more of the following conditions, whose results indicate whether the diaper is wet or not:

1. The weight of the diaper—urine or feces make the diaper heavier than a dry and clean diaper;
2. Electric conduction of urine;
3. Chemical properties of urine—volatilized air including volatile acid or ammonia, pH, starch enzymes, ketone bodies, and/or urobilinogen may all be detected and analyzed to determine the presence of urine;
4. Feces: the solid waste material; the bilirubin, or stercobilinogens in the feces; the specific food decomposed material including starch, fat, plant fiber, muscle fiber and so on; and/or 5. Any other elements, features, characteristics, and reflections of the unwanted on babies' diapers.

The sensor 512 triggers the transmitter 514 to establish a wireless communication channel between itself and the CRC 520. A signal is sent by the transmitter 514 to inform the CRC 520 that the diaper is wet. This wireless communication channel preferably uses wireless technologies such as UWB, Bluetooth, RFID, Spread Spectrum, or other conventional wireless communication technologies.

Each sensor 512 preferably has a unique ID. Multiple access mechanisms, such as TDMA, CDMA, FDMA, or other conventional approaches, may also be applied to allow the central receiver to communicate with multiple sensors at the same resource. It is believed that Zigbee/Bluetooth may be useful for many applications in light of the competing demands of working range, data rate and cost.

After the CRC 520 receives the signal, the receiver triggers sound, light, text and/or other indications of the status of the diaper. These indications may be variously displayed, broadcasted, reflected, etc. through speakers, telephones, pagers, beepers, computers, and so on to inform the caregiver(s) so that they can remedy the situation.

The diaper condition sensing module 510 may be variously provided. One example connects to the diaper using a probe that measures for desired criteria as described above and as shown in FIG. 5.

Another example provides the diaper condition sensing module 510 within the diaper. In this example, the sensor 512 also includes interfaces (probes) for measuring the desired criteria, within the confines of the diaper. The transmitter 514 may use various communication techniques as described above. For an RFID embodiment, the function may be provided by causing the circuit loop of the RFID tag to transition from open to close when the diaper condition (e.g., wet) is detected by the sensor, which automatically causes the ID Tag to be sensed by the tag reader of the CRC.

Still further, in this example the diaper condition sensing module 510 may be placed within a diaper and reused. Diapers may be configured with pouches or the like to allow the placement of the diaper condition sensing module 510. In another alternative, the diaper condition sensing module 510 is manufactured and sold as an integrated part of each diaper, so that caregivers do not have to be concerned about the placement of the module 510 each time a diaper is changed.

Figure 6:
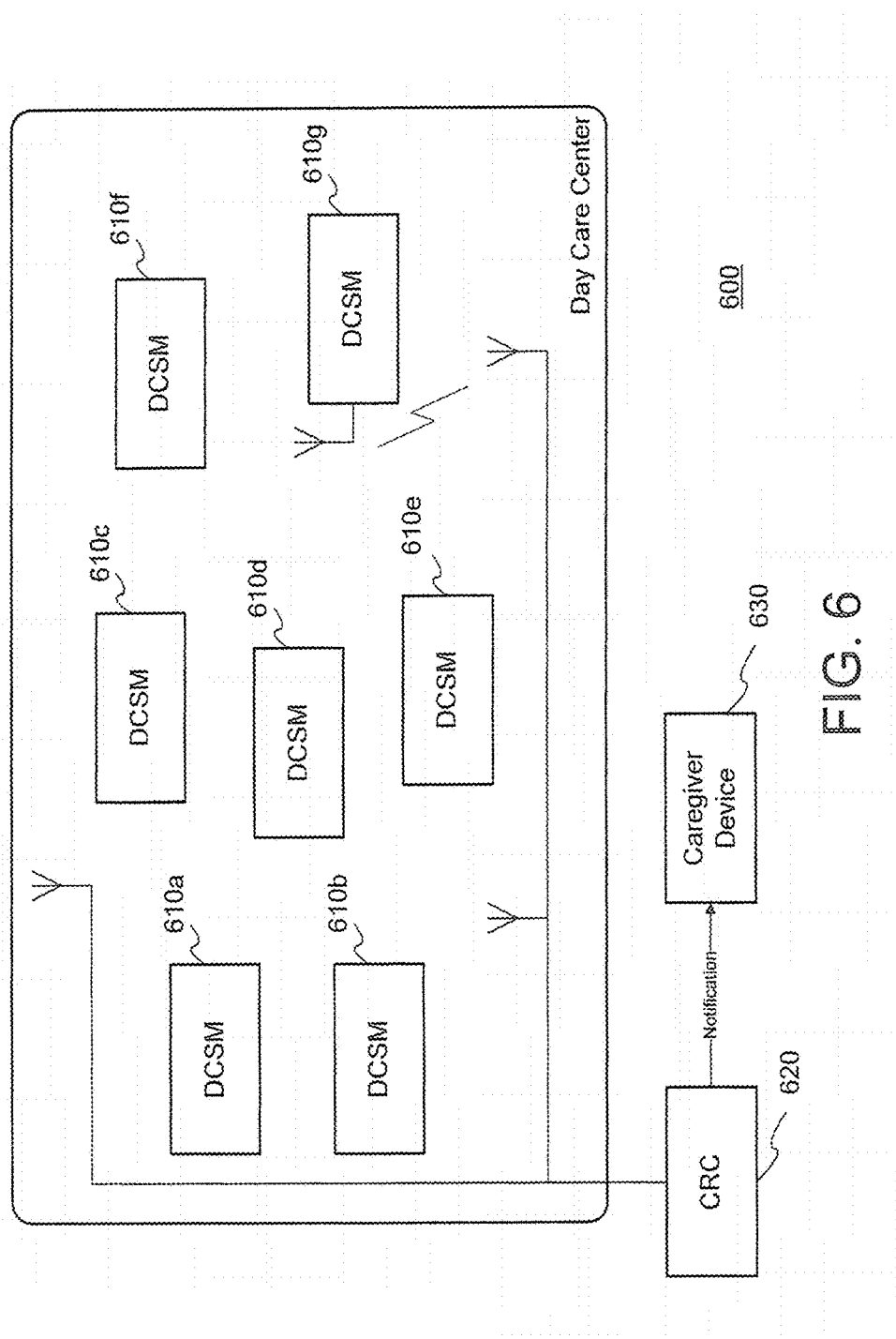
FIG. 6 is a block diagram illustrating a system for receiving and delivering a status update for multiple items.

In addition to assisting a caregiver with regard to an individual child's diaper, a diaper management system may be configured to manage the diapers for groups of children, such as a pre-school class or a day care facility where many children may potentially wear diapers. An example of such a system 600 is shown in FIG. 6. The CRC 620 is configured to distinguish children in need of new diapers from those that are not and respectively sends messages to appropriate caregivers. To carry out this functionality, the CRC 620 is equipped with a database that associates the unique identifier corresponding to each diaper condition sensing module 610*a-g* to at least one contact party. Alternative communication pathways (phone, e-mail, etc.), multiple contacts (caregiver#1, caregiver#2), and various other information may be associated to a given diaper condition sensing module 610*a-i* in the database.

In addition to providing a status alert about the condition of the diaper, the CRC 620 also determines the location of the diaper by using wireless location techniques, including but not limited to Angle of Arrival, Time of Arrival, and Received Signal Strength Indication. This allows the option of also giving the designated caregiver information about the location of the child having the soiled diaper.

Figure 7:
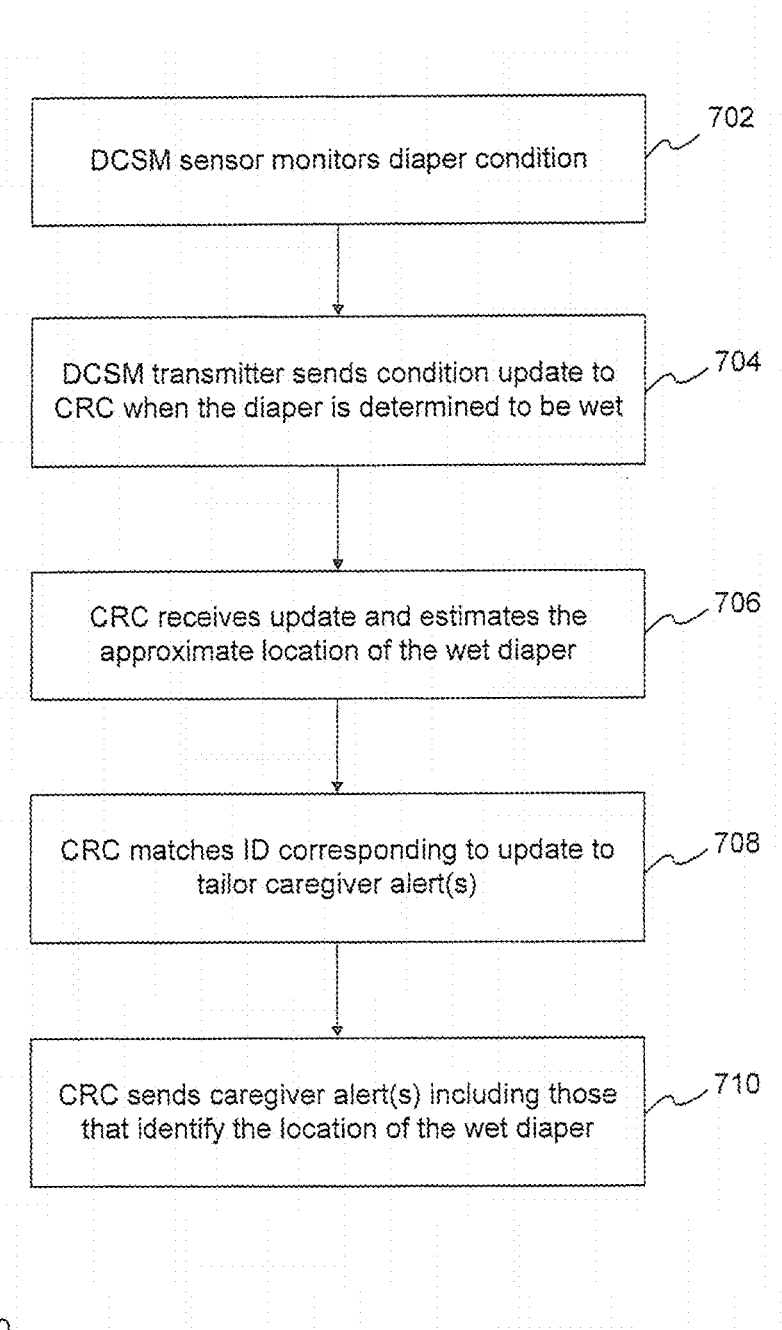
FIG. 7 is a flow diagram illustrating a process for providing a diaper condition update.

FIG. 7 is a flow diagram illustrating a process 700 for sending a caregiver alert according to a diaper condition in accordance with the present invention. The process 700 commences with the DCSM sensor monitoring 702 the diaper condition. When the diaper condition changes, such as when it is wet, the DCSM sensor detects the updated condition of the diaper. When this occurs, the DCSM transmitter sends 704 the diaper condition update to the CRC. The CRC receives 706 the update and corresponding indications. Many conditions may be updated and the DCSM and CRC are configured to communicate them accordingly. The CRC, once provided with the update, proceeds to estimate the location of the (e.g., wet) diaper. The DCSM sends an ID corresponding to the update, which identifies the diaper/child. The CRC queries its database and thus matches 708 the ID corresponding to the update to tailor caregiver alert(s). These alerts are then sent 710 to the caregiver(s) accordingly.

In the situation where there are multiple children/diapers being monitored, the CRC provided alert may be to a PC having a display screen with a map of the room(s) and the estimated location of the wet diaper. Other CRC provided alerts may merely notify additional caregiver(s) as to the status of the diaper, without the location, so that the additional caregiver(s) may be apprised of the status. The CRC may also poll the DCSM after a given period of time to ensure that the diaper condition has been updated. The CRC may be configured with configuration settings that allow a caregiver to specify when and how they should be updated. For example, if one caregiver is a baby sitter watching the child while the parents are out, the parent may configure the CRC not to send an alert to them when the diaper is first detected as being wet, but to wait until a certain period of time elapses. By contrast, the baby-sitter alert may be provided immediately. If the certain period of time passes and the diaper remains wet, the CRC can then notify the parent about the diaper condition, and the parent will realize that the diaper has not been changed.

Figure 8:
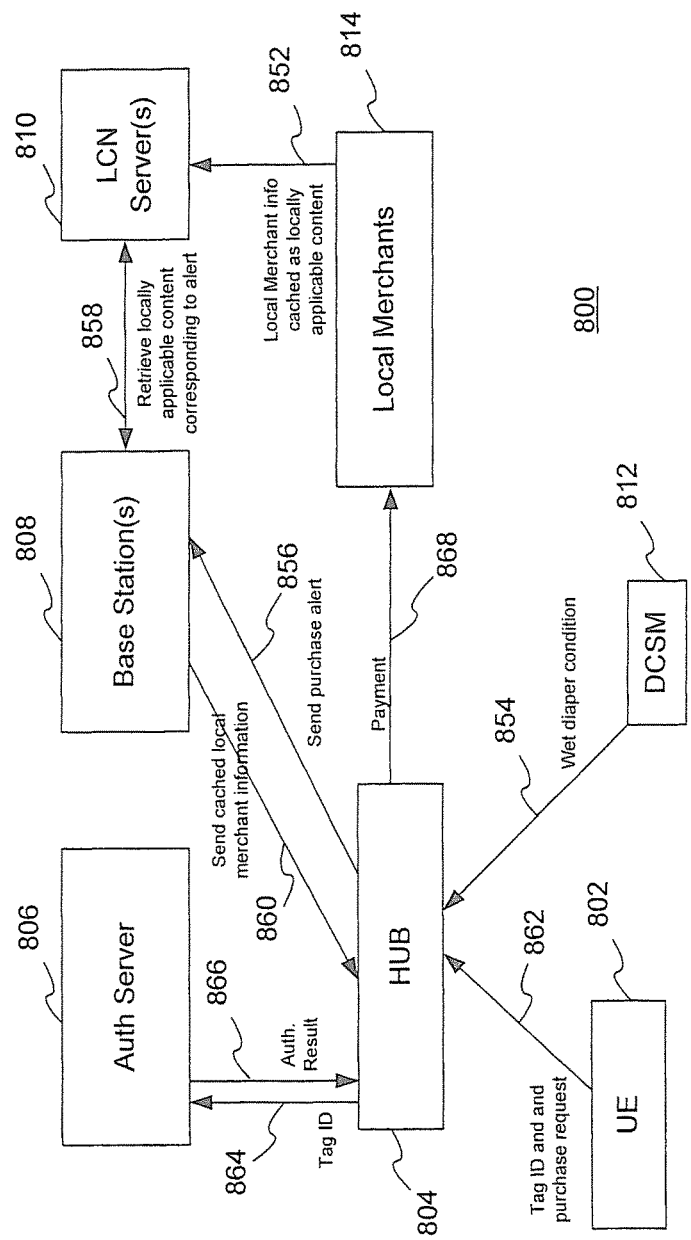
FIG. 8 is a block and event diagram illustrating the provision of locally applicable Internet content to a user in relation to a status update, and secure receipt and satisfaction of an action request related to the same.

FIG. 8 is a block and event diagram illustrating an example of a system 800 that implements several aspects of the invention described above. The system 800 includes UE 802, WHUB 804, Authorization Server 806, Base Station(s) 808, LCN Server(s) 810 and DCSM 812, which respectively provide the functionality described above for the components having the same names.

Local Merchant Server(s) 814 are also illustrated. As described in connection with the provision of locally applicable Internet content, merchants are apprised as to the local applicability of content, such as may be determined by frequency of access by users at a particular location corresponding to given base station(s). The WHUB 804, in addition to being configured to facilitate secure receipt and performance of an action such as a purchase request and corresponding payment request, includes the CRC functionality that allows a response to diaper condition update as provided by the DCSM 712 (the diaper being just one example of an item for which updates may be provided).

With the system 800 configured as such, the delivery of locally applicable Internet content may be provided in conjunction with the diaper update. Also, a local merchant (and corresponding server) 814 that sells diapers is able to present a coupon or other incentive to the user in conjunction with the determination that a diaper is wet by the DCSM 812. Moreover, in addition to having the capability of reminding the caregiver about this, the WHUB 804 may keep a database of household requirements and inventories. For example, the WHUB 804 may monitor the number of diapers detected as being used. When the amount of used diapers is close to the amount known to have been purchased previously, an additional alert may be presented to the user so that they are aware that they need diapers and they can get the discount if they buy brand x based upon the information provided by the local merchant.

The process for providing such functionality may be as follows. Based upon historical activity relating to access of locally applicable Internet content, as well as whatever merchant participation is desired in conjunction with the system 800, the local merchant's information is cached 852 at the relevant LCN Server(s). A wet diaper is detected 854 by the DCSM 812 and this information is transmitted to the WHUB 804. The WHUB 804, managing the diaper inventory for the household, determines that the inventory of diapers is low, and thus sends 856 a purchase alert through the Base Station 808 requesting information related to the current need. In response to this, the LCN Server(s) 810 determine that the local merchant information is relevant to the current need, and thus retrieve 858 and send 860 the cached local merchant information to the WHUB 804.

In conjunction with the above exchange of information, alerts of both the diaper condition and the low diaper inventory may be provided and retained for user review. When the user is ready to make a purchase, this may be accommodated via the WHUB 804. This purchase request may be made by directly interfacing with the WHUB 804, or by using the UE 802 in the fashion described above. The latter option is shown. There, the UE 802 sends 862 its Tag ID and purchase request to the WHUB 804. This, of course, may follow some browsing activity prior to the purchase request, so as to review the possible purchase options. The authentication may be as described above, based upon a Tag ID and password. The Tag ID and password are sent 864 to the authentication server, which returns a notification 868 confirming authentication.

Once the authorization is obtained, payment is sent 868 to the Local Merchant server 814 to complete the transaction, and the receipt, confirmation and other information may be fed back to the WHUB 804 regarding the same. For physical product like diapers, the WHUB will have provided (or the Local Merchant may already have) the shipping address. Additionally, if the Local Merchant is a provider of several items (such as a supermarket), then items may be accumulated prior to completing a purchase and/or making a shipment and/or making the products available for pick up by the user. The WHUB is preferably configured with a shopping list that allows organization of periodic cumulative purchases to accommodate this functionality.

Figure 9:
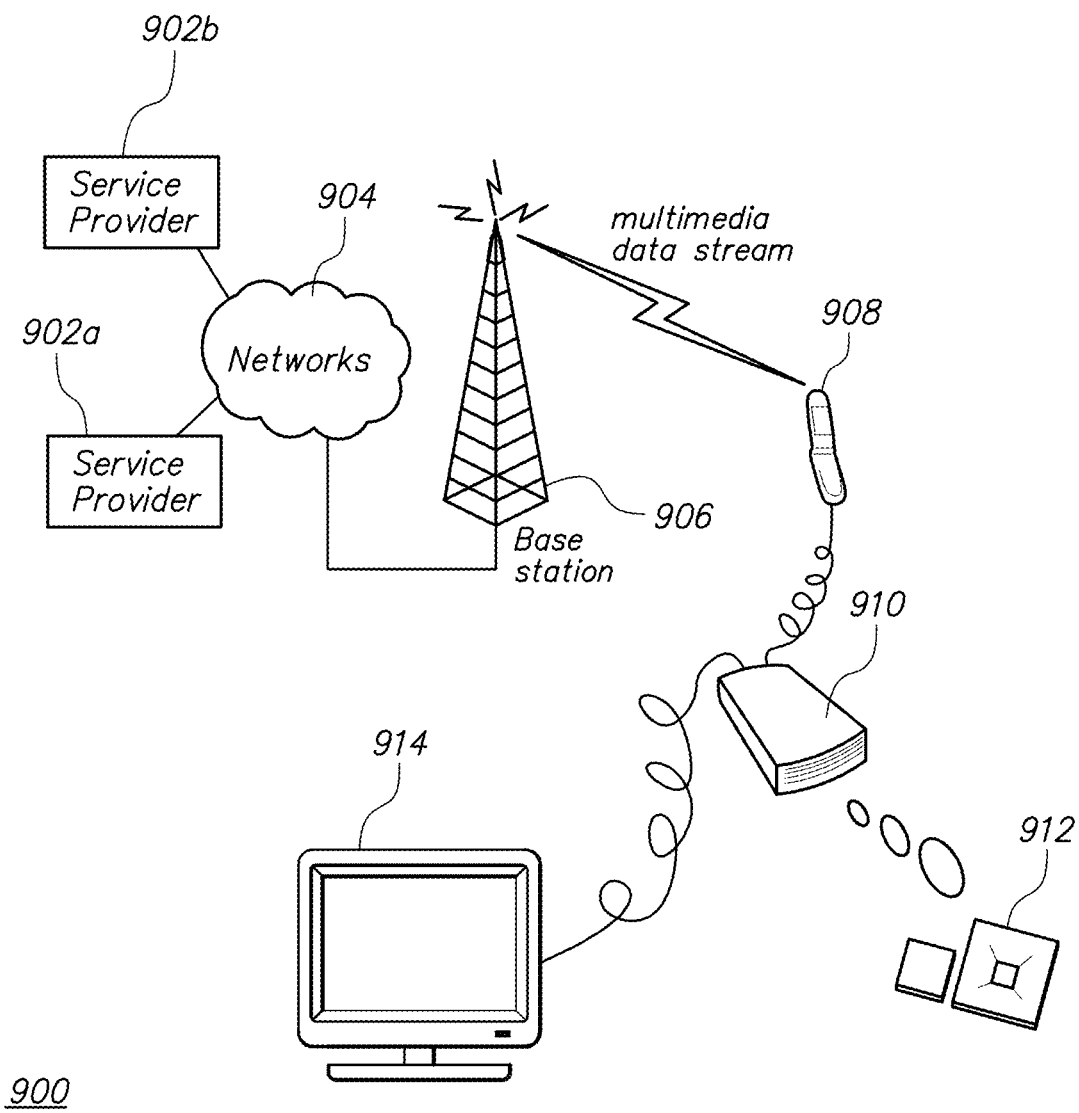
FIG. 9 is a schematic diagram illustrating an example of a system in which mobile terminal signal conversion may reside.

FIG. 9 is a schematic diagram illustrating an example of a system 900 with mobile terminal signal conversion.

Mobile terminal signal conversion accommodates displaying the high rate data flow multimedia information available in a wireless communication environment in an external device, which allows true realization and enjoyment of the benefits of the multimedia content.

In one example, the multimedia information is provided to a wireless mobile terminal using so-called next generation cellular technology (i.e., 3G and 4G), which can be employed in transmitting multimedia information (e.g., rich graphics, real-time audio/video). Because of the relatively small screen size and low quality ear phones, for many applications the mobile terminal cannot adequately reproduce the high quality multimedia information that can be communicated using next generation technology with adequate clarity and satisfaction. Mobile terminal signal conversion makes usage of a separate multimedia display terminal including but not limited to a monitor, television set, projector, or LCD display. These displays typically have video and audio reproduction capabilities that are superior to those found on mobile terminals. They also use a power supply that is separate from the mobile terminal.

Still referring to the system 900 illustrated in FIG. 9, multimedia information may be provided by any number of service providers 902*a*-*b* and delivered through a network 904 to a base station 906 to ultimately accommodate transmission of the multimedia information, among other things, to a cellular phone 908. This system 900 is provided by way of example, and it should be understood that any conventional or to-be-developed technology for delivering voice and/or data to mobile terminals may be provided. These wireless communication networks include but are not limited to a cellular communications network or a wireless local area network.

Also illustrated is a typical external display system 914. This may also be variously provided and may be digital or analog. Examples of digital Systems include HDTV, LCD and plasma. Examples of analog Systems include television sets that implement standards such as NTSC, PAL, SECAM, and analog computer monitors (SVGA, VGA). The external display system 914 does not have the size constraints of the display screen on the cellular phone 908 and is preferably powered independently.

In the illustrated embodiment, a mobile terminal signal conversion module (MTSCM) 912 resides within a separate housing 910, outside the cellular phone 908.

Figure 12:
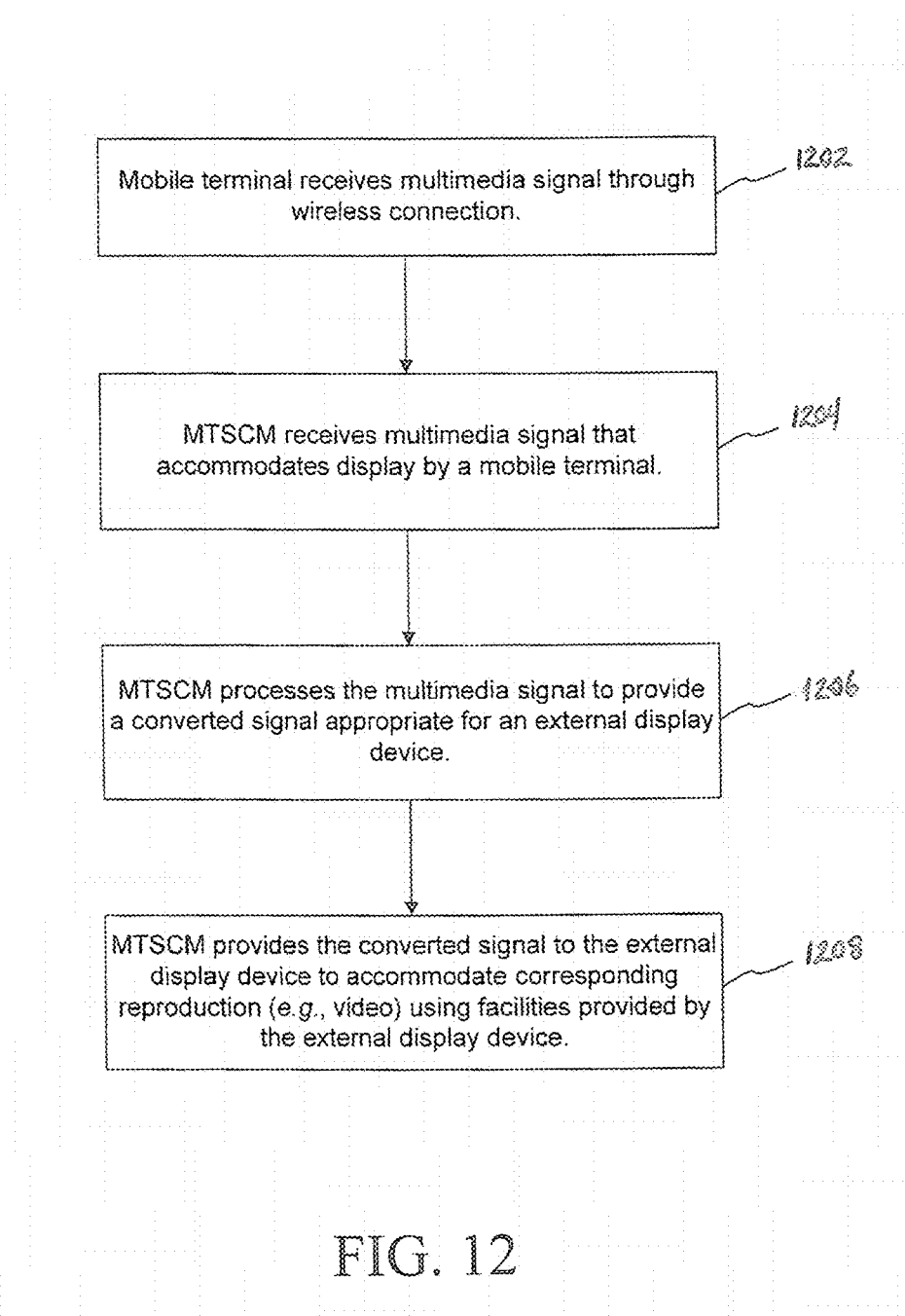
FIG. 12 is a flow diagram illustrating an embodiment of a process including mobile terminal signal conversion.

The functionality of the MTSCM 912 is now further described with concurrent reference to FIG. 9 and the flow diagram of FIG. 12.

The MTSCM 912 processes signals to accommodate reproduction by an external device. Specifically, a multimedia signal is transmitted to the cellular phone 908 through the wireless communications network as previously described (step 1202). The multimedia signal may include a video signal intended for reproduction by the cellular phone 908, using the cellular phone display screen. For ease of description, processing of a video signal is described, although it should be understood that any multimedia signal or component thereof may be converted in accordance with the present invention.

The cellular phone 908 is connected to the MTSCM 910. This may be accommodated by a cable connection that interfaces the cellular phone 908 to the MTSCM 912 housing 910. Through this connection, the MTSCM 912 receives the video signal from the cellular phone 908 (step 1204). The video signal as received may be configured to accommodate a video display on the screen provided by the cellular phone 908. The cable connection is an example of a wired connection interfacing the cellular phone 908 to the MTSCM 912. An alternative wired connection is a seat that directly interfaces the two without a cable. A wireless connection may also be provided, although it may currently be less practical to provide than the wired connection because of the potential for high throughput rate requirements. The wireless connection may also implement any conventional known technology including but not limited to a Bluetooth connection.

The MTSCM 912 processes the video signal to provide a converted video signal that has a display format and/or signal power level appropriate for an external display terminal 914 that is separate from the cellular phone 908 (step 1206). The display format and/or signal power level of the external display terminal 914 may be different from that of the cellular phone 908 but there may also be embodiments where the format is the same. Even if the formats are the same, conversion of the signals to accommodate display on the external display terminal 914 would still be implemented to adjust the power level for driving the external display, and possibly to minimize throughput requirements. This signal conversion is described further with reference to FIGS. 10 and 11, below.

Figure 13:
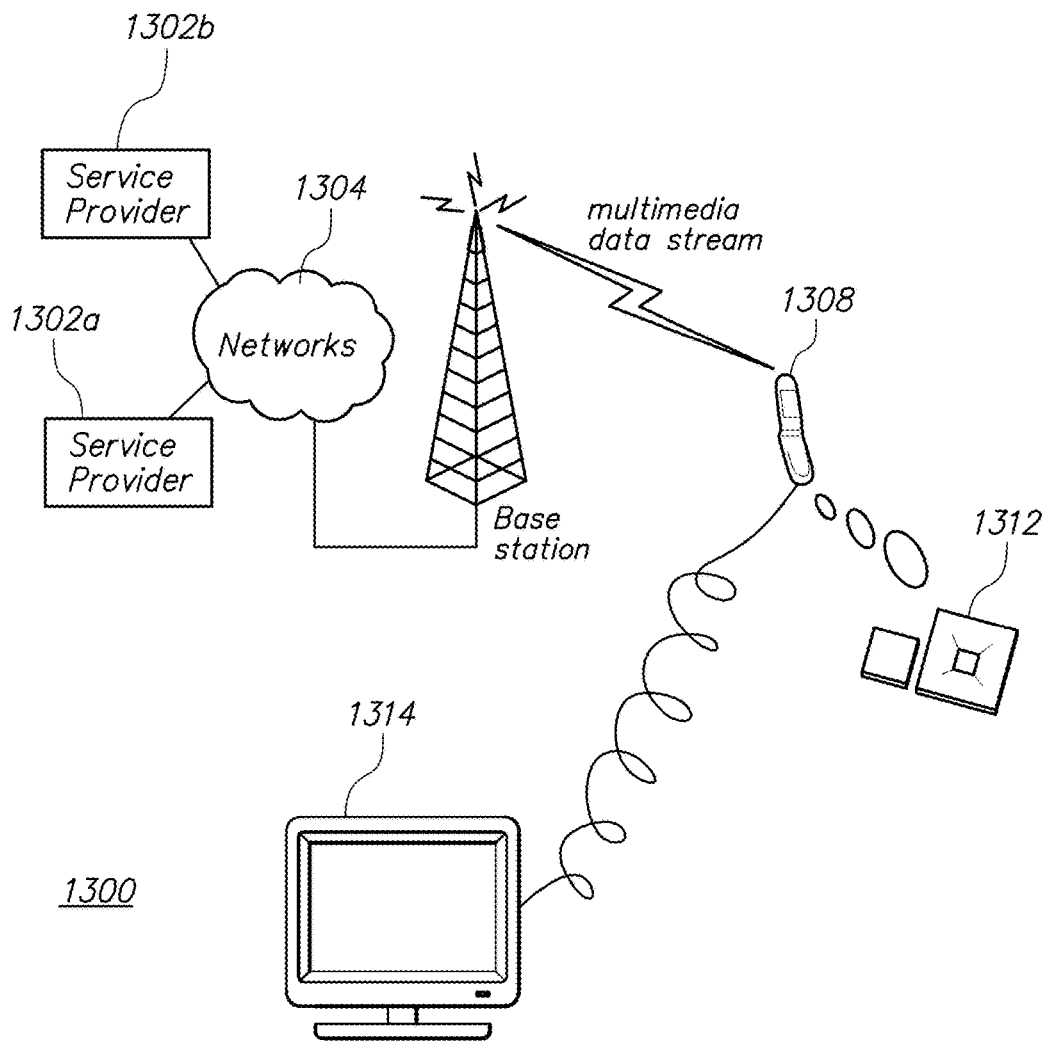
FIG. 13 is a schematic diagram illustrating another example of a system in which mobile terminal signal conversion may reside.

Still referring to FIGS. 9 and 13, following signal conversion, the MTSCM 912 provides the converted video signal to the external display terminal 914 to accommodate the corresponding video display on a screen provided by the external display terminal 914 (step 1208). This may be accommodated through a connection between the MTSCM 912 housing 910 and the external display terminal 914 as shown.

As used herein, mobile terminal refers to typically handheld mobile devices such as cellular phones and personal digital assistants. Although these devices include an execution platform as well as input and display capabilities, such devices are distinguished from personal computers, such as desktop or laptop computers, which are not designed for convenient handheld usage.

Figure 10:
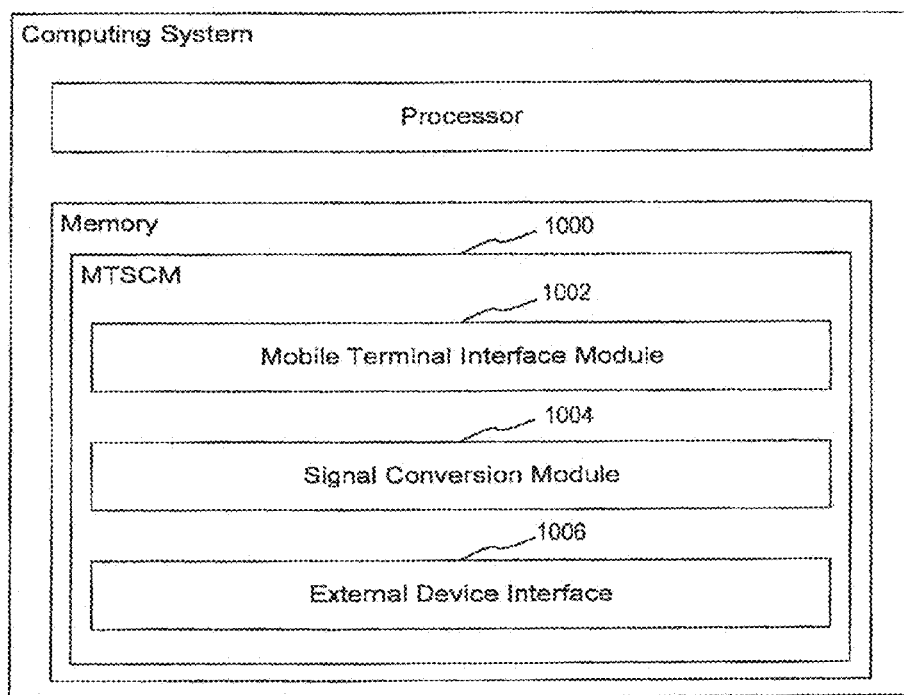
FIG. 10 is a block diagram illustrating an example of a mobile terminal signal conversion module.

FIG. 10 is a block diagram illustrating an example of an MTSCM 1000 in accordance with the present invention. The MTSCM 1000 may be provided as software, firmware, hardware, or any combination thereof.

Where the MTSCM 1000 is provided as software, it operates in the context of an execution platform. That is, the MTSCM 1000 includes instructions that are stored in memory for execution by a processor. Any conventional or to-be-developed execution platform may be used. The processor, memory, and related elements such as a power supply are well known and need not be described herein to convey an understanding of the invention. Additionally, FIG. 10 illustrates one modular breakdown for the components of the MTSCM 1000. It should be understood that the described functionality may alternatively be provided by an MTSCM having fewer, greater, or differently named modules from those illustrated in the figure.

Additionally, although modules as shown to reside in a common location, it is noted that the functionality may reside in separate components of a system that includes a mobile terminal, an external monitor, and (optionally) an intermediate device housing the MTSCM and interfacing the mobile terminal and external monitor. In other words, the overall functionality of the MTSCM may be separated such that portions of the overall functionality are respectively provided by the mobile terminal, separate intermediate housing, and/or the external display device.

The MTSCM 1000 may also be provided in the form of a chipset, configured for inclusion in a mobile terminal, dedicated separate signal conversion device, or external display terminal, and to provide the described mobile terminal signal conversion functionality.

The MTSCM 1000 includes a mobile terminal interface module 1002, a signal conversion module 1004, and an external device interface module 1006.

The mobile terminal interface module 1002 accommodates receiving the multimedia signal from the mobile terminal. A conventional physical interface provides a connection between the MTSCM 1000 and the mobile terminal through which the signals flow to the MTSCM 1000. The mobile terminal interface module 1002 recognizes the multimedia signal and stores the signal for processing by the remaining modules. Buffering and the like may be implemented to accommodate storage and signal processing, as described further below.

The signal conversion module 1004 is in communication with the mobile terminal interface module 1002 and thus accesses the received multimedia signal. The signal conversion module 1004 recognizes the multimedia signal format, and processes the multimedia signal to provide a converted signal. The converted signal may have a format and a signal power level that differs from the one used by the mobile terminal, as appropriate for one or more types of external devices to which the MTSCM 1000 is connected. Various examples of the type of devices to which the MTSCM 1000 may be connected are illustrated and described in connection with FIG. 11, below.

The external device interface 1006 is in communication with the signal conversion module 1004 and thus accesses the converted signal. The external device interface 1006 also allows connection to the external (e.g., display) device. The external device interface 1006 may provide both the feeding of the converted signal to the external device, and driving the external device. Alternatively, the external device interface 1006 may merely feed the converted signal to the external device, with the external device including internal elements for driving its signal reproduction (e.g., display) facilities.

Figure 11:
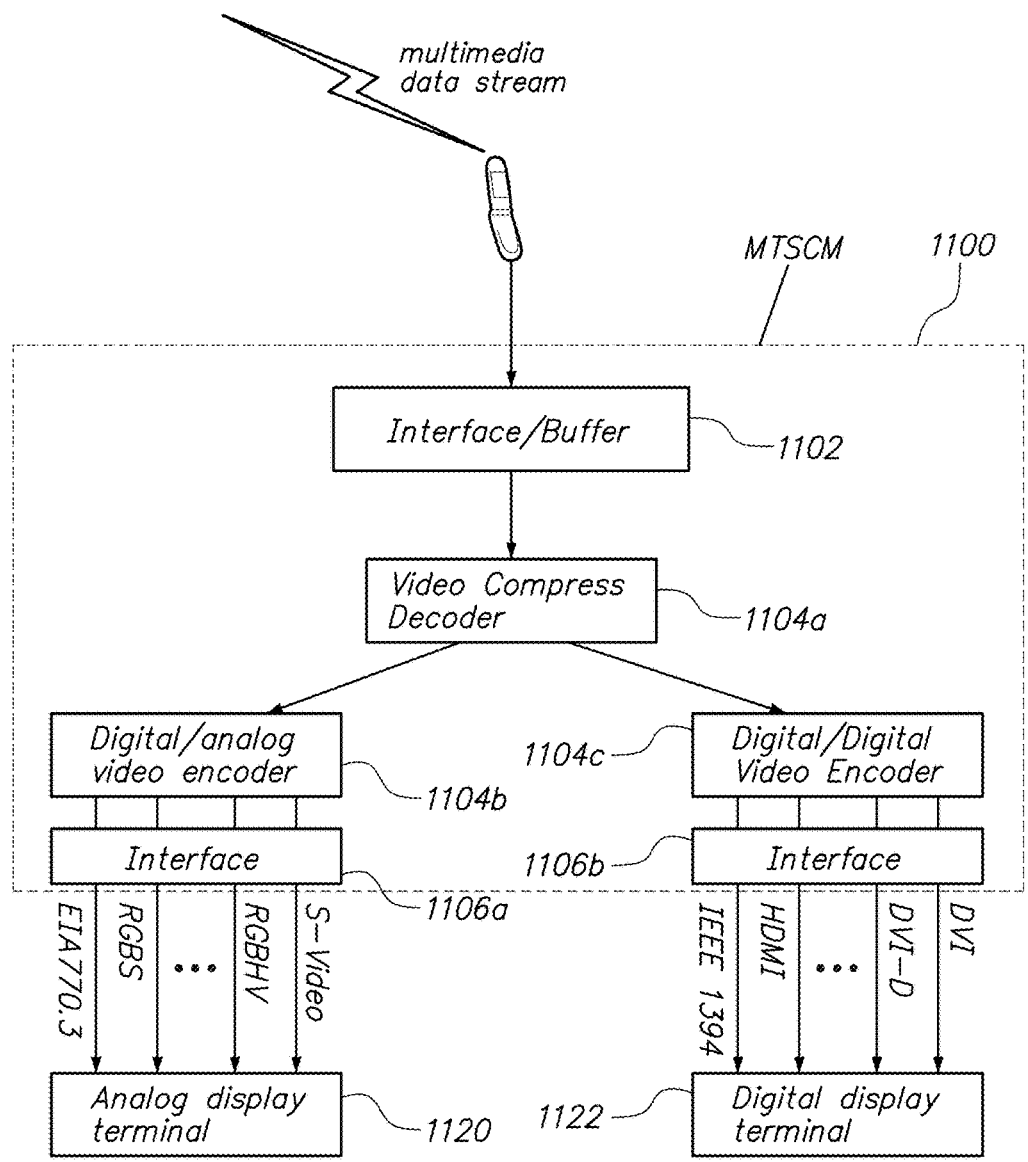
FIG. 11 is a block diagram illustrating another example of a mobile terminal signal conversion module.

FIG. 11 is a block diagram illustrating another example of the MTSCM 1100. The MTSCM 1100 includes additional detail regarding the signal conversion aspect, and illustrates examples of differing types of external devices to which the MTSCM 1100 may provide converted signals. The illustration and corresponding description are provided by way of example. Although numerous connections are illustrated, it should be understood that the present invention may be practiced in the context of providing as few as one, and as many as all of the listed connections. It should also be understood that there may be additional examples that are not listed herein, but which are encompassed by the teachings described herein.

The MTSCM 1100 includes an interface/buffer module 1102 that is analogous to the previously described mobile terminal interface module. The buffer and interfacing are configured to accommodate signal processing by the remaining elements in support of the requirements and expectations of users of the multimedia signal output (e.g., adequate buffering and processing rate to provide real time audio/video). The mobile terminal video compression format may of course vary, but currently the most likely format is MPEG-1 or MPEG-2. Buffering and throughput rate may also be provided as desired by the designer. Currently, it is believed that 200 Mb is an adequate buffer size, although buffers of 500 Mb or more may of course be provided. Additionally, a throughput rate of approximately 10 Gb/s will be adequate for many current Systems, but may be increased as demands and technology evolve.

The Video Compress Decoder 1104a receives the multimedia signal. The multimedia signal is typically provided in a compressed format to accommodate increased signal transfer rates. An example of a compression scheme is that provided by one of the MPEG standards (e.g., MPEG-1, MPEG-2, MPEG-4). The Video Compress Decoder 1104a is configured to include the appropriate compression/decompression (CODEC) module to accommodate decompression of the received multimedia signal. For example, where the compression scheme is MPEG, the Video Compress Decoder 1104a includes an MPEG CODEC to accommodate processing of such multimedia signals.

As an alternative to provision of the Video Compress Decoder 1104a in the MTSCM 1100, the functionality may be provided within the cellular phone or other mobile terminal. However, this may be less practical because of the high bandwidth that would be required between the cellular phone and the MTSCM 1100 to deliver the decompressed signal, and the corresponding likelihood of a larger buffer requirement for the MTSCM 1100.

The Video Compress Decoder 1104a outputs a decompressed digital multimedia signal that is passed to the Digital/Analog Video Encoder (DAVE) 1104b and/or the Digital/Digital Video Encoder (DDVE) 1104c. The DAVE 1104b is configured to prepare signals for analog external display terminals 1120, and the DDVE 1104c is configured to prepare signals for digital external display terminals 1122. The DAVE 1104b and DDVE 1104c respectively receive the decompressed multimedia signal and convert the signals to the format(s) and signal power level(s) required for the terminals to which they interface.

Examples of formats used by analog display terminals 1120 include S-video, RGBHV, RGBS, and EIA770.3 as illustrated. Similarly, the DDVE 1104c provides output using standards such as DVI, DVI-D, HDMI, and IEEE1394. The signals respectively provided by the DAVE 1104b and DDVE 1104c are provided to the terminals through conventional interfaces 1106a-b. The DAVE 1104b functionality may be embodied as a video card that is configured accordingly. Examples of video cards that may be configured to provide the described functionality include but are not limited to the Diamond Stealth S60, ASUS V9400-X, or RADEON 7000.

Ultimately, the signals are used to provide a display on the external display, as required according to the particular type of display. For example, the video data stream may be a digital RGB signal which represents the intensity of the red, green and blue light respectively at different position. This signal is converted to analog by a D/A converter. This converted analog signal is quantified to the voltage and format required by the standard, such as the input of cathode-ray-tube (CRT) monitor. This standard video signal will drive a set of electron guns, which produce a controlled stream of electrons to display of red, green and blue light respectively on a CRT screen. This is but one example and the present invention is not limited to a particular technology (e.g., CRT) for the external display.

As described, in one embodiment the MTSCM may be independently housed separately from both the mobile terminal and external display terminal, with respective connections to the other devices to provide a system configuration that includes the three pieces of hardware (mobile terminal, conversion box, external display terminal). This configuration provides the flexibility of allowing any standard mobile terminal and/or display to be potentially interface with the MTSCM without imposing constraints on the mobile terminal or external display terminal manufacturers. A possible drawback to this configuration is that additional hardware is introduced into the system.

In lieu of the three component system, the MTSCM may be located in either the mobile terminal or the external display. FIG. 13 is a schematic diagram illustrates an example of a system 1300 in which the MTSCM mobile terminal signal conversion may reside within the mobile terminal 1308. The components and functionality of the service providers 1302a,b network 1304 and base station 1306 for delivering multimedia signals to the mobile terminal 1308 is the same as for the analogous elements of FIG. 9 and need not be re-described. Similarly, the external display terminal 1314 may be any of the various types named above.

The MTSCM 1312 provides the same functionality described above. However, in contrast to residence in a separate housing, the MTSCM 1312 is a component of the mobile terminal 1308. A potential advantage of this system 1300 is that, again, any standard equipment can serve as an external display terminal 1314, without a constraint on the display manufacturer. Additionally, only a simple wired or wireless interface is required to connect the external display with the mobile terminal 1308. This means, for example, that the user will not be required to carry a bulky conversion module in addition to their cellular phone.

A potential drawback to this system 1300 is that the execution platform of the mobile terminal 1308 may be designed to accommodate only traditional functionality, so for some Systems it may be challenging to add the MTSCM functionality to the existing platform. Additionally, the MTSCM will consume power that may unduly exhaust the limited power supply offered by the mobile terminal 1308 battery. It is useful for this embodiment to provide power to the mobile terminal 1308 through the cable connection to the external display terminal 1314, but again this may require modification to the mobile terminal 1308 as the existing charger interface may be insufficient.

Figure 14:
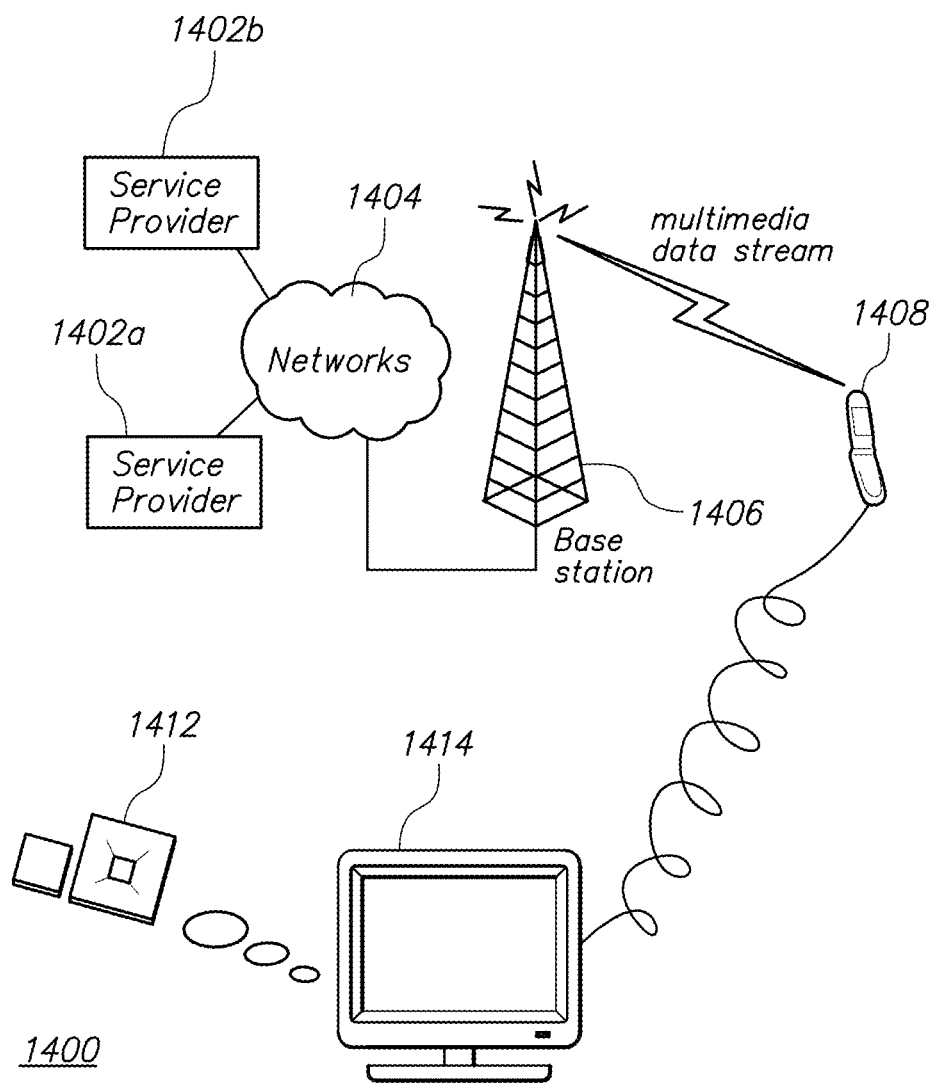
FIG. 14 is a schematic diagram illustrating still another example of a system in which mobile terminal signal conversion may reside.

FIG. 14 is a schematic diagram illustrating another example of a system 1400, in which the MTSCM 1412 resides within the external display terminal 1414. As with FIG. 13, the components and functionality of the service providers 1402a,b network 1404 and base station 1406 for delivering multimedia signals to the mobile terminal 1408 is the same as for the analogous elements of FIG. 9 and need not be re-described.

Here, the mobile terminal 1408 need only be connected directly to the external display terminal 1414. However, in lieu of having the MTSCM 1412 functionality reside within the mobile terminal 1408, it is part of the external display terminal 1414. The power supply and execution platform issues associated with placing the MTSCM 1414 in the mobile terminal are resolved with this system 1400, and any mobile terminal 1408 can potentially be connected to any MTSCM-ready external display without requiring modification, other than provision of an output interface. A potential drawback of this configuration is that it adds a component to the standard external display terminal, and corresponding costs.

Figure 15:
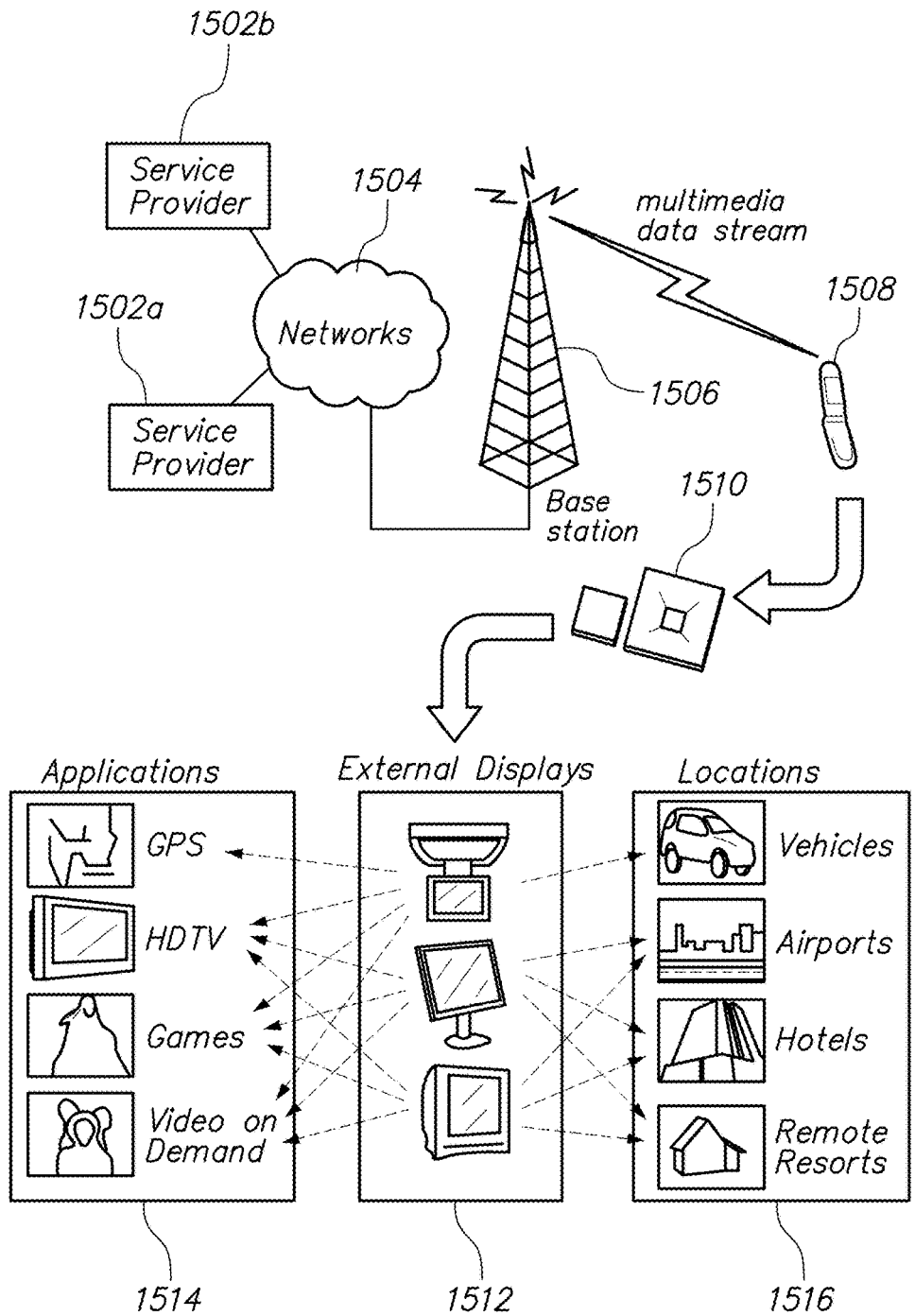
FIG. 15 is a schematic diagram illustrating examples of mobile terminal signal conversion applications.

FIG. 15 is a schematic diagram illustrating examples of mobile terminal signal conversion applications 1500 in accordance with the present invention. These applications 1500 are provided by way of example, to give the reader an understanding of the potential contexts in which embodiments of the present invention may operate. The present invention is not limited to the disclosed applications, nor are all potential applications required for any given embodiment.

The basic architecture for provision of the wireless communications signal and corresponding multimedia signal is as described above for the service providers 1502a-b, network 1504, base station 1506 and mobile terminal 1508. The MTSCM 1510 may be separate or reside in the mobile terminal 1508 or display terminal 1512. Examples of applications 1514 where a larger screen and potentially superior audio may be enjoyed include video conference, HDTV, games, GPS, and video on demand. Additionally, embodiments of the present invention will accommodate enjoyment of full multimedia capability in locations 716 including vehicles, airports, hotels and remote resorts. Thus, for example, the present invention accommodates usage inside a vehicle, a plane or any type of transportation, enabling the passenger to browse the Internet, watch TV, play games, participate in a video conference or call, and work on all sorts of software with full functionality.

Figure 16:
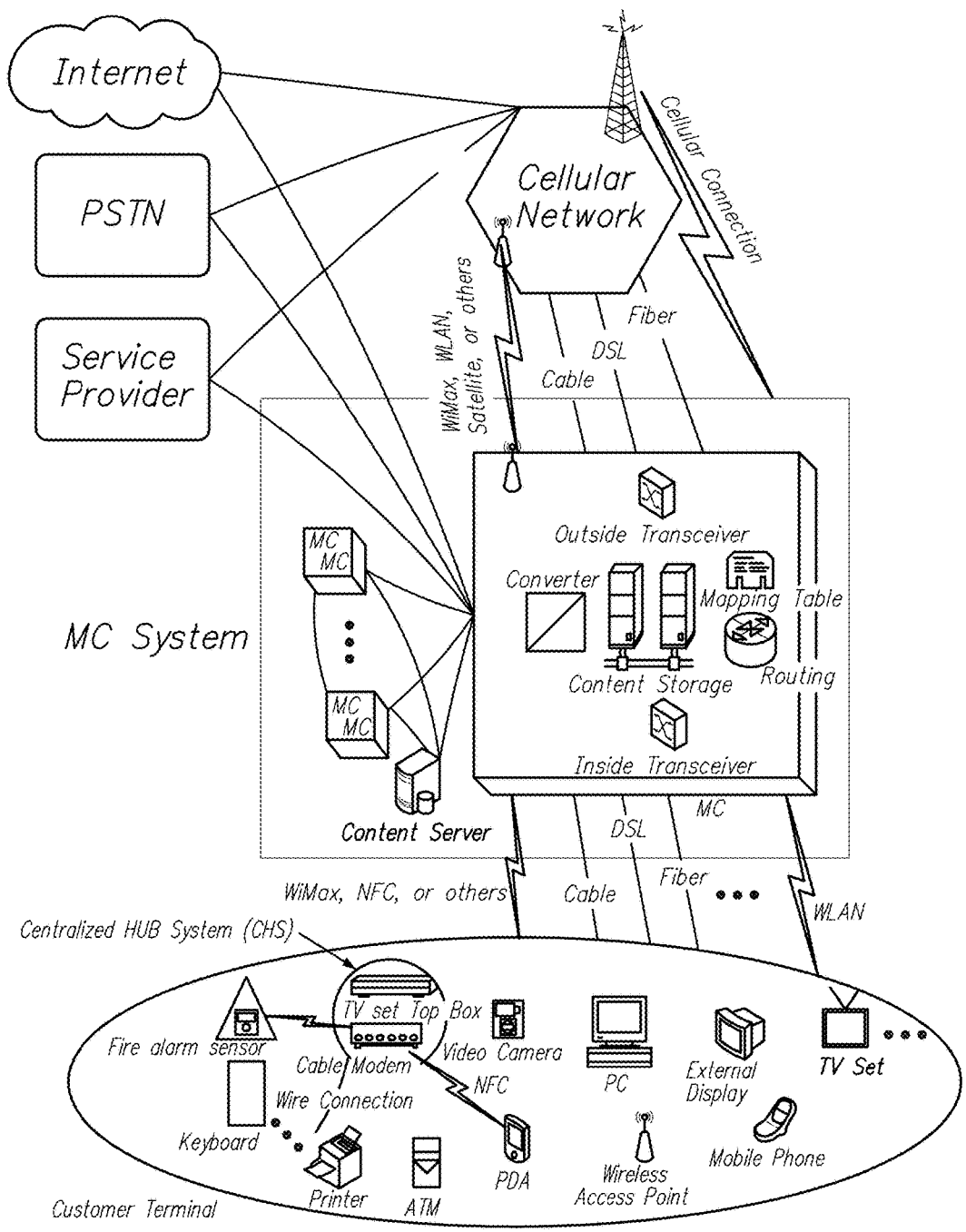
FIG. 16 is a schematic diagram illustrating a control system of multimedia communications of different user terminals.

FIG. 16 is a schematic diagram illustrating a control system for multimedia communications between different user terminals.

According to one aspect of this embodiment, a converting server that is variously positioned in network environments provides a routing function and a connecting function, and functions bi-directionally. Accordingly, this aspect provides for the transmission and receipt of content and converts such content in both directions depending upon the connected devices and corresponding protocols used by such devices.

According to another aspect of this embodiment, cellular television functionality is provided. Here, a television in form and functionality also includes cellular communication features as well as the above-described conversion functionalities. Preferably, one or more "channels" corresponding to the cellular application are provided in the cellular television so that the content received in this fashion may be accessed and viewed by a user in a fashion similar to that used for accessing traditional television channels.

According to still another aspect, one or more embodiments of the invention provide efficient integration for Internet, wireless networks, cable, DSL, satellite, and TV communications to enable communications among potentially different user terminals. The user terminals include home and office appliances (such as TV, computer) and wireless terminals (such as mobile phone, PDA). In a system configured according to this aspect, a Management Center (MC) System receives, selects, converts, compresses, decompresses, and routs data to the user terminals. Various examples are presented and will be apparent to the ordinarily skilled artisan once instructed according to the teachings of this aspect. By way of example, signals such as those from a fire alarm or theft sensor are sent through the MC System to a user's cell phone and/or 911 Center. Some processing functions may be performed by the MC System in combination with a user terminal and other MC Systems. In another example, a user's phone call (wireless or wired) is routed to a telephone, mobile terminal, computer, and/or TV as designated by the user.

The MC System functionality includes receipt, conversion and transmission of content in two directions. It also includes facilities for mapping and routing content to various connected devices and data storage for storing content that is served locally or to remote devices.

Receiving, converting and transmitting multimedia content may be performed in two directions using the MC System. For example, this may include receiving and transmitting signals from cellular networks, Internet, PSTN, other Management Centers, as well as receiving and transmitting signals from user terminals including televisions, monitors, diaper monitoring, a video camera, fire alarm, theft sensor, etc.

With regard to conversion, the MC System includes a converter module with routines for selecting, extracting, compressing, decompressing, adjusting data, and converting the data format and/or power lever and/or data package size/format.

The MC System also includes a mapping table and a routing module. The mapping table is described further below. It matches phone numbers, cable ports, DSL ports, IP addresses, etc. The routing module is for routing data to destinations through designated channels. The routing module accommodates routing the received data that is inbound from a variety of sources including but not limited to cable, broadcast television and Internet. It also accommodates routing to a variety of interfaces found on receiving terminals, including but not limited to RS232, USB2.0, and video cable port. The routing module receives the relevant information concerning routing from the results of looking up the same in the mapping table, and carries out the routing accordingly.

Finally, the MC System includes data storage such as a hard disk. This allows the MC System to store content to assist faster and more efficient data receiving and transmission to user terminals. The MC System may also conveniently retain converted content (e.g., compressed, coded, decrypted, decompressed) for subsequent additional access. This converted content may be provided internally or transmitted externally from the MC System.

It is also noted that the MC System may include software and/or hardware for filtering and treating viruses, such as viruses that involve the cellular network and corresponding cellular communications. For example, the MC System may periodically or persistently check for virus signatures when content is being transmitted or received by the MC System. Virus screening processes may thus be applied to multimedia content items in conjunction with their conversion, and at the same location (the domain of the MC System). This may be useful because virus screening may be applied to multimedia content before and/or after it is converted. Treatment may include blocking or quarantining viruses that are detected, deleting virus data or files, and communicating the possible presence of attacks to other MC Systems or external systems.

When a communication is inbound to the MC System, it may include a data package that identifies the destination device. This may be in the form of a unique device identifier that is associated with each device managed by the MC System. The mapping table is queried for the presence of the unique identifier. Once this is successfully performed, corresponding information regarding the processing of the communication may be automatically gathered from the mapping table.

Additionally, or alternatively, the MC System (and/or CHS) can obtain formatting, addressing, and other information by referencing portions of the received data package according to a predefined protocol. For example, information within the received data package may indicate the format (e.g., TCP package in Internet) for transmission and the format (e.g., data package defined by WCDMA standard in 3G) for receiving, as well as the destination address corresponding to the converted data format. The overhead information within the received data package can inform the MC/CHS regarding the next transmission protocol and matched format. That is, the data package received by the MC/CHS includes some defined extra data besides the desired content data. This information informs the MC/CHS regarding the inbound data format transmission protocol, and also the outbound data format and the transmission protocol corresponding to the data format.

For example, if the data package contains the identifier $DI_1$ it is determined that the communication is intended for the main television in the household. In a simple example, all communications to a given device may be required according to the same format and same address. For example, a regular video output may be directly connected via cable between a video output from the MC System to the video input of the main television (e.g., by coaxial cable, component cables, HDMI cable). With regard to this example, the MC System includes a regular output for making the connection to the television.

There may also be network-based connections, such as to a personal computer (or home LAN router) or directly to a television equipped with a network interface card and related functionality. In these instances the address information (and corresponding entries in the mapping table) would include the network address of the particular device. The MC System is equipped with its own network interface card and corresponding output to engage in these communications. These and other communications such as to a cellular phone via either the use of the cell phone number or a direct local wireless communication may be made, again as indicated in the mapping table.

There may also be situations where multiple different processes and corresponding conversion and addressing need to be applied for a given device. For example, a television set may be connected to both a network connection and the video output of the MC System. As another example, a cellular phone may have alternative communication capabilities as noted. In these circumstances, the mapping table may also include multiple different entries designating the address, signal format, etc.

Thus, the information in the mapping table may also be correlated to several processing category codes for a given device. For example, processing category code #1 for the television set may indicate that the inbound communication should be addressed, converted (if applicable) and routed to the television through the video output. This might be merely feeding conventional television signals to the television. On the other hand, processing category code #2 for the television may indicate that the inbound communication should be addressed, converted and routed through the network connection. Still further, some special content may require additional or different processing (e.g., conversion, decryption, etc.) as compared to other content. Additional processing category codes may allow such content to be processed appropriately. The processing category code may (like the device identifier) be a number that is included in the data package.

The data package may also be variously provided to the MC System. In one embodiment, the data package may be contained in a header area in packet data sent to the MC System by the source. Still further, at times the data package may itself contain information used in converting and/or addressing the appropriate device. For example, the data package itself may contain the network address of the destination device in lieu of looking for the same in the mapping table. As another example, all or part of key information for decrypting content may also be provided in the data package. As still another example, the data package may contain a flag to track an indication as to whether a virus screening process has completed successfully.

Devices that are intended to work with the MC System may also be equipped with software and/or hardware that allows them to insert and deliver the appropriate information in communications with the MC System. For example, a cellular phone may be equipped with software that provides the appropriately configured data package in initiating communications with the MC System that are directed to destination devices.

The MC System variously processes data depending upon corresponding devices and purposes for the data. For example, the data received from cellular networks are selected and then converted to be displayed on home or office appliances with different types of display screens. Similarly, some content can be displayed more properly by mobile phone displays.

In addition, some data are also compressed and re-organized at the MC System so that they have certain data package sizes and formats for matching the requirements of the relevant transmission networks. For example, the signals sent from a wet diaper, fire alarm, and/or theft sensor may be transmitted to a user's cell phone or 911 Center. This information may be compressed before transmission over the wireless network, which allows increased efficiency when using the wireless communication channel Additionally, security and encryption protocols (e.g., SSL) and error prevention protocols and coding schemes (e.g., Huffman, Solomon, or Turbo LDPC coding) may be applied to ensure that the information that is transmitted remains secure and without error.

By way of example, this aspect of the invention may be applied to home appliances. The home appliances (e.g., TV set, PC, Handset, Printer, PALM, camera, Headset, game controller, refrigerator, etc.) may also function through a centralized HUB system (CHS). Such a HUB system is previously described in detail above. The CHS communicates with the MC System and/or Internet and/or other networks. The CHS can also be built into a cable modem, TV set top box, or other device. The signals, for example, from a wet diaper, fire alarm, or theft sensor can also be sent from the CHS. Finally, it is noted that the CHS may perform the functions described for the MC System.

The commonly practiced wireless connection centralized by wireless access point is based on WLAN technology, which is IP-oriented technology. Since the IP addresses may exhaust over time, each consumer electronics item such as headset, game controller, etc. configured to have an IP address is costly and fails to serve the user's needs well. One or more embodiments of the present invention offer two aspects in this regard. First, an intelligent management system centered by traditional connection equipment, such as TV set top box, cable modem, DSL modem or the like unites, manages, and optimizes the consumer electronics' functions. Also provided is a non-IP based wireless connection among these consumer electronics devices.

As shown in FIG. 16, the CHS communicates with the Internet through ADSL or cable and cellular base stations through wireless connection. The consumer electronics items communicate with the CHS through wireless channels such as Bluetooth, UWB, NFC or wire line connection. CHS is the center of this wireless communication system.

A handset (e.g., cellular phone) can receive Internet data through CHS and/or MS instead of communicating with a cellular base station. This communication channel is more reliable, less costly, and offers improved bandwidth compared to conventional connections between base station and the cellular phone.

There may be a corresponding connection between the CHS and the cellular network. This may implement a traditional wireless connection between the CHS and a cellular base station, with the communications implementing conventional wireless communications protocols. Another possibility is a leased line or wireless line connecting the CHS to the core cellular network. The CHS preferably includes a WiFi router function as well as the ability to route addresses between IP and cellular telephone number. It also is able to report to the cellular network with regard to the location of a particular user, so that information designated for that particular user may be directed to the CHS accordingly (e.g., calls, content ordered by particular user via cellular phone, etc.). It also may include any necessary conversion functions. In addition to reporting the location of a user to the cellular network, the MC System (or CHS) may also report roaming information to other MC Systems (or CHS). This allows subsequent communications between users without involving the cellular network. That is, a first user may be located in the covered area for a first MC System, and a second user may be located in the covered area of a second MC System. While this circumstance remains, communications between the first and second users via their mobile terminals may involve the wireless connections from the MC Systems (as well as the connection between MC Systems, which may, for example, be an IP connection).

In addition, the information sent to the cellular phone can be delivered to a TV for a better display in accordance with another aspect of the present invention. Furthermore, the communication between CHS and an oven with sensors and corresponding conditions can be variously triggered, such as through the detection of boiling water or the temperature of the food in an oven. A signal to arouse the attention of whomever is cooking the food or boiling water is transmitted to the TV, acoustic system, cellular phone, computer, beeper, mobile terminal, PDA, etc.

Another example of the application of the invention is that a wireless transceiver can be installed in a child's diaper. When the diaper is wet, the communication between diaper and CHS is triggered. Corresponding signals will be delivered to TV, cellular, day care center, etc.

Internet content is one source of data transmitted to users' terminals through the MC System. One aspect of this invention is the structured location of the Content Server and/or MC Systems, as shown in the FIG. 16.

As described in further detail above, a cache of locally applicable content caches particular Internet content that is determined to be locally applicable based upon the monitoring of the Internet content accessed by users from the particular location. This content may be content that has also been converted as described herein. The particular Internet content is preferably cached at a local content storage placed within local Management Center. Alternatively, the particular Internet content is cached at Content Server which is placed logically proximate to two or more Management Centers sharing the Internet content. Logical proximity may be variously carried out, such as through physical proximity or by provision of dedicated bandwidth and resources. Requests for Internet content for the particular location may thus be served from the cache, to optimize delivery, where the cache contains the requested content.

In addition, the caching of locally applicable Internet content may be maintained on a layered basis, such that a first layer of local applicability corresponds to Internet content requested by users in a first geographical area in which the particular location resides, and at least one succeeding layer of local applicability corresponds to Internet content requested by users in at least one succeeding geographical area that encompasses and is larger than the first geographical area.

Merchants or other commercial entities may also provide some form of access to information related to the locally applicable Internet content, with commercial incentives such as coupons or advertisements being delivered to users based upon that information.

The logical proximity based on physical proximity or provision of dedicated bandwidth and resources also applied to the locations of MC Systems and/or Content Servers. MC Systems and/or Content Servers are located according to the local service requirements, dedicated bandwidth and other resources, geographical and demographical situations, cost, etc. The MC Systems can also be structured and placed in layers as described in the layered structure of Content Servers. The comparative positioning of MC Systems and Content Servers are determined based on service requirements, resources, costs, and monetary incentives. Importantly, the Management Centers and Internet Content Servers are structured for efficient transmission of data and to avoid bottleneck problems.

It is noted that this aspect is not limited to Internet content. The MC Systems and Content Servers may store content from various resources.

A variety of data transmission protocols may be used to transmit multimedia content to the MC System, including from cellular networks (e.g., 3G), Internet, Service Providers, and from other MC Systems.

A set of transmitter(s) and/or receiver(s) for connection with external resources is equipped at the MC System. The connection channels for data transmission may include wired line connections (e.g., DSL, Fiber, Cable, DSL, least line, etc.) between the MC System and outside networks (e.g., Cellular Network, Internet, Service Provider networks). Additionally, wireless connections (e.g., WiMax, Satellite communications (e.g., VSAT system), traditional communications with cellular base stations, point-to-point or point-to-multipoint wireless connections) may provide the connection between the MC System and outside networks. MC Systems may also connect, communicate, route, and relay content among and between each other. The connections among MC Systems are structured by efficient data transmission, service requirement, cost, bandwidth and other resources availability, and the relationships with Internet Content Servers, Cellular Networks, local Service Providers, and other MC Systems.

A variety of communications may also be applied for the communication channels between the MC System and the various local user terminals. At the user terminal side, the users use TV, computer, DSL modem, Cable modem, WLAN access point, mobile terminals, and various sensors that communicate with the MC System.

A set of transmitter(s) and/or receiver(s) are equipped for the data transmission between the MC System and user terminals. Communication channels between the MC System and user terminals include the following: (1) direct connection using the available transmission port/standard such as USB, RS232, TV cable, Ethernet, Telephone line, etc.; (2) Wireless Personal Area Network such as UWB, Bluetooth, WLAN, etc.; (3) Long-range wireless connections such as WiMax, Satellite, e.g., VSAT, TV broadcast, etc.; or (4) Wire-line connection such as DSL, Cable, Ethernet, etc.

The data transmission between an MC System and user terminals can be one-way or two-way. One-way data transmission includes data sent from the MC System to the user terminals and the data sent to the MC System from user terminals. For example, the MC System sends data to user terminals (e.g., advertisement broadcast to TVs, computers, mobile terminals, etc.). Similarly, the user terminals send data to the MC System (e.g., signals sent from a fire alarm to an MC System.). The data transmitted between an MC System and a user terminal is preferably bidirectional. In this circumstance, transmitter and receiver at both sides are equipped.

The operations on data processing and transmission at an MC System can be shared with a plurality of user terminals and/or other MC Systems. In some circumstances, some functions of the MC System described above can be done by a user terminal so the MC System is omitted. One aspect of the invention is a TV or other display that is equipped to receive RF signals sent from cellular base stations. The cellular television demodulates, and/or compresses/decompresses data, and/or converts the signals to the appropriate format before displaying the image/video. The conversion and transmission provided with the television can also be two-way. The cellular television with a video camera/microphone can also record and extract the multimedia information, which can be transmitted to other users' terminals through cellular network or Internet. The cellular television is equipped to extract and/or convert, and/or compress, and modulate the multimedia information before sending it to the cellular base station. The cellular television also preferably has a separate channel for displaying multimedia information from the cellular network or other networks beyond traditional TV programs. Users may also use the TV remote controller to dial telephone numbers like a telephone dial panel.

Figure 17:
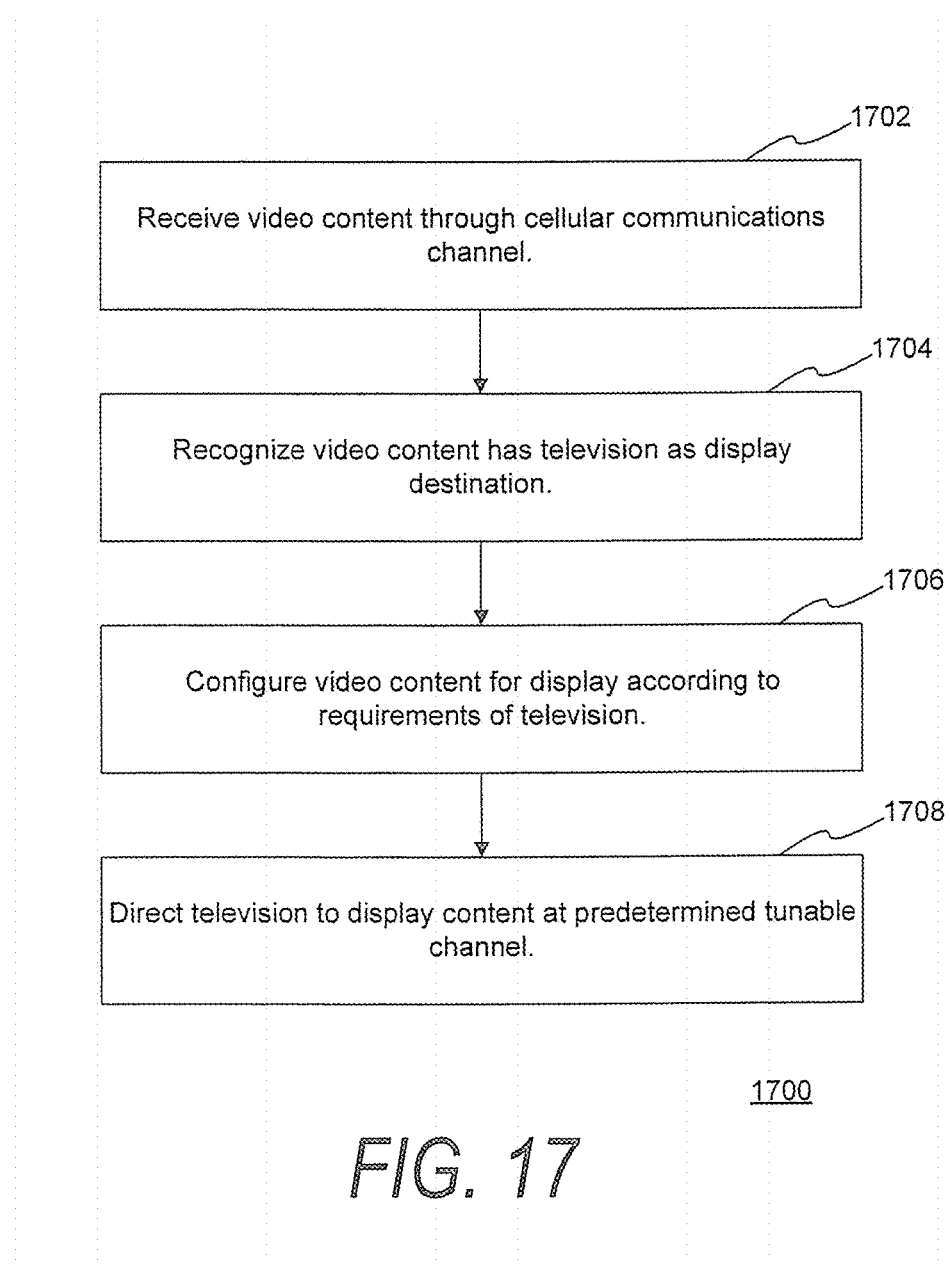
FIG. 17 is a flow diagram illustrating an example of directing a television to display content using signals received from a remote location through a cellular communications network.

FIG. 17 is a flow diagram illustrating a process 1700 for directing a television to display content using signals received from a remote location through a cellular communications network. In one embodiment, the process is carried out within a television set that is equipped to receive the signals wirelessly from a cellular base station and provide the corresponding conversion and direction to display the content on a given channel. In that regard, the housing of the television set includes conventional cellular phone technology for at least receiving (and possibly sending, if desired) calls via a connection to a cellular network. The television set is also equipped with processing capability for carrying out the signal conversion requirements, as described in detail above regarding the MTSCM.

In an alternative embodiment, a set top box is configured to receive the wireless signal, and to output signals appropriately formatted for the television. In still another embodiment, the MC System is equipped to receive a wireless signal, and to perform the conversion and routing to the television set. In either of these circumstances, the set top box or MC System is similarly equipped to provide the noted cellular communications capability and MTSCM functionality. It is also noted that there may be embodiments where the functionality is divided between the set top box, television set, MC System and/or CHS in various ways involving at least two and sometimes all three devices.

The process initiates upon receipt 1702 of video content through a cellular communications channel. This communication may be received, for example, at the initiation of a cellular phone user who wishes to send the content. The connection may, for example, be made using a regular cellular telephone call to a designated number corresponding to the television. At this time, the content as sent from the remote cellular phone to the television will be formatted as required by the cellular network. The MTSCM functionality converts such signals from the cellular network and related format to the format used by the television (e.g., SD or HD standards).

Where it is recognized 1704 that video content has the television as a display destination, the video content is then configured 1706 for display according to the requirements of the television, for example as described regarding the MTSCM functionality. Recognition 1704 that the content is destined for the television set may be presumed where a dedicated number or known routing of signals to the television set at a given interface is provided.

Finally, the television is directed 1708 to display the converted content on a predetermined channel. This predetermined channel may, for example, be a tunable channel that is otherwise unused for other forms of content. To view video content in this fashion, the user merely uses a channel button or the like to navigate to the appropriate channel, and then the converted content is shown on the display screen of the television. In the alternative where the set top box is used to provide the noted functionality, the tuning may be provided through a remote that controls the set top box. A given channel on the set top box may correspond to the content received in this fashion. The output of the set top box provides the converted content through a conventional connection to the television such as an HDMI, component cable, S-video or other connection.

Figure 18:
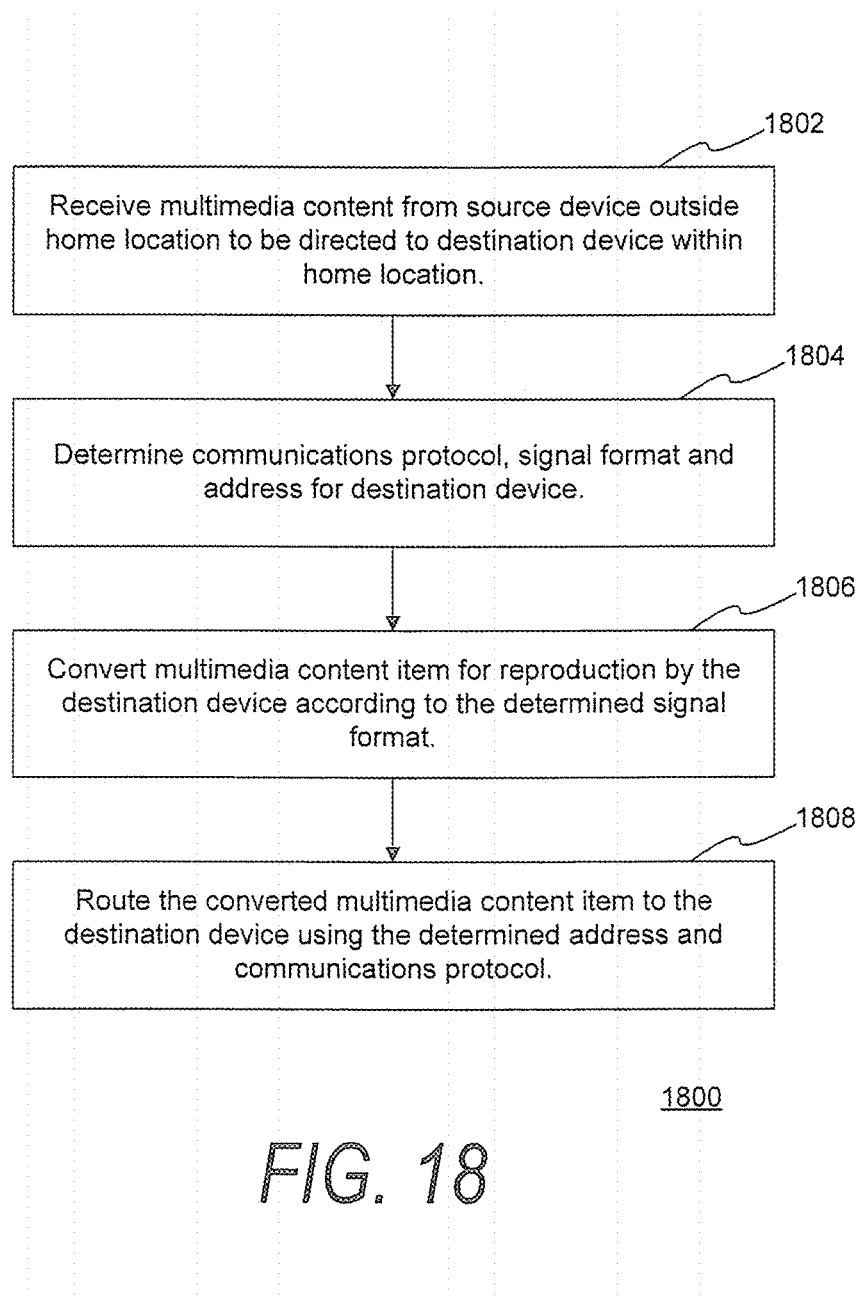
FIG. 18 is a flow diagram illustrating an example of converting and routing multimedia content to different terminals.
Figure 19:
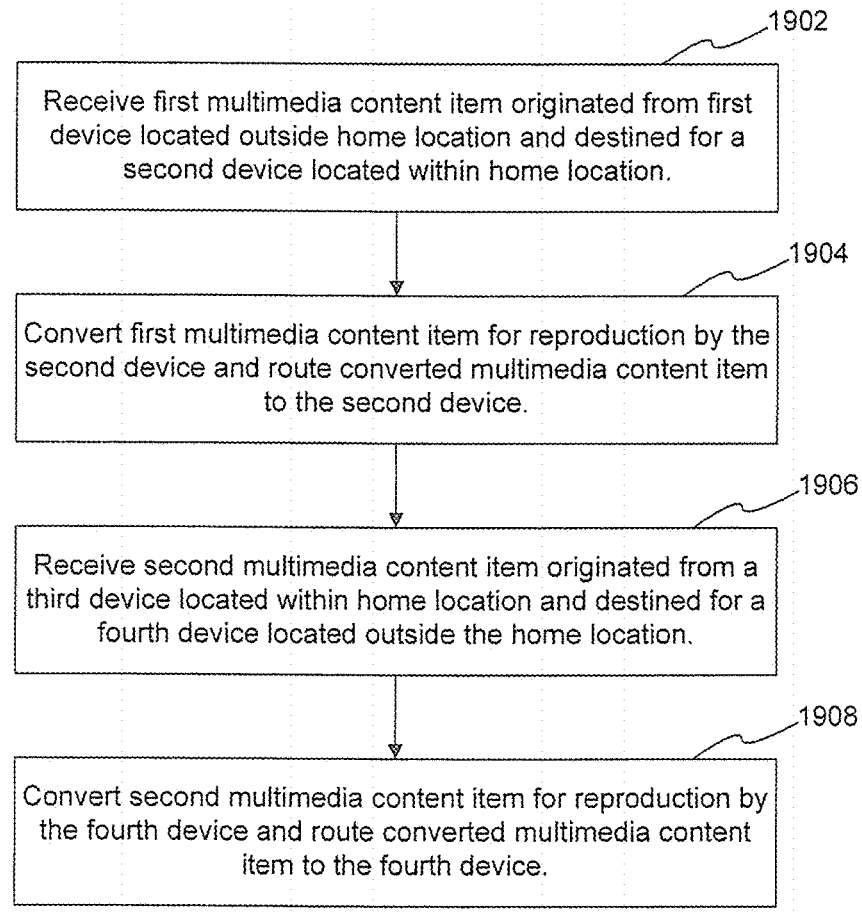
FIG. 19 is a flow diagram illustrating an example of bidirectional operation involving transmitting and routing multimedia content into and out of the home.
Figure 20:
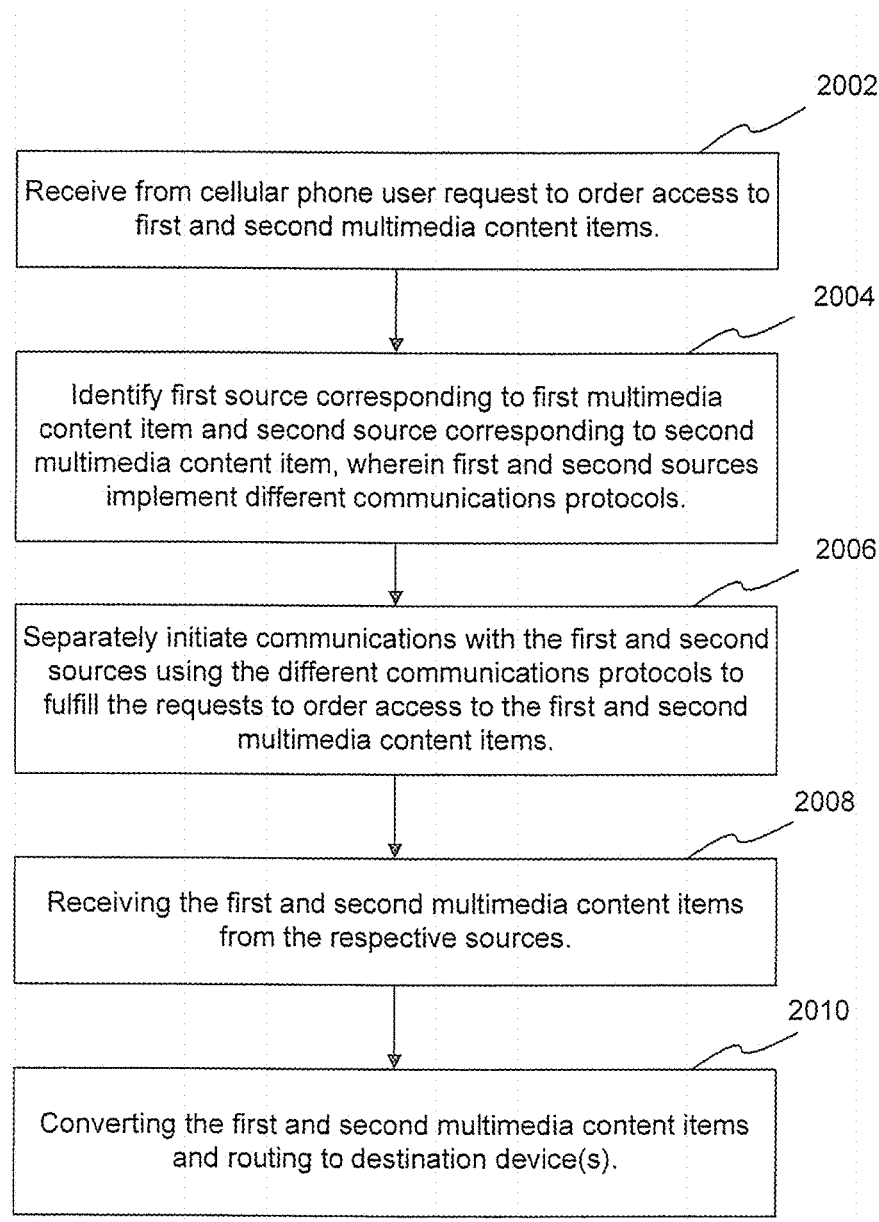
FIG. 20 is a flow diagram illustrating an example of receiving and accommodating completion of multimedia content requests corresponding to different sources.

Turning now to several other aspects of the present invention, FIGS. 18-20 illustrate examples wherein the MC System converts and routes content to particular devices.

According to a first aspect, the MC System is configured to convert and route multimedia content to a variety of different (e.g., household) devices, which require addressing and may include not only different communications protocols, but also different formats. FIG. 18 is a flow diagram illustrating a process 1800 of conversion and routing multimedia content to different terminals.

The process 1800 initiates upon receipt 1802 of multimedia content from a source outside the home location, to be directed to a destination device within the home location. The destination device may comprise different devices having different formats and receiving signals through different communications protocols.

The MC System then determines 1804 the communications protocol, signal format and address for the destination device. This, for example, may be performed either by referring to the data package information, mapping table information, or a combination thereof as described above.

The inbound multimedia content is then converted 1806 for reproduction by the destination device according to the determined signal format for that device. Finally, the converted multimedia content is routed 1808 to the destination device using the determined address and communications protocol corresponding to the destination device.

According to another aspect, the MC System offers bidirectional conversion, wherein content not only may be inbound to various different devices, but may also be communicated to various remote devices. This function may similarly be carried out using the various connections available with the MC System as well as the corresponding information in the mapping table and data packages.

FIG. 19 is a flow diagram illustrating an example of bidirectional operation involving a first device transmitting inbound content to a second device within the home governed by the MC System, and a third device transmitting outbound content to a fourth device outside the home.

The process 1900 entails receiving 1902 a first multimedia content item originated from a first device located outside the home location and destined for a second device within the home location. The first multimedia content item is then converted 1904 for reproduction and routed to the second device. Similarly, the second multimedia content item is received 1906 from the third device located within the home location and destined for a fourth device located outside the home. The second multimedia content item is converted 1908 for reproduction by the fourth device and the converted multimedia content item is routed to the fourth device.

According to still another aspect of the present invention, the MC System allows a user to remotely make orders for content using a cellular phone, wherein the content may come from a variety of different sources. FIG. 20 illustrates a process 2000 for receiving and accommodating completion of multimedia content requests corresponding to different sources.

The process 2000 initiates by receiving 2002 from the cellular phone user requests access to first and second multimedia content items. Examples of requests may include individual content purchases, selection of content previously purchases, selection of content that does not need to be purchased, and others. For example, the cellular phone may be used to directly contact the MC System. Another way this may be done is by using a cellular phone to communicate with the MC System with intervening communication occurring with the cellular base station. That is, with reference to FIG. 16, the cellular phone may be used to communicate with the cellular base station, and the cellular base station may then communicate with the MC System using the various communication channel options as shown. The first and second multimedia content items may of course be ordered on separate occasions and may correspond to content available from completely different sources.

The MC System identifies 2004 a first source corresponding to a first multimedia content item as well as a second source corresponding to a second multimedia content item. These sources may use any number of different communications protocols to carry out the delivery of content to the home.

The MC System then separately initiates 2006 communications with the first and second sources using the different communications protocols to fulfill the requests to order access to the first and second multimedia content items. The first and second multimedia content items are then received 2008 by the MC System and converted for reproduction by the destination device and routed accordingly (2010).

Various devices and various content sources may be applicable according to this embodiment. For example, an initial step may involve the user communicating with the MC/CHS using his cellular phone (e.g., directly, or through an intervening cellular base station). The user may then make various types of requests to the MC/CHS. For example, the MC/CHS may be instructed to make a call to another user's cellular phone. Alternatively, the user may instruct the MC/CHS to obtain information corresponding to a request, such as current news stories based upon a previously or currently submitted keyword (e.g., news regarding President's veto of a law). Corresponding format and addressing information is then provided to the MC/CHS. For example, the MC/CHS may be instructed that the IP address of the user's PC is the destination address for the requested cellular phone call, and the cable port address of the user's television may be the destination address for the requested news. Finally, the MC/CHS engages in appropriate conversion and routing to deliver the requested content accordingly. For example, the MC may communicate with the cellular network to find the other user to whom the cellular phone call is desired, and convert the received data package defined as the cellular network to a TCP package, providing the user's PC IP address as the destination address. Network protocols may then be used to transmit the converted data to the user's PC (e.g., over the Internet (TCP/IP) or through a direct network connection). With regard to the provision of the news corresponding to the search query, the MC/CHS may use the MC content layer structure to find the best source and route for the requested content. For example, it may seek the news at a local Internet content server (which may be the MC System itself, as the MC System is configured to store content that may be variously served as described herein). The MC System converts the corresponding content to a television format and transmits it to the television such as through a direct wired connection or a wireless connection (e.g., via UWB between the TV and CHS).

According to still another aspect of the present invention, a method for optimizing the delivery of content that is commonly requested by a plurality of users in a particular location is provided. This entails monitoring network content requested by users corresponding to the particular location, receiving a request for a particular content item from a given user in the particular location, wherein the particular content item is ordinarily served from a location outside the particular location, determining that the particular content item is also requested by other users in the particular location, and concurrently serving the particular content item to the given user and the other users using a server that is logically proximate to users in the particular location, in lieu of separately serving the particular content item to the given user and the other users from locations outside the particular location. In one embodiment, the layered approach previously described is used to make determinations as to whether content is locally applicable. At that location, requested content may be monitored and determinations as to whether the content is commonly requested within the particular locality may be made.

Figure 21:
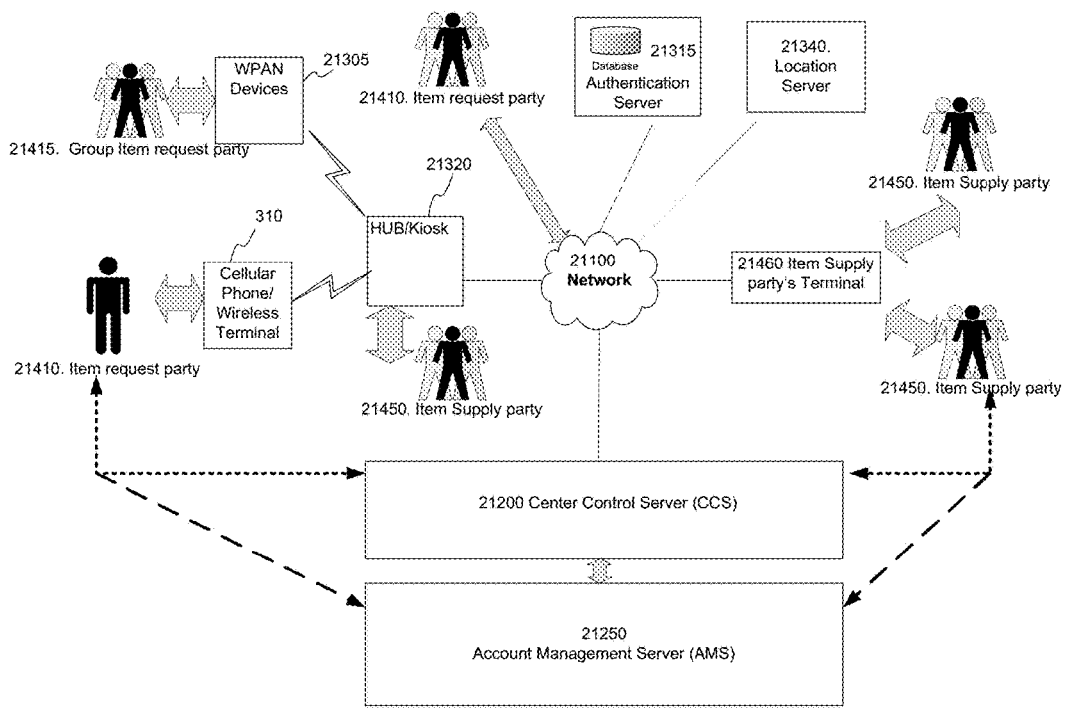
FIG. 21 is a schematic diagram illustrating the architecture of an example of a system in accordance with the present invention.

FIG. 21 illustrates an example of a system architecture in accordance with the present invention. The system includes Center Control Server 21200, which is connected to a wireless HUB 21320, Authentication Server 21330, Location server 21340, Account Management Server 21250, and user terminal(s) 21460 through a network 21100, such as the Internet. The wireless HUB 21320, along with Authentication Server 21330, authenticates user's identification through a short range Electromagnetic (EM) radiation and provides the user with access to secure data communication with a wireless terminal such as a cellular phone or a PDA. The Center Control Server 21200, through various functional modules, manages the data flow and coordinates the functions of the servers and user terminals. User location information is sent from the Location Server 21340 and processed to initiate, accelerate, and optimize the flow of information and corresponding processes.

Various aspects described herein may be embodied as systems, methods or computer programs. Computer program embodiments may be stored on a computer readable medium such as a magnetic disk, optical disk, non-volatile memory, or other tangible computer readable media. Such computer programs variously include program instructions that are executable by a processor to perform operations comprising those described in detail herein.

One aspect of the invention implements a cellular network, a wireless personal area network (WPAN) and wireless identification technology. Various technologies are applicable to this aspect of the invention, including but not limited to 3G technology for the cellular network; Zigbee, Bluetooth, or UWB technologies for the WPAN; and RFID (e.g., NFC) for the wireless identification technology.

The present invention facilitates secure data transmission through the wireless HUB 21320. The wireless HUB 21320 first receives and recognizes a unique identifier corresponding to a mobile terminal through a wireless connection. Once this authentication is processed, the wireless HUB 21320 establishes a communication channel with the user terminal for secure data transmission. The data is routed via the secure communication channel to the Center Control Server 21200 and processed by the function modules.

FIG. 3 illustrates and provides a system process in accordance with this aspect of the invention. In FIG. 3, the secure communication channel is separate from the short range wireless connection used to receive the unique identifier in order to achieve a greater bandwidth. Alternatively, the authentication and data transmission upon the completion of the authentication can share a wireless communication channel.

The wireless HUB (WHUB) 21320 is located in a public or private location. For a public location, the WHUB 21320 is preferably housed in a kiosk. The kiosk may be located on a street, or in an airport, shopping mall, or any location that is perceived as convenient and likely to include user traffic. For private locations, the WHUB 21320 is preferably configured for usage in locations like homes or hotel rooms. In these environments, the WHUB 21320 may be provided in a smaller device such as part of a Set Top Box (STB).

The handset 21310 is equipped with a tag that provides a unique identifier that can be wirelessly communicated to the WHUB 21320. A preferred tag is a Near Field Communication (NFC) tag 21312. NFC provides short-range wireless connectivity via EM radiation that uses magnetic field induction to enable communication between the devices. It has a short range of a few centimeters, which is believed to provide security advantages for applications of this aspect of the present invention. Although NFC is preferred, RFID or other substitutes can also be provided. The handset 21310 also includes a WPAN transceiver 21314, which allows an additional communication channel between the handset and the WHUB.

The wireless WHUB 21320 is similarly equipped with an NFC reader 21322, a WPAN transceiver 21324 and a network adaptor 21326. The NFC technology accommodates secure and automatic authentication and data exchange between the NFC tag and NFC reader.

Figure 24A:
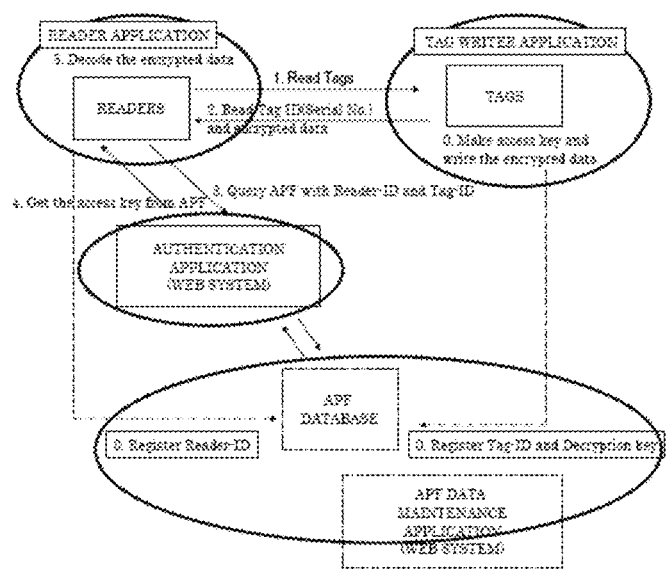
FIGS. 24A-B are schematic diagrams illustrating an example of an authentication process in accordance with the present invention.
Figure 24B:
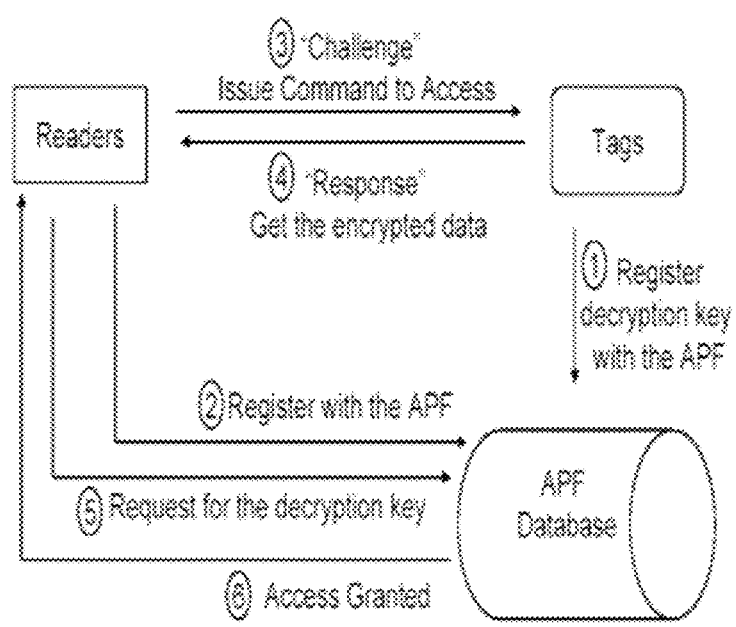

The process of authentication may be based upon a Tag ID and password 21002. The Tag ID and password 21006 are sent to the authentication server, which then returns a notification 21012 confirming authentication. Preferably, this authentication indicates whether the individual is who he or she claims to be, but does not address the access rights of the individual. The authentication server may reside within or outside the WHUB 21320. The authentication processes are further illustrated in FIGS. 24A-B.

The communication through the separate secure communication channel (e.g., WPAN) is then established upon the completion of authentication. The WPAN functionality is used to communicate between the handset and the WHUB, so that content related to a requested action may be securely exchanged. In this example, the requested action is a purchase request 21004.

According to one aspect of the present invention, the NFC is uniquely associated with other information that allows an appropriate action (payment, alert, etc.) to take place. For example, when the system is being used to accommodate mobile payment, the RFID tag can be associated with the user's bank account. Further, both the WHUB 21320 and wireless handset/terminal 21310 are authorized by the Authentication Server 21330. Once the devices are authenticated (i.e., the WHUB is a genuine WHUB), a second secure communication channel with more capabilities is established between the handset 21310 and WHUB 21320. This allows the action request and transaction information to be reliably transmitted between the two devices. Once the user's terminal 21310 is associated with the user's bank account, the WHUB 21320 can perform the functions of an ATM for the user to manage his bank account (e.g., depositing or withdrawing money from the user's bank account).

A communication of the second secure wireless connection or both wireless connections can implement a WPAN transceiver, which has a higher data rate and longer operational range compared to NFC. The secure communication can be implemented by hardware (e.g., a dedicated hardware chipset) and software (e.g., data encryption algorithm). The secure communication allows the exchange of transaction process information such as price and credit card information for a purchase request and bidding proposals among transaction parties. It is also noted that the WHUB 21320 is optionally configured with a wireless communication capability such as cellular network communication. The WHUB 21320 is also preferably configured to operate with a system that delivers Internet content.

The WHUB 21320 can also exchange data with other WPAN devices 21350, and the WPAN can include NFC functions for authentication purposes.

The NFC communication system used in this invention is an inductively coupled RFID system. Its working frequency is designed to utilize either low frequency (LF) 125 kHz or high frequency (HF) 13.56 MHz, due to the fact that higher usable field strengths can be achieved in the operating range of the reader (e.g., 0-10 cm) in a lower frequency band than would be the case in a higher frequency band.

Figure 24C:
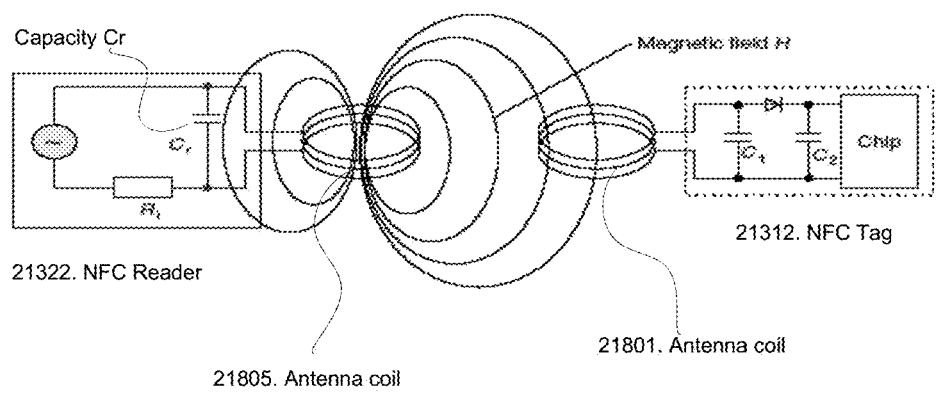
FIG. 24C is a schematic diagram illustrating an example of an NFC communication system in accordance with the present invention.

Due to the short distance between the reader and NFC tag, this NFC system employs inductive coupling for data transmission. Energy needed for the operation of the NFC tag 21322 can be provided by the NFC reader 21322 (FIG. 24C). For this purpose, the reader's antenna coil 21805 generates a strong, high frequency electromagnetic field, which penetrates the cross-section of the coil area and the area around the coil. Because the wavelength of the frequency range used (125 kHz: 2400 m, 13.56 MHz: 22.1 m) is several times greater than the distance between the NFC reader's antenna and the NFC tag, the electromagnetic field may be treated as a simple magnetic alternating field with regard to the distance between NFC tag and antenna.

NFC uses magnetic field induction to enable communication between devices when they're touched together, or brought within a few centimeters of each other. The energy and wave transmission are based on Maxwell's equation $$\begin{cases} \dfrac{\nabla \times \beta}{\mu} = j + \dfrac{\partial D}{\partial t} \\ \nabla \times E = -\dfrac{\partial B}{\partial t} \\ \nabla \times E = 0 \end{cases} \quad (1)$$

where B is the magnetic induction, E is the electric field, D is the electric displacement, and H is the magnetic field. The definition for cur $\nabla \times A$ is $$\nabla \times A = \left(\dfrac{\partial A_z}{\partial y} - \dfrac{\partial A_y}{\partial z}\right)\vec{x} + \left(\dfrac{\partial A_x}{\partial z} - \dfrac{\partial A_z}{\partial x}\right)\vec{y} + \left(\dfrac{\partial A_y}{\partial x} - \dfrac{\partial A_x}{\partial y}\right)\vec{z} \quad (2)$$

A plane electric wave travel in the horizontal ("x") direction space is represented as $$\frac{\partial^2 E}{\partial x^2} = \frac{1}{c^2} \frac{\partial^2 E}{\partial t^2} \quad (5)$$

where c is the speed of light. The same form can be applied to magnetic field wave in a place perpendicular the electrical field. Both E&B field are perpendicular to the travel direction x:

$$E = E_m \sin(kx - \omega t)$$

$$B = B_m \sin(kx - \omega t) \quad (3)$$

The WHUB 21320 communicates with Location Server 21340 for the mobile terminal 21310 location. The Location Server 21340 may detect the mobile terminal 21310 location using various techniques such as Time Difference of Arrival (TDOA), Received Signal Strength Indication (RSSI), GPS/AGPS, and cellular tower. The location information is used to promote merchandise trading and accelerate and optimize the transaction process. The user location information can be further used for security purposes. For example, a user detected at location A may be declined to a request for a cash advance or withdrawal that is made from a WHUB 21320 that is actually at a different location B.

Received signal strength indication (RSSI) based location mechanism is typically used in the environment where the density of fixed reference signal sources (such as cell tower, access points) is high. The transmitting power of a reference signal source is denoted as $P_t$, and the distance between the reference signal source and the mobile device is d. The RSSI can be calculated as follows:

$$P_r = P_t - 20 \log_{10}(4\pi f/c) - 20 \log_{10} d \quad (4)$$

where f is the RF frequency.

The RSSI based location mechanism constitutes two steps: 1) site survey to generate radio map and 2) table looking based location estimation. In step 1, a radio map is generated via either manual site survey or some automotive software algorithm. The radio contains list of positions with correlated RSSI values. After a radio map is generated, the location of a mobile device is estimated by comparing the instant RSSI from different reference signal sources with the radio map. The location in the radio map with the RSSI data that match the current RSSI data will be considered as the mobile terminal's location.

Another position tracking method that may be used to provide the location information to the Location Server 21340 would typically involve a mobile user who is operating on an OFDM wireless communication system. The OFDM system is one of the modulation schemes for next generation wireless communication systems. An OFDM system with N sub-carriers employs M-ary digital modulation, a block of $\log_2 M$ input bits is mapped into a symbol constellation point $d_k$ by a data encoder, and then N symbols are transferred by the serial-to-parallel converter (S/P). If T denotes the symbol interval, the symbol interval in the OFDM system is increased to NT, which makes the system more robust against the channel delay spread. Each sub-channel, however, transmits at a much lower bit rate of $\log_2 m/NT$ bits/s. The parallel symbols $(d_0 d_1 \ldots d_k \ldots d_{N-1})$ modulate a group of orthogonal sub-carriers, which satisfy $$\frac{1}{NT} \int_0^{NT} \exp(j2\pi f_i t) \cdot \exp(j2\pi f_j t) dt = \begin{cases} 1 & i = j \\ 0 & i \neq j \end{cases} \text{ where } \quad (5)$$

$$f_i = \frac{i}{NT}, (i = 0, 1 \ldots, N-1)$$

The baseband transmitted signal can be represented as $$s(t) = \frac{1}{\sqrt{NT}} \sum_{k=0}^{N-1} s_k e^{j2\pi f_k t} \ (0 \leq t \leq NT) \ f_k = \frac{k}{NT} \quad (6)$$

The average energy for the complex baseband symbol $s_k$ is denoted by $2E_s$. Then $s_k$ is given by:

$$s_k = \sqrt{2E_s} \cdot d_k \quad (7)$$

where $d_k = d_{k,r} + j d_{k,i}$, is the signal constellation point (e.g. BPSK, QPSK, QAM, etc.) with normalized variance $E[|d_k|^2] = 1$. The real and imaginary parts $d_{k,r}$ and $d_{k,i}$ are statistically independent, identically distributed and $E[d_{k,r}] = E[_{k,i}] = 0$.

A command frequency selective randomly varying channel with impulse response $h(t, \tau)$ is considered. Within the narrower bandwidth of each sub-carrier, compared with the coherence bandwidth of the channel, the sub-channel is modeled as a frequency nonselective Rayleigh fading channel. Hence, the channel impulse response $h_k(t, \tau)$ for the $k^{th}$ subchannel is denoted as $$h_k(t,\tau) = \beta_k(\tau) \cdot \delta(\tau) \quad (8)$$

where $\beta_k(t)$ is a stationary, zero mean complex-valued process described as follows. It is assumed that the processes $\beta_k(t), k=1, \ldots, N$, are complex-valued jointly stationary and jointly Gaussian with zero mean and covariance function $$R_{\beta_k \beta_l}(\tau) = E[\beta_k(t+\tau)\beta^*_l(t)], k,l=0,\ldots,N-1. \quad (9)$$

For each fixed k, the real and imaginary parts of the process $\beta_k(t)$ are assumed independent with identical covariance function. Further assumed is the factorable form $$R_{\beta_k \beta_l}(\tau) = R_1(\tau) R_2(k-l), \quad (10)$$

with $R_1(\tau)$ and $R_2(k-l)$ specified below. $R_1(\tau)$ gives the temporal correlation for the process $\beta_k(t)$ which is seen to be identical for all $k=0, \ldots, N-1$. $R_2(k-l)$ represents the correlation in frequency across subcarriers. In this circumstance it is assumed that the corresponding spectral density $\Psi_1(f)$ to $R_1(\tau)$ is given by the Doppler power spectrum, modeled as Jakes model, i.e., $$D(f) = \begin{cases} \dfrac{1}{\pi F_d \cdot \sqrt{1 - \left(\dfrac{f}{F_d}\right)^2}} & |f| \leq F_d \\ 0 & \text{otherwise} \end{cases} \quad (11)$$

where $F_d$ is the (maximum) Doppler bandwidth. Note that $$R_1(\tau) = J_0(2\pi F_D \tau) \quad (12)$$

where $J_0(\tau)$ is the zero-order Bessel function of the first kind. In order to specify the correlation in frequency across subcarriers, an exponential multipath power intensity of the form $$S(\tau) = \alpha e^{-\alpha \tau} \ \tau > 0, \alpha > 0 \quad (13)$$

is adopted, where α is a parameter that controls the coherence bandwidth of the channel. The Fourier transform of S(τ) yields $$\psi_2(f) = \frac{\alpha}{\alpha + j2\pi f} \quad (14)$$

which provides a measure of the correlation of the fading across the subcarriers. Then $$R_2(k-l) = \psi_2(\Delta f(k,l)) \quad (15)$$

where Δf=1/NT is the frequency separation between two adjacent subcarriers. The 3 dB bandwidth of $\Psi_2$(f) is defined as the coherence bandwidth of the channel and easily shown to be $f_{coherence} = \sqrt{3}\alpha/2\pi$. This model is applicable to many practical wireless OFDM systems and physical channel scenario.

The given value of the first arrived path $t_0$ and noise vector n are both zero mean random variable with probability density function represent as $$p(s|t_0) = \frac{1}{\text{Det}(Z_s)\pi^N} \exp(-s^* Z_s^{-1} s) \quad (16)$$

The value $t_0$ is obtained by applying ML when equation (16) is maximized Therefore, the location of the mobile user is estimated based upon the value of $t_0$.

According to one aspect of the invention, the financial transaction may or may not immediately follow authentication. The cellular phone may be configured to include browsing capability, which allows the cellular phone to be used to communicate with merchants prior to making a purchase request. Internet content can also be accessed by the cellular phone in association with a transaction request.

Also, the cellular phone may access Internet content through methods other than through the WHUB.

Various purchase types may be made with the purchase request. Examples may include a physical item that is separately shipped to an address, a download that is made available immediately, possibly to the cellular phone, a service, etc.

It is also noted that a purchase request is just one form of an action that may be carried out. Other business or financial transaction information processed by the system include but are not limited to bill payment, populating an account with funds, online shopping transactions, dynamic and reverse bidding, and others.

As necessary, additional information may also be required in association with a requested action. For example, account identification information or passwords to access an account for the transaction parties hosted by the system or an external server may be required. In these circumstances, the Account Management Server 21250 sends a request to the WHUB for the information. The WHUB may store such information and respond to such a request. Alternatively, the WHUB may further exchange information with the user (through the handset), in order to obtain the additional information requested.

In connection with the purchase request 21004, a payment request 21014 is made between the WHUB 21320 and Account Management Server 21250 through the network connection. The payment request 21014 allows the user to complete the transaction related to the purchase request 21004. To accommodate a satisfactory completion of the payment request, the Account Management Server 21250 corresponds with a payment gateway, and sends a solution 018 indicating the success or failure of the payment request.

Upon an indication of a successful payment request, the WHUB 21320 receives a receipt 21022 or confirmation number from the Account Management Server relating to the requested action, and passes 21024 that and related information to the handset confirming completion of the action. This may be a receipt, confirmation numbers, coupon codes, or the like.

According to another aspect of the invention, Account Management Server (AMS) 21250 opens and manages accounts for users. The system users are categorized into two transaction parties: the Item Request Party (IRP) and Item Supply Party (ISP). The ISP's income is remitted instantly or periodically to the ISP's bank account from ISP's account with Account Management Server 21250. This solution has unique advantage for cross-border financial transactions, particularly, for those countries that don't have compatible credit card payment infrastructure across borders.

Figure 25:
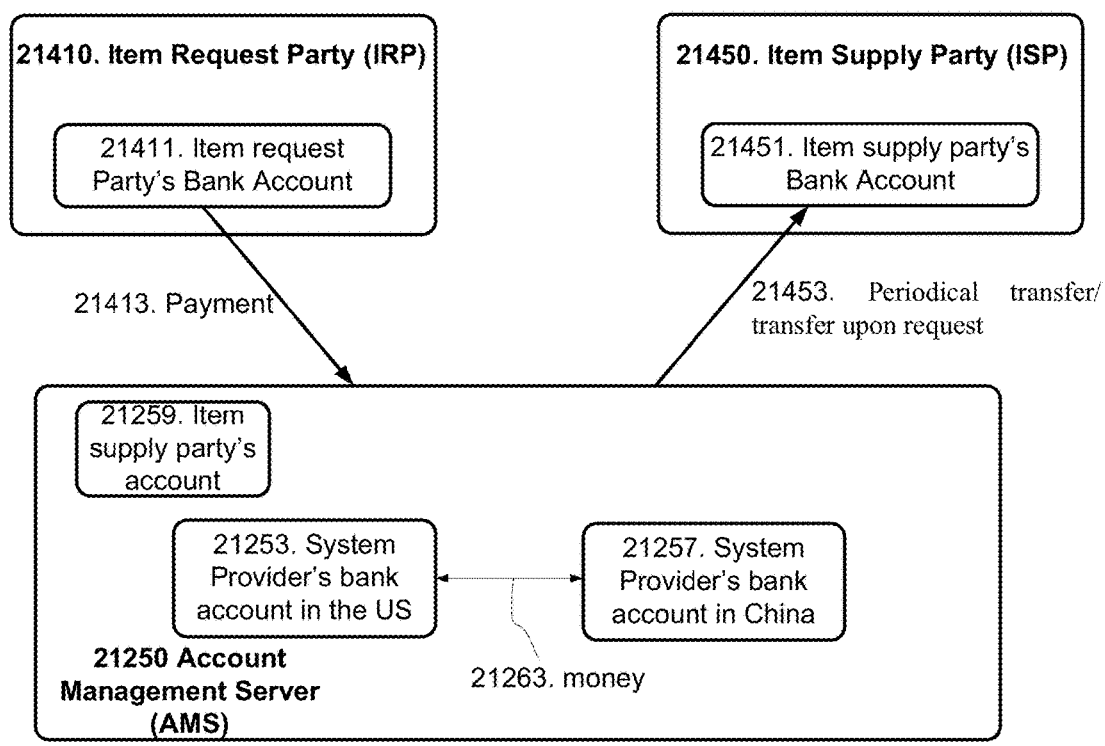
FIG. 25 is a block diagram illustrating an Account Management Server and corresponding functionality.

FIG. 25 illustrates certain functionality of the Account Management Server corresponding to an example of a payment solution for a transaction processed according to one aspect of the present invention. In this example, the IRP 21410 is a US tourist who has purchased tourism service package in China from a Chinese travel agency (the ISP 21450). The credit payment of the IRP 21410 is transmitted 21413 to the system provider's bank account in the US 21253. The Account Management Server 21250 adds the credit to the ISP's account with Account Management Server. The payment to the ISP's bank account in China is transmitted from the system provider's bank account in China 21257, e.g. with the Bank of China, as soon as the IRP in the US confirms the purchase. Hence, the charge related to cross border money transmission is avoided for every single international trade and business processed by the system. The accumulated payment in the system provider's bank account at one country can be transmitted to the account at another country periodically. Or the payment from IRPs at country A to ISPs at country B cancels out the payment from IRPs at country B to ISPs at country A so cross country money transmission can be avoided. Further, the system provider may choose the same international bank for its accounts at different countries to reduce the cross border financial transmission fee. This aspect of the present invention not only allows sellers of international business to receive payments promptly, it also benefits the online buyers and sellers with lower transmission fee for international trade and business. In addition, it provides an improved payment solution to the countries without sound credit card operations.

Figure 22:
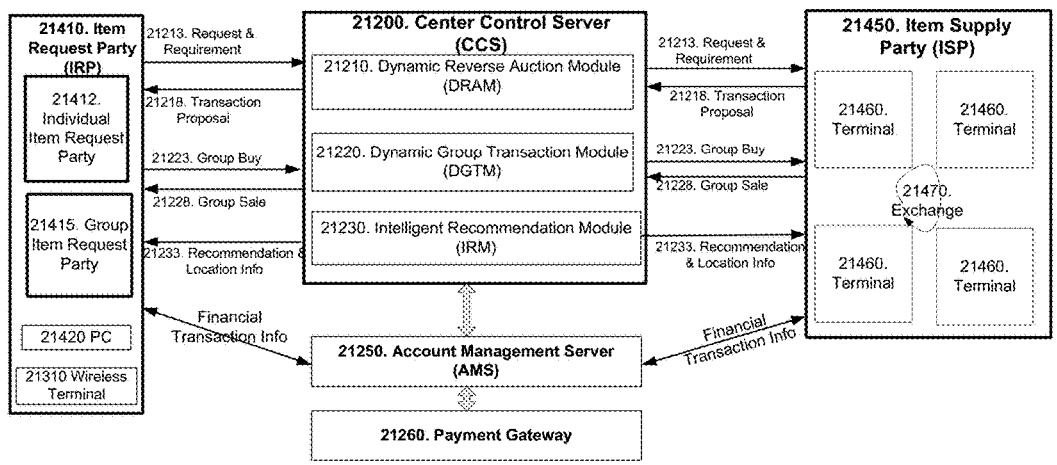
FIG. 22 is a block diagram illustrating an example of Center Control Server Modules in accordance with the present invention.
Figure 23:
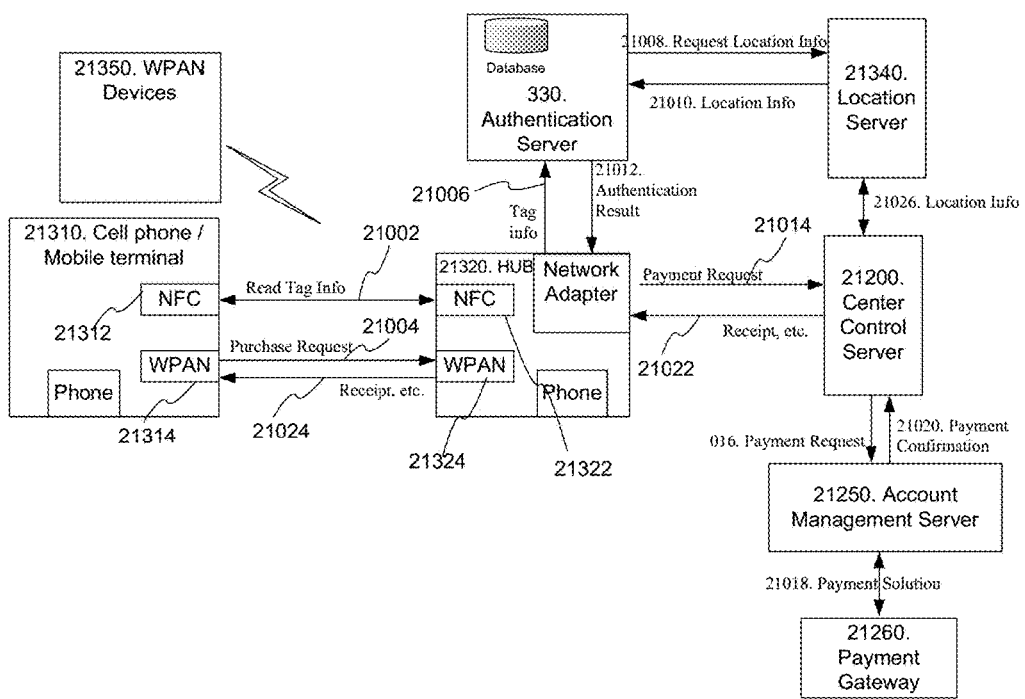
FIG. 23 is a block diagram illustrating an example of a wireless communication structure of a system in accordance with the present invention.

FIG. 22 is a block diagram illustrating the Center control Server 21200 configured to provide an information platform for the information process. In this embodiment, the system provides registered users with user terminals 21460, 21310 and 21420. IRP request information is from Center Control Server to ISPs' terminals according to ISPs' particular needs. Users can access their terminals from a server, a wireless terminal, and the like. Account Management Server 21250 manages the payment of the transaction based on the mechanism described in FIG. 25. Intelligent Recommendation Module 21230 provides the users with information related to the transaction such as market competition information and transaction parties' credit and location information. Dynamic Reverse Auction Module 21210 and Dynamic Group Transaction Module 21220 manage the transaction information process.

Figure 26:
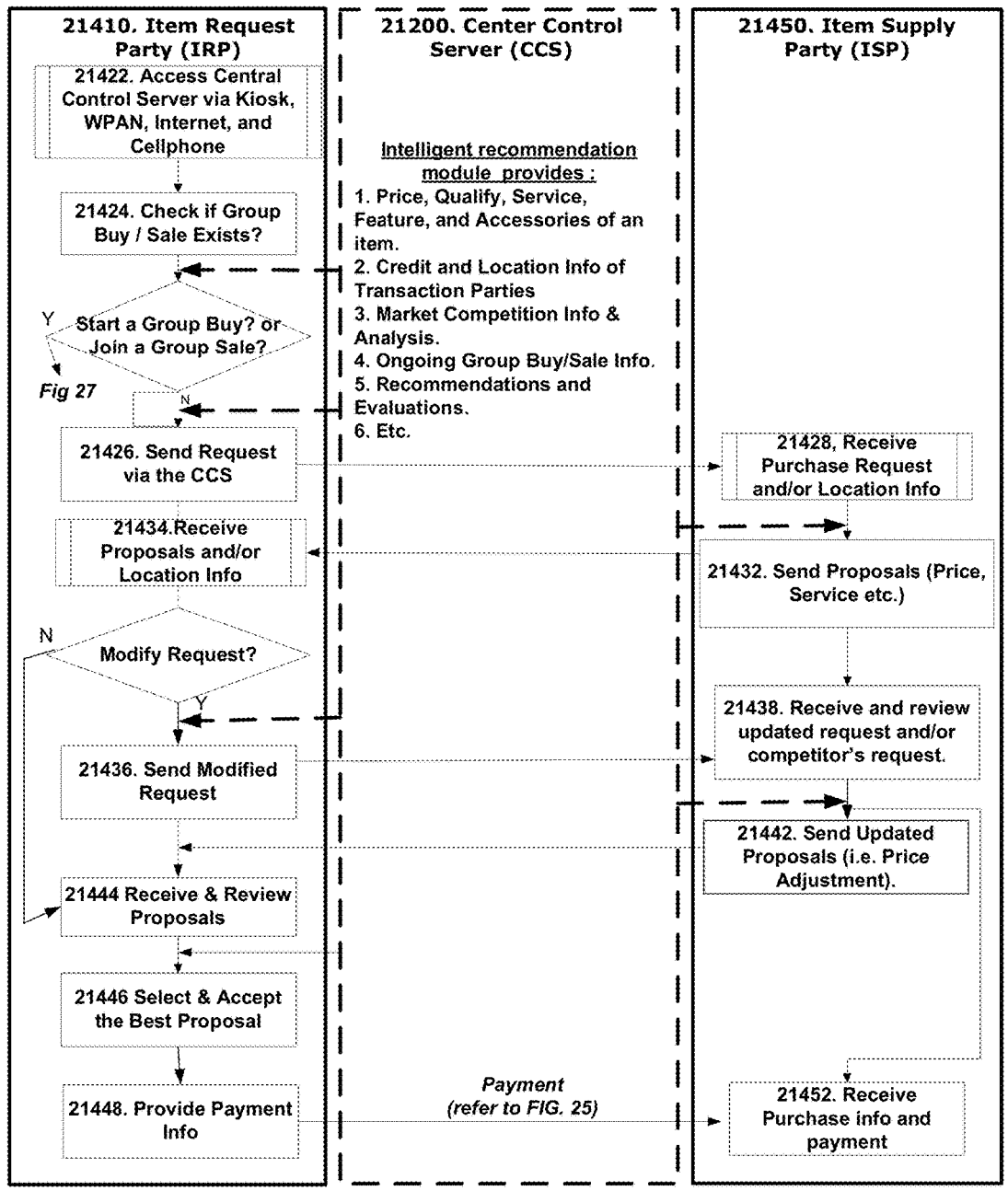
FIGS. 26 and 27 are functional block diagrams illustrating processes in accordance with the present invention.
Figure 27:
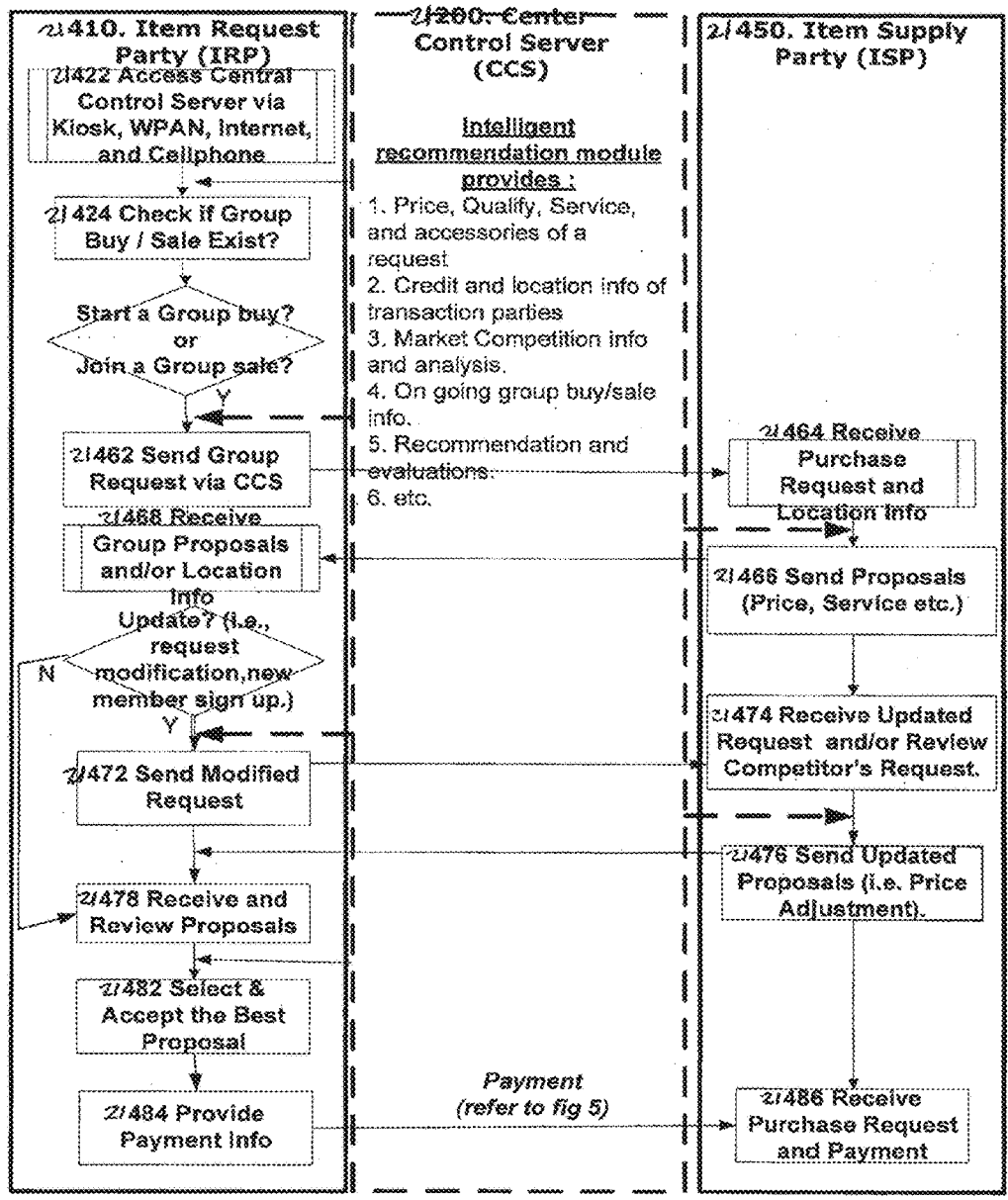
Figure 28:
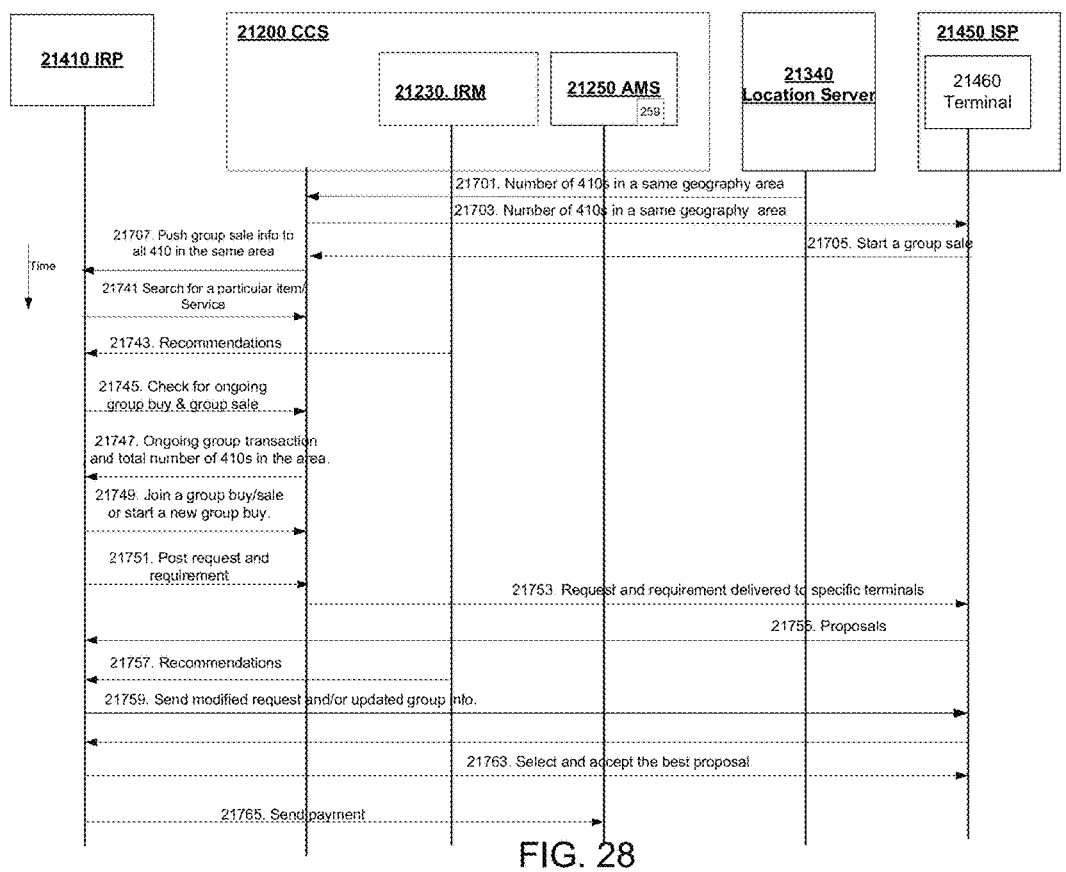
FIG. 28 is an event diagram illustrating an example of information flow in accordance with the present invention.

FIGS. 26 and 27 illustrate an example of information flow among the Item Request Party (IRP) 21410, center control server (CCS) 21200, Location Server (21340), and Item Supply Party (ISP) 21450. In the invented system, ISPs bid instead of IRPs. In addition, the IRP leads the bidding process by submitting (step 21426) and modifying (step 21436) requests and requirements of items or services. The ISPs, at their customized terminals, access IRP's requests (step 21428), submit transaction proposal/offers (step 21432), and monitor the competitors' proposals and modification of requests in real time (step 21438). The requests and requirements may alter during the process according to the real-time competition information (step 21436). During the real time progress of the information process, the Center Control Server (CCS), via Intelligent Recommendation Module (IRM) 21230, provides IRPs and ISPs with market competition information pertaining to IRP's requests and ISP's proposals including but not limited to prices from market competitors, quality, accessories of the requested items or services, credit rating and locations of transaction parties, analysis and recommendations, and ongoing bidding activities and group buy/sale negations related with the requests and proposals.

Figure 29:
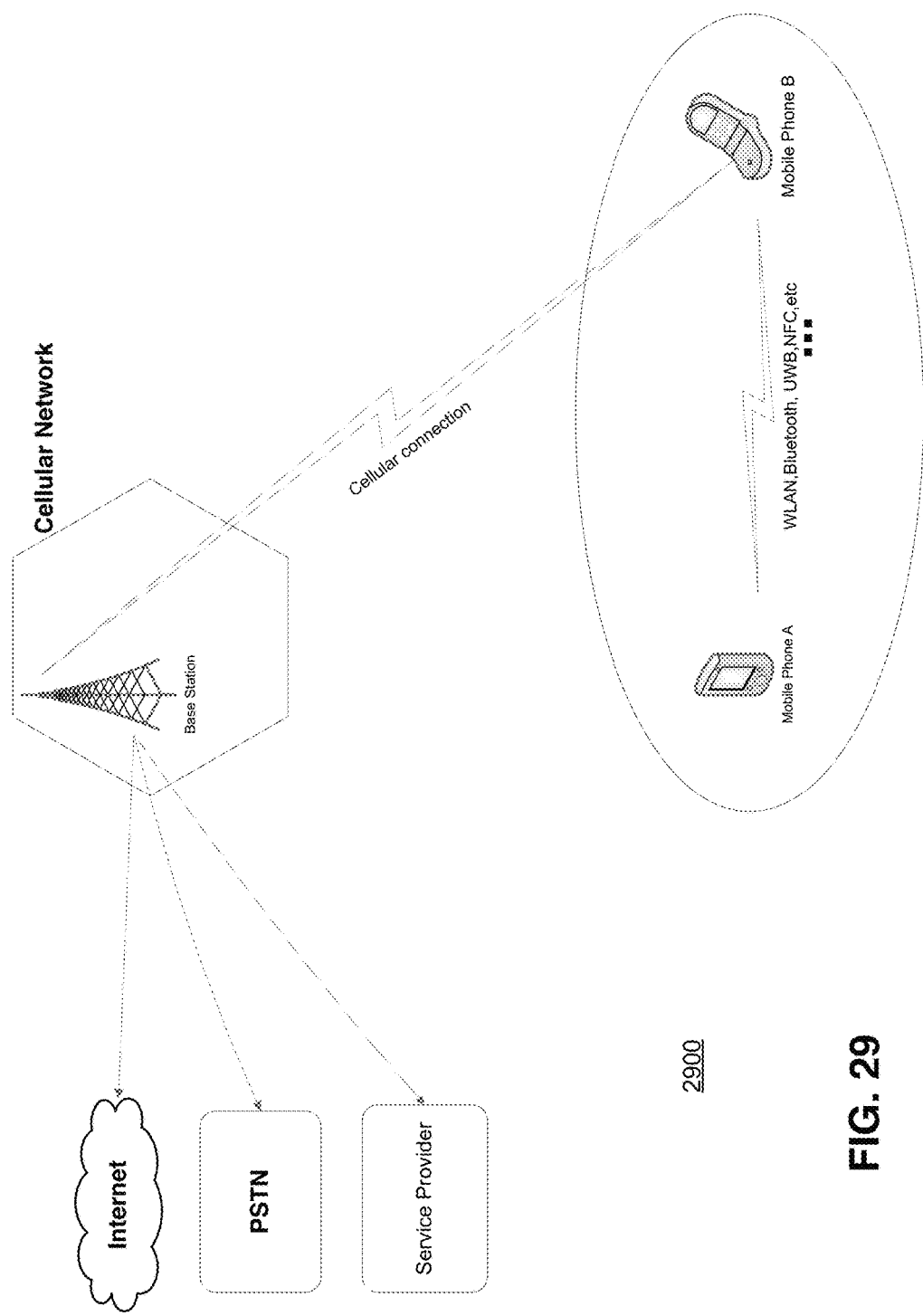
FIG. 29 illustrates an example of a system that facilitates efficient communication access by a mobile terminal.

FIG. 29 illustrates an example of a system 2900 that facilitates efficient communication access by a mobile terminal (e.g., mobile phone A). This may be useful where the user of the mobile terminal A cannot adequately access their assigned cellular network, but where they still want to make or receive a call or data exchange using the cellular network. It may also be useful where the user can adequately access the cellular network, but does not wish to apply direct cellular network access because of the availability of an easier-to-access local access point and corresponding resources.

There are a variety of reasons why a mobile terminal might not be able to adequately access the cellular network directly. For example, the mobile terminal may be unable to communicate with a cellular network base station because of a bad communication situation such as a deep fade due to multipath, shadowing, and/or the Doppler effect. Many users are familiar with situations where their mobile has no signal coverage from any cellular base station. Also, the capacity of a cell may be full. Other situations may also be present, such as battle field conditions, power outages or emergencies where an unusual number of people attempt to access the network, etc.

According to one example, in this system 2900 another mobile terminal B may be in a good communication situation with respect to its cellular network. Additionally, this mobile terminal B is preferably within a short range communication distance with the mobile terminal A. In this fashion, the first mobile terminal A uses the second mobile terminal B as a relay point to reach a cellular network base station.

A variety of communication techniques may be used for the communication between mobile terminal A and mobile terminal B, including but not limited to WiFi, Bluetooth, UWB, RFID, Infrared communication, etc.

Preferably, although the mobile terminal A uses mobile terminal B as a relay to the cellular network, the relay is transparent, so that the user of mobile terminal A uses the mobile terminal in the same fashion that they would during ordinary direct communications that go over the cellular network. Thus, for example, the user of terminal A simply dials a telephone number corresponding to a remote terminal device user (regular phone, cellular phone, etc.) and the call is completed, without requiring the user to engage in additional communications or with additional interfaces in order to carry out the communication process. Terminal A will typically pair with Terminal B before the communication process using a communication such as a point-to-point Bluetooth communication. Once they are paired, one of the terminals (e.g., B) may operate as a wireless access point for the other terminal (e.g., A). Thus, from the perspective of the user of mobile terminal A, the usage and communication functionality would still appear to be that of normal usage involving the cellular network. In the example of a telephone call, this would involve the user observing and interacting with, for example, a touch screen depiction of the phone keypad just as they would during normal usage.

Similarly, incoming calls would be routed to and received by the mobile terminal A as though the normal communication using the cellular network were being implemented. Thus, a remote user of another mobile device (phone, cell phone, etc.) would dial the regular number assigned to mobile terminal A, and the call would be received at mobile terminal A accordingly.

From the perspective of the cellular network, the communications preferably appear to be coming from the mobile terminal A as though they were coming directly from the mobile terminal A in a regular cellular communication. In order to carry this out, mapping and routing are implemented so that the communications are directed between the mobile terminal A through the relay involving the mobile terminal B and ultimately through to the cellular network.

Mapping and routing are variously described herein, including but not limited to FIG. 16 as described above. It should be noted that the mapping and routing functions may reside at various locations, including within mobile terminal A, within mobile terminal B and/or within an intermediate system such as the MC system as described herein.

In one example, the mapping table inside the MC system accommodates cross-matching of the phone number and SIM card between mobile terminal A and mobile terminal B. Authentication of the SIM card and corresponding communications of any necessary key information may be made between the cellular network and the mobile terminal A using the relay communication. If desired, a secondary encryption may be used for the communications between mobile terminal A and mobile terminal B, if such an authentication is desired by the cellular network service provider. Whether this is required or not, the necessary communications to authenticate user access are provided through the relay communication and according to the mapping tables.

It should be noted that due to current pragmatic considerations, it is preferable that mobile terminal A and mobile terminal B have the same cellular service provider. This preference, however, is dependent up logistics and constraints among the users and their cellular service providers. With system access constraints removed, an alternative environment involves the mobile terminal A and mobile terminal B having different service providers.

According to this alternative, provided that both users have cooperating service providers, mobile terminal A may use mobile terminal B despite the two users having different cellular service providers. To carry out this alternative, the cellular base station may be equipped to deal with relayed communications, or the mapping may include fields corresponding to the first and second mobile terminals involved in the relayed communication, so that the communications may be directed accordingly.

Figure 30:
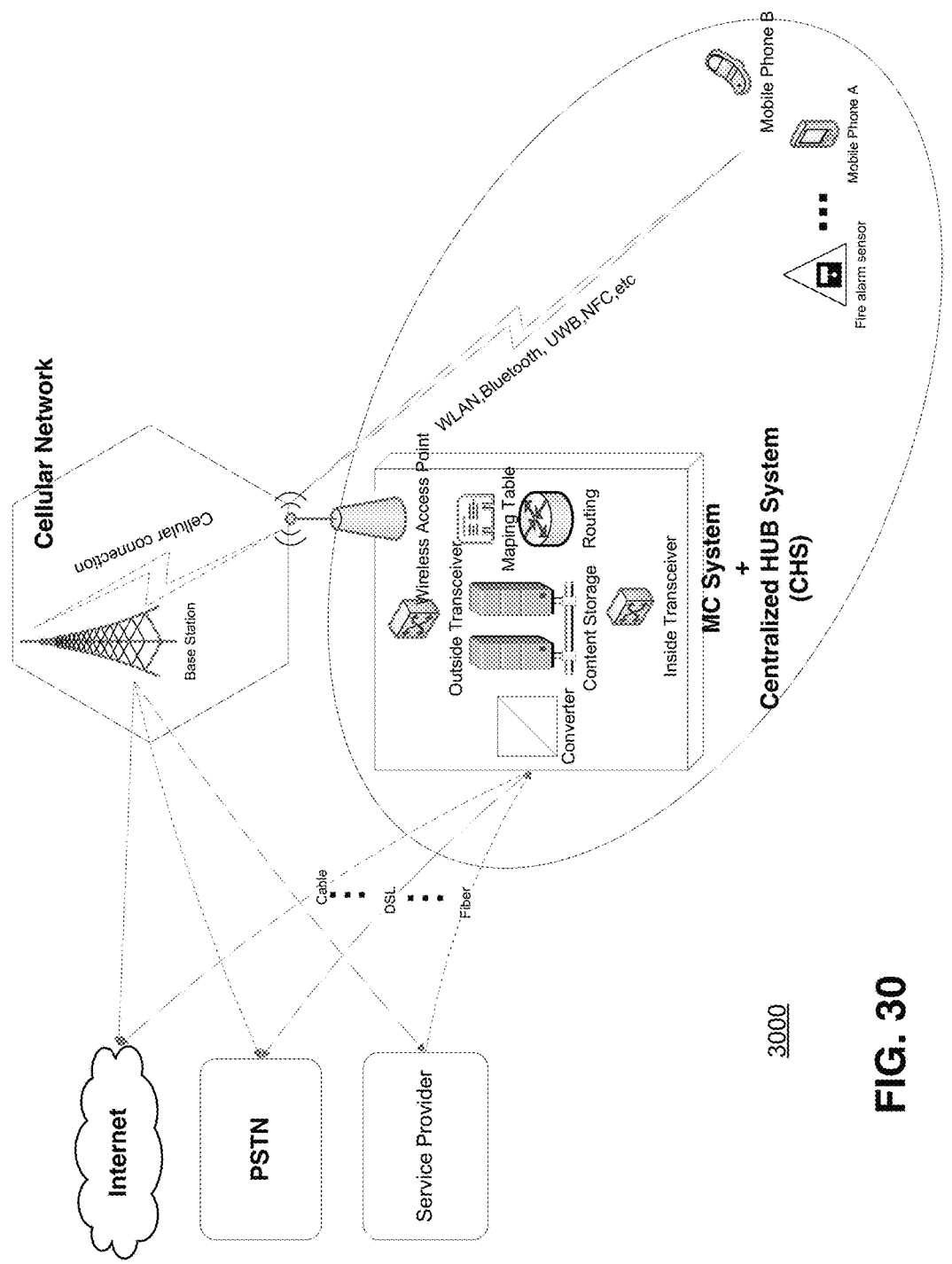
FIG. 30 illustrates an example of a system wherein a modified WIFI access point provides a relay point for a mobile terminal.

FIG. 30 illustrates another example of a system 3000, wherein a modified WIFI access point provides a relay point for mobile terminal A.

This system 3000 may be useful under the same potential situations with regard to direct cellular network access by mobile terminal A as described above. For example, the reception may be very poor, etc.

Here, a WIFI access point is available for mobile terminal A. Mobile terminal A uses the WIFI access point as a relay point to reach a base station, or to be connected with a PSTN network, or to be connected with high speed internet.

As described regarding FIG. 29, mapping and routing are provided to carry out the relayed communication, and the mapping may again be provided by the MC system. In one example, the mapping table inside the MC system cross-matches the MAC address and the unique physical address (e.g., SIM card) between the modified WIFI access point and the mobile terminal A. Also, the MC system is configured to accommodate whatever SIM card related authentication of mobile terminal A is required by the cellular network.

At some point in the relayed communication, a communication with the cellular network is made. To do this, the WIFI access point may be equipped with cellular network communication capability as illustrated in the figure. It should be understood, however, that the communication may be transmitted away from the WIFI access point to another location that is more convenient or suitable for cellular network access. All of the same principles of relaying, mapping and corresponding communications described herein still may apply to such an alternative.

The intention of the MC system and corresponding relayed communications is not to merely provide VOIP to the mobile terminal A. Instead, with the relayed communication and corresponding techniques as described herein, the mobile terminal A can receive phone calls from anywhere and can also call any one without requiring the user to engage in advance administrative procedures such as logging into a system, etc.

It should also be appreciated that mobile terminal A can seamlessly roam from the cellular network to the WIFI access point. Thus, the user of mobile terminal A may use the mobile terminal A normally while outside the WIFI access point location (home, or office, or whatever location the WIFI access point is servicing). However, once the mobile terminal A enters the range of the WIFI access point, the mobile terminal A may be switched to accessing the WIFI access point. This technique may be used to enhance the data receiving capabilities of the mobile terminal A, and to allow a reduction of the number of terminals directly accessing the cellular network base station for calls or other cellular network demands, when it is not necessary to do so. Significantly, this allows the cellular network provider to potentially re-direct the relay communication to accommodate base station demand management. That is, supposing that a lot of callers are using cellular network base station X, and that a user of mobile terminal A is within WIFI access point range. Base station X is also the closest cellular network base station, and would normally be the base station through which mobile terminal A would gain access to the cellular network for calls, etc. According to this aspect of the invention, with the mobile terminal A accessing the network through the relayed communication involving the WIFI access point, and the mapping information provided by the MC system, the communications to and from mobile terminal A may be directed to another base station, without ever having to burden base station X (even for any initial portion of the communication whatsoever).

Other than being equipped in order to carry out communications with the cellular base station as described above, and to include the MC system functionality as described herein, a WIFI access point that is equipped as the relay point may be as is otherwise provided. For example, the WIFI access point may be a multipurpose device as provided by a cable internet service provider, with the additional functionality of cellular communication capability and corresponding MC System functionality.

As illustrated in FIG. 30, the communication between mobile terminal A, mobile terminal B and/or sensors in the location serviced by the wireless access point may be WLAN, Bluetooth, UWB, NFC, etc., or any combination thereof.

The MC System and CHS of FIG. 30, or the MC System as described in connection with FIG. 29, may be provided as an apparatus that comprises a processor and memory. The memory includes program code executable by the processor to perform the operations for directing a relayed communication to the cellular network as described herein. The program code may also be stored on the memory, or any non-transitory computer readable medium (e.g., RAM, CD-ROM, magnetic disk, etc.).

Figure 31:
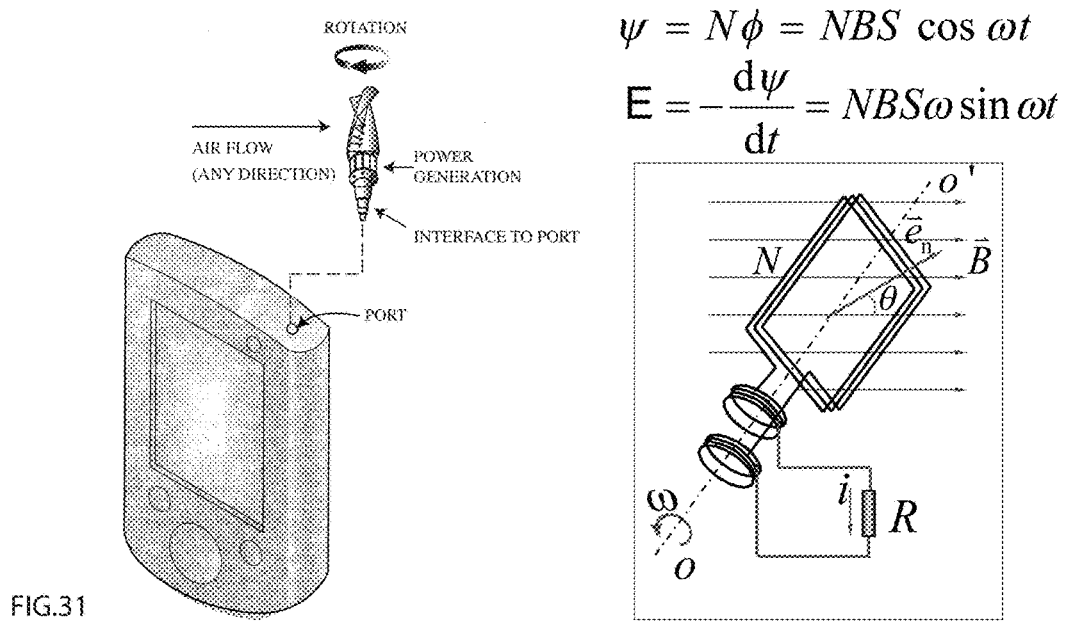
FIG. 31 is a schematic diagram illustrating a mobile terminal such as a cellular phone that is equipped to interface with a wind-powered alternative energy generation device.

FIG. 31 is a schematic diagram illustrating a mobile terminal such as a cellular phone that is equipped to interface with a wind-powered alternative energy generation device. The wind-powered alternative energy generation device includes an external rotational element that is configured to rotate when exposed to moving air. As evident from the figure, the rotational element may preferably be such that it is not directionally dependent. In other words, the device does not need to be pointed in a particular direction corresponding to the incoming wind. The wind-powered alternative energy device also includes an interface that preferably interfaces with a conventional input ("port") through which the mobile terminal device ordinarily may receive power through conventional alternative devices such as USB power cords. The wind-power alternative energy device includes the rotational component that rotates to drive a power generator within a power generation portion, which in turn delivers power to the mobile terminal device through the port.

The power generated by the wind-powered alternative energy device is dependent upon the rotational rate delivered to the power generation portion as well as the dimensions (radius, length) of the power generating components within the power generation portion.

When the mobile terminal is very low on power, the wind-powered alternative energy generation device may be used as an alternative source of power so that the user may make or receive an emergency call.

Although illustrated in connection with a mobile terminal device, the wind-power alternative energy device is also useful for providing power to residential or commercial properties located in isolated areas and/or where wind is normally available.

According to another aspect, this present invention facilitates negotiation and competition among transaction parties using user's location information. Center Control Server obtains the location information from Location Server. With the location information of IRP, certain request and requirement are sent only to ISP close to the IRP. Further, the location information of IRP is used to initiate "group buy" request (step 21462 in FIG. 27) by IRP within a same geographical location. According to this embodiment, individual IRP with similar demand may organize into groups and negotiate with ISPs collectively. Further, ISP can use the IRP's location information to organize "group sale" by outputting discount group sale information only to the IRP located in a same geographical area via Center Control Server. One application of this invention is in retail industry: retail buyers pay discount price available only for bulk purchase and manufacturers benefit from increased sale, reduced cost and improved operation efficiency.

In the process of transaction information, the formation of group is integrated into the process of ISP's bidding and IRP's request modification. In step 21472 in FIG. 27, the variables of group purchase request modified include group formation requirement and information such as the time left before the deal is closed, size of the group, price, quantity, quality, services, and accessories of the item requested, etc. These variables alter simultaneously and continuously and affect the change of each other. The related market competition information and recommendations are sent to the IRPs and ISPs from Center control Server. And the two transaction parties monitor the status of information variables of the competition real time.

This embodiment of the invention significantly improves the static reverse bidding process in applications. The dynamic feature of the negotiation process enables ISPs and IRPs to locate each other most efficiently and effectively eliminating traditional distribution channels and layers of middlemen and bypassing obstacles presented by time and space.

A good application of this aspect of invention is in E-commerce. With the invented process, the buyers buy the most optimum products with the best price based on real time competition among sellers in the global context. Since the buyers themselves define requests and product requirements, sellers are able to target the clientele effectively. In addition, the sellers' benefits are beyond being informed of market demand real time—they are able to update the customers of the latest product information through their terminals.

The location information of the users provided by Location Server can be used to start a "group buy" bidding by IRPs in a same geographical area, e.g. skiers at a ski resort. Furthermore, an IRP can initiate a dynamic reverse auction among ISPs from a designated geographical area. In addition, ISP can select IRPs according to IRPs locations to promote "group sale" products or services. Critically, according to users' location information, the location of the nearby wireless HUBs along with the information of ongoing bidding, negotiation, and group transaction promotion processed by the system are sent to user's terminals. Last but not least, the user's location information is used to authenticate a user and/or restrict his activities in a geographical area such as withdrawing money from some wireless HUBs.

Besides location information, the request and transaction proposals can be sent to ISPs according to other criteria. Exclusive ISP receives information that is blocked to his competitors. Further, ISPs can be categorized into classes for receiving market demand and competition information of varied level of quality and/or at different time interval.

Another embodiment of the invention provides transaction parties to trade by exchanging their products and services without monetary transactions. This embodiment of invention also provides credits or a system currency for circulation among the users.

In another embodiment of the invention, a user's participation of the transactions or programs processed at the system is motivated through system credit or other kind of reward. The system credit is used among system users for trading goods, services. The credit is calculated with a rate, which increases with acceleration based on the participation of the user or the credit accumulated through participation. The rate can also be determined together with other variables such as user's participation of an ongoing promotion or the number of system users referred.

One embodiment of the invention is that an immediate acceptance price for IRP's request is indicated and/or a corresponding deposit is made in an escrow account managed by the Account Management Server. As soon as an ISP proposes a transaction that meets the immediate acceptance price, the transaction is confirmed and the deposit is transferred to an ISP's account.

The above applications of the disclosed method and system are merely example of the invention, provided for the sake of completeness and for the education of the reader by way of concrete examples. The invention can be embodied in various forms and applied in different industry sectors. Combinations and sub-combinations of the various embodiments described above will occur to those familiar with this field, without departing from the scope and spirit of the invention. Therefore, the following claims should not be limited to the description of the embodiments or otherwise constrained in any way to the details of implementation.

Thus embodiments of the present invention produce and provide multimedia communications between different terminals. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A wireless device associated with a unique identifier comprising:
   a sensor configured to detect a change of a condition; and
   a transmitter configured to send a wireless signal, via a WiFi network, in response to detection of the change by the sensor, the wireless signal comprising information corresponding to the unique identifier associated with the wireless device,
   wherein the wireless device is configured to notify a user of a status update based on the detection of the change of the condition according to a configuration setting, the configuration setting comprising information regarding a setting for notifying the user of the status update;
   wherein information regarding the status update is communicated to a user's mobile phone through the WiFi network, the WiFi network connected to a cellular network;
   wherein a network address for the WiFi network is associated with a phone identifier of the user's mobile phone;
   wherein the unique identifier is associated with the phone identifier for the user's mobile phone; and
   wherein a configured data package comprises information for the network address for the WiFi network, the configured data package being from a cellular phone in initiating communications that are directed to the wireless device.

2. The wireless device of claim 1, wherein the wireless device is dedicated to detect the change and transmit the wireless signal.

3. The wireless device of claim 1, wherein the status update is associated with an item; and the condition is about the item.

4. The wireless device of claim 3, wherein a replenishment of an inventory for the item is initiated based on the status update.

5. The wireless device of claim 1, wherein the wireless device is a security monitoring device; and wherein one or more of the following is triggered to notify the user of the status update:
   a). a sound,
   b). a light, or
   c). a text message.

6. The wireless device of claim 1, wherein the wireless device is a video camera.

7. The wireless device of claim 1, wherein the wireless device further comprises a wireless interface configured to receive, via the WiFi network, a compressed signal; and
   a decoder configured to decompress the compressed signal to accommodate production of corresponding information content.

8. The wireless device of claim 1, wherein the wireless device is configured to provide a network access for a mobile terminal.

9. A wireless device associated with a unique identifier comprising:
   a sensor configured to detect a change of a condition; and
   a transmitter configured to send a wireless signal, via a short range wireless communication channel, to a centralized wireless device, in response to detection of the change by the sensor, the wireless signal comprising information corresponding to the unique identifier associated with the wireless device;
   wherein information regarding a status update in connection with the detection is communicated, through the centralized wireless device, via a WiFi network, to a user's mobile phone according to a configuration setting, the centralized wireless device connected to the WiFi network, the WiFi network connected to a cellular network, a network address for the WiFi network associated with a phone identifier for the mobile phone;
   wherein the configuration setting comprises information regarding a setting for communicating the status update;
   wherein the network address for the WiFi network is associated with a device identifier for the centralized wireless device;
   wherein the unique identifier is associated with the phone identifier;
   wherein the wireless device is designated to detect the change and transmit the wireless signal; and
   wherein a configured data package comprises information for the network address for the WiFi network, the configured data package being from a cellular phone in initiating communications directed to the centralized wireless device.

10. The wireless device of claim 9, wherein the short range wireless communication channel is a Zigbee channel.

11. The wireless device of claim 9, wherein the short range wireless communication channel is established for transmission of the wireless signal in response to the detection of the change.

12. The wireless device of claim 9, wherein the wireless device is a security monitoring device; and wherein one or more of the following is triggered to notify a user of the status update:
   a). a sound;
   b). a light; or
   c). a text message.

13. The wireless device of claim 9, wherein a location of the wireless device is determined according to wireless communication information.

14. The wireless device of claim 9, wherein the phone identifier, the unique identifier associated with the wireless device, the device identifier, and the network address for the WiFi network are registered and stored.

15. A wireless device connected to a local area network for bidirectional receiving and transmitting information comprising:
   a video camera configured to record a video;
   a decoder; and
   a transceiver configured to transmit a compressed video signal through the local area network, the local area network connected to a cellular communication network, the compressed video signal corresponding to content of the video;
   wherein the compressed video signal corresponding to the content of the video is communicated to a user terminal;
   wherein a unique identifier of the wireless device is associated with an identifier of the user terminal;
   wherein the video is compressed and stored;
   wherein the transceiver is further configured to receive, through the local area network, a compressed signal corresponding to information content from a mobile phone;
   wherein the compressed signal is decompressed, by the decoder, for production of the information content;
   wherein a network address for the local area network is associated with a phone identifier for the mobile phone; and
   wherein a configured data package comprises information for the network address for the local area network, the configured data package being from a cellular phone in initiating communications that are directed to the wireless device.

16. The wireless device of claim 15, wherein the local area network is a WiFi network.

17. The wireless device of claim 15, wherein the compressed video signal is encrypted.

18. The wireless device of claim 15, wherein the information content is a call.

* * * * *